US008674038B2

(12) United States Patent
Nakamura et al.

(10) Patent No.: US 8,674,038 B2
(45) Date of Patent: Mar. 18, 2014

(54) CURABLE RESIN COMPOSITION FOR MOLDED BODIES, MOLDED BODY, AND PRODUCTION METHOD THEREOF

(75) Inventors: Junichi Nakamura, Suita (JP); Yasunori Tsujino, Ibaraki (JP); Kunio Takahashi, Kawanishi (JP); Ai Matsumoto, Takatsuki (JP); Masafumi Yamashita, Takatsuki (JP); Yukihiro Kasano, Suita (JP); Tatsushi Hirauchi, Takatsuki (JP)

(73) Assignee: Nippon Skokubai Co., Ltd., Osaka (JP)

( * ) Notice: Subject to any disclaimer, the term of this patent is extended or adjusted under 35 U.S.C. 154(b) by 265 days.

(21) Appl. No.: 12/680,215

(22) PCT Filed: Sep. 25, 2008

(86) PCT No.: PCT/JP2008/067875
§ 371 (c)(1),
(2), (4) Date: Apr. 7, 2010

(87) PCT Pub. No.: WO2009/041711
PCT Pub. Date: Apr. 2, 2009

(65) Prior Publication Data
US 2010/0256313 A1 Oct. 7, 2010

(30) Foreign Application Priority Data

Sep. 27, 2007 (JP) .................... 2007-252235
Mar. 27, 2008 (JP) .................... 2008-083628
Mar. 27, 2008 (JP) .................... 2008-083629

(51) Int. Cl.
*C08G 59/00* (2006.01)
*C08L 63/00* (2006.01)

(52) U.S. Cl.
USPC .......................... 525/523; 525/533

(58) Field of Classification Search
USPC .................................. 525/523, 533
See application file for complete search history.

(56) References Cited

U.S. PATENT DOCUMENTS

| | | | | |
|---|---|---|---|---|
| 5,302,438 | A * | 4/1994 | Komamura et al. | 428/195.1 |
| 7,723,407 | B2 * | 5/2010 | Sugioka et al. | 523/443 |
| 2003/0168652 | A1 | 9/2003 | Mabuchi et al. | |
| 2004/0138325 | A1 | 7/2004 | Yamaguchi et al. | |
| 2004/0146654 | A1 | 7/2004 | Moriarty | |
| 2005/0123743 | A1 * | 6/2005 | Martinazzo | 428/328 |
| 2006/0029811 | A1 | 2/2006 | Sugioka et al. | |
| 2007/0049655 | A1 * | 3/2007 | Yoshimune et al. | 522/178 |
| 2008/0085985 | A1 * | 4/2008 | Nakamura et al. | 528/25 |
| 2009/0140216 | A1 * | 6/2009 | Kim et al. | 252/511 |

FOREIGN PATENT DOCUMENTS

| | | |
|---|---|---|
| CN | 1282349 A | 1/2001 |
| EP | 0 970 981 A1 | 1/2000 |
| JP | 1-213602 | 8/1989 |
| JP | 2-133947 | 5/1990 |
| JP | 2865741 | 6/1991 |
| JP | 5-148410 | 6/1993 |
| JP | 5-148411 | 6/1993 |
| JP | 6-302724 | 10/1994 |
| JP | 09-080251 | 3/1997 |
| JP | 10-292091 | 11/1998 |
| JP | 11-124490 A | 5/1999 |
| JP | 2001-192435 | 7/2001 |
| JP | 2001-207019 A | 7/2001 |
| JP | 2002-363506 A | 12/2002 |
| JP | 2003-192762 A | 7/2003 |
| JP | 2003-212959 A | 7/2003 |
| JP | 2003-268198 A | 9/2003 |
| JP | 2003-277474 | 10/2003 |
| JP | 2004-250521 | 9/2004 |
| JP | 2004-346288 | 12/2004 |
| JP | 2005-505642 | 2/2005 |
| JP | 2005-272672 | 10/2005 |
| JP | 2006-070266 | 3/2006 |
| JP | 2006-182801 A | 7/2006 |
| JP | 2006-335894 | 12/2006 |
| JP | 2007-16114 | 1/2007 |
| JP | 2007-16115 | 1/2007 |
| JP | 2007-51217 | 3/2007 |
| JP | 2008-001841 A | 1/2008 |
| JP | 2008-274260 | 11/2008 |
| JP | 2009-102652 | 5/2009 |
| WO | WO-99/19389 A1 | 4/1999 |

OTHER PUBLICATIONS

Horie, C.V. Materials for Conservation: Organic Consolidants, Adhesives and Coatings. ISBN—13:978-0-75-066905-4. p. 261. Evidentiary Reference.*
MSDS Carnauba Wax. Updated Jun. 11, 2007. Evidentiary Reference.*
Compounding Ingredients for Rubber and Plastics (Dec. 2, 2003), pp. 290-317.
"San-Aid SI" catalogue (1996).
"Rapid Curing Epoxy-Resin System", Shigeo, Fiber Compositions, 1969, No. 3, pp. 59-65.

* cited by examiner

*Primary Examiner* — Mike M Dollinger
(74) *Attorney, Agent, or Firm* — Novak Druce Connolly Bove + Quigg LLP

(57) ABSTRACT

The present invention provides a curable resin composition which exhibits the following properties: excellent basic performances such as heat resistance; sufficient optical characteristics such as transparency; and excellent demoldability when a molded body of the composition is demolded at the time of molding. The present invention further provides a molded body obtainable by molding the curable resin composition and a production method thereof. A curable resin composition for molded bodies, including a thermocurable resin, wherein the curable resin composition for molded bodies includes at least one compound selected from the group consisting a compound having a boiling point of 260° C. or less at one atmospheric pressure, a silicon compound having a polyoxyalkylene chain, a silicon compound having an aryl group, and a silicon compound having a polyoxyalkylene chain and an aryl group.

20 Claims, No Drawings

CURABLE RESIN COMPOSITION FOR MOLDED BODIES, MOLDED BODY, AND PRODUCTION METHOD THEREOF

CROSS-REFERENCE TO RELATED APPLICATIONS

The present application claims priority under the Paris Convention on Japanese Patent Applications No. 2007-252235, filed on Sep. 27, 2007, entitled "THERMO- OR PHOTO-CURABLE RESIN COMPOSITION, OPTICAL MATERIAL, AND OPTICAL MEMBER"; No. 2008-83628, filed on Mar. 27, 2008, entitled "CURABLE RESIN COMPOSITION FORMOLDED BODIES, MOLDED BODY, AND PRODUCTION METHOD THEREOF"; and No. 2008-83629, filed on Mar. 27, 2008, entitled "CURABLE RESIN COMPOSITION FOR MOLDED BODIES, MOLDED BODY, AND PRODUCTION METHOD THEREOF", the entire contents of which are hereby incorporated by reference.

TECHNICAL FIELD

The present invention relates to a curable resin composition for molded bodies, a molded body obtainable by molding this composition, and a production method of the molded body. More specifically, the present invention relates to a curable resin composition for molded bodies, useful in an optical application, an opto device application, or a display device application, or useful as a mechanical component material, an electrical or electronic component material, and the like. Further, the present invention relates to a molded body obtainable by molding this curable resin composition, and a production method of the molded body.

BACKGROUND ART

Thermocurable resin compositions are useful as a mechanical component material, an electrical or electronic component material, an automobile component material, a civil engineering and construction material, a forming material and the like. Further, the thermocurable resin compositions are used as a coating material or a material for adhesives. Further, such thermocurable resin compositions are particularly useful as an electrical or electronic component material or a material in an optical application because they can also exhibit transparency. For example, the size of a digital camera module has been reduced because it is installed on a cellular phone and the like. Further, a reduction in costs on such a module has been needed. Accordingly, a lens made of a plastic material such as polymethyl methacrylate, polycarbonate, and polycycloolefin has been increasingly adopted instead of an inorganic glass, which is commonly used. Recently, as a new application of these plastic materials, needs for in-vehicle applications such as an in-vehicle camera and a bar-code reader for delivery service have been increased. In these applications, long-term heat resistance, that is, heat resistance more excellent than that of the commonly used plastic materials is needed in view of exposure to high temperatures in summer. Hence, the use of the thermocurable materials has been increasingly studied. In addition, a plastic material which endures a solder reflow process has been needed.

With regard to conventional materials used as an electrical or electronic component material or used in an optical application, Japanese Kokai Publication No. 2004-346288 on pages 2 and 13 discloses a method for producing a thermocurable resin composition, in which a thermocurable resin including an alicyclic epoxy resin is dissolved and mixed with an organic solvent in which inorganic particles having a particle size of 70 nm or less have been dispersed, and from this mixture, the organic solvent is removed, and thereto, a curing agent is added and mixed. However, the thermocurable resin composition obtained in such a production method has insufficient transparency and therefore it cannot be used in an optical application and the like. Therefore, it is needed that coarse inorganic particles are completely dispersed to be primary particles in order to prevent the inorganic particles from scattering visible light, and thereby the transparency is increased to a sufficient high level. Further, Japanese Kokai Publication No. 2004-396288 discloses a resin containing an alicyclic epoxy and a dispersion prepared by dispersing dry silica in a solvent. However, such a resin has room for improvement in that flexibility, resistance to fracture, anti-thickening effect, prevention for impurity incorporation at the time of mixing of a beadmill, for example, are appropriately improved, and further optical characteristics such as transparency can be sufficiently improved. In addition, the following is desired if such a resin composition is molded and processed in a mold and the like. The demoldability which is shown when the cured product is demolded is improved, and thereby a molded body is produced with high productivity.

Further, Japanese Kokai Publication No. 2004-250521 on pages 2 and 7 discloses an epoxy resin molded body produced by curing a composition containing at least an epoxy resin and inorganic oxide particles, wherein inorganic oxide particles having an average particle diameter of 50 nm or less are dispersed into the molded body. This discloses an epoxy resin composition containing wet silica and an epoxy resin as an example, and bisphenol A (having an Abbe number of 34.1) is used as the epoxy resin. However, in such a case, there is need to suppress thickening during solvent degassing while a concentration of the silica is maintained to a sufficient level. Further, there is room for improvement in order to enhance the material strength or the transparency. Further, it is needed that a demoldability which is shown when the cured product is demolded is improved and thereby the molded body is produced with high productivity. In addition, the transparency and the demoldability are in an opposing relationship. That is, as one is improved, the other is deteriorated. Therefore, there is room for improvement in that both of the transparency and the demoldability are simultaneously improved.

Accordingly, a conventional technology has not provided the following resin composition which can be preferably used in various optical members: not only basic performances such as heat resistance but also improved optical characteristics such as transparency are exhibited; and in view of productivity, demoldability which is shown when the cured product is demolded is improved. If the molded body shows excellent characteristics and the productivity of such a molded body can be improved, the utility of the molded body as an industrial product is dramatically enhanced. Therefore, a curable resin composition for molded bodies, capable of providing such a molded body, has been needed.

DISCLOSURE OF THE INVENTION

Problem to be Solved by the Invention

The present invention has been made in view of the above-mentioned state of the art. The present invention has an object to provide a curable resin composition for molded bodies, which is excellent in basic performances such as heat resistance and which exhibits sufficient optical characteristics such as transparency and excellent demoldability when being demolded at the time of molding. The present invention further has an object to provide a molded body obtainable by molding this composition and a production method of the molded body.

Means for Solving the Problem

The present inventors made various investigations on a curable resin composition for molded bodies, excellent in basic performances such as heat resistance. The inventors found that a curable resin composition for molded bodies which includes a specific compound as an essential component shows excellent demoldability when a molded body of the resin composition is demolded, and therefore the molded body can be produced with high productivity. The inventors further found the followings. The molded body obtained from such a resin composition has: high basic performances such as strength and heat resistance; sufficient optical characteristics such as Abbe number and refractive index; and excellent transparency. Therefore, such a resin composition can be preferably used in an optical application and the like. Further, the inventors found that if such a resin composition further includes a demolding agent, the effect attributed to the demolding agent can be dramatically enhanced. Also, the inventors found that such a curable resin composition for molded bodies of the present invention has heat resistance which cannot be provided by only a thermoplastic resin. As a result, the above-mentioned problems have been admirably solved. The inventors also found that such a resin composition can be preferably used in various applications, for example, an optical application such as a lens, an opto device application, a display device application, a mechanical component material, an electrical or electronic component material, an automobile component material, a civil engineering and construction material, a forming material, and the like.

The specific compound in the present invention is at least one compound selected from the group consisting of compound having a boiling point of 260° C. or less at one atmospheric pressure, a silicon compound having a polyoxyalkylene chain, a silicon compound having an aryl group, and a silicon compound having a polyoxyalkylene chain and an aryl group.

The inventors found that if the specific compound is a compound having a boiling point of 260° C. or less at one atmospheric pressure (hereinafter, also referred to as a compound having a specific boiling point) the resin composition shows not only the above-mentioned effects but also an excellent mold-following property when being cured and molded in a mold. It is important to prevent a molded body from expanding particularly if a lens is formed using a mold. In order to prevent this expansion, the resin composition needs to exhibit the mold-following property. The present inventors found the followings. If the curable resin composition for molded bodies includes the above-Mentioned compound having a specific boiling point, the resin composition can exhibit more enhanced mold-following property when being molded in a mold. According, the expansion of the molded body can be prevented, and therefore, the curable resin composition for molded bodies of the present invention can be preferably used to form a lens, for example. The compound having a specific boiling point also can be used as a solvent. According to a molding using a conventional resin composition for molded bodies, no solvent is added in order for the resin composition to exhibit a mold-following property. Therefore, the conventional resin composition does not substantially contain the compound having a specific boiling point in the present invention.

The inventors further found the followings. If this curable resin composition for molded bodies is applied to a system in which curing is completed in a short time, for example, a production of a micro molded body having a micro shape, evaporation of the above-mentioned compound having a specific boiling point can be prevented and hence the specific compound can be included in a molded body. As a result, the molded body can exhibit still more excellent demoldability when being demolded. In addition, the inventors found that the curable resin composition for molded bodies of the present invention is useful in a microoptical application, for example, an imaging lens for cellular phones, digital cameras, and the like, or a pickup lens. As a result, the present invention has been completed.

In addition, the present inventors found that if the resin composition includes a silicon compound having a polyalkylene chain and/or an aryl group (hereinafter, also referred to as a specific silicon compound) as the specific compound, the specific silicon compound is compatible with other components, in the resin composition, and therefore no haze is generated. Therefore, the resin composition can exhibit transparency suitable as an electrical or electronic component material or in an optical application. Not every silicon compound exhibits such a function, and only some silicon compounds can exhibit transparency suitable in an optical application. Due to the use of such a silicon compound having a specific organic group such as a polyoxyalkylene chain and/ or an aryl group, the demoldability and the transparency which a material used in the above-mentioned applications needs can be improved to a sufficient level. That is, the curable resin composition for molded bodies, including a specific silicon compound, can provide a molded body which can be preferably used in the above-mentioned application because the resin composition shows sufficiently excellent basic performances such as heat resistance; demoldability when the molded body is demolded at the time of molding; sufficient optical characteristics such as Abbe number and refractive index; and excellent transparency.

In addition, the inventors found that the demolding function can be dramatically improved if the above-mentioned compound having a specific boiling point and the above-mentioned silicon compound having a specific organic group are used in combination as the specific compound. The inventors further found that if the curable resin composition for molded bodies of the present invention further includes a cationic curing catalyst to be a cationic curable resin composition, the effects of the present invention can be more remarkably exhibited. As a result, the above-mentioned problems can be admirably solved, leading to of the present invention.

That is, the present invention is a curable resin composition for molded bodies, including a thermocurable resin, wherein the curable resin composition for molded bodies includes at least one compound selected from the group consisting a compound having a boiling point of 260° C. or less at one atmospheric pressure, a silicon compound having a polyoxyalkylene chain, a silicon compound having an aryl group, and a silicon compound having a polyoxyalkylene chain and an aryl group.

As used herein, the thermocurable resin means a resin which can be cured by heating. The method of curing such a resin is not limited. Accordingly, the curable resin composition for molded bodies of the present invention can be cured by heating or light. Resins which are known as a thermocurable resin can be preferably used as the curable resin included in the curable resin composition for molded bodies of the present invention.

The present invention is also a molded body obtainable by molding the above-mentioned curable resin composition for molded bodies.

The present invention is further a molded body obtainable by molding the above-mentioned curable resin compositions for molded bodies, wherein the molded body includes at least one compound selected from the group consisting of a compound having a boiling point of 260° C. or less at one atmospheric pressure, a silicon compound having a, polyoxyalkylene chain, a silicon compound having an aryl group, and a silicon compound having a polyalkylene chain and an aryl group.

The present invention is a production method of a molded body from a curable resin composition for molded bodies, the curable resin composition for molded bodies including a thermocurable resin, wherein the production method includes a step of molding a curable resin composition including at least one compound selected from the group consisting of a compound having a boiling point of 260° C. or less at one atmospheric pressure, a silicon compound having a polyalkylene chain, a silicon compound having aryl group, and a silicon compound having a polyalkylene group and an aryl group.

In the present description, if the resin composition "further includes" a compound and the like, it does not refer to a step procedure, but it means that the resin composition "further includes another component", for example, the another component being different from an epoxy resin contained in a common curable resin composition for molded bodies. If the resin includes a compound and the like "as an essentially component", the resin includes the compound and the like in order to exhibit effects of the present invention.

The present invention is mentioned below in more detail.

The curable resin composition for molded bodies of the present invention includes a thermocurable resin and further includes as an essential component, at least one compound selected from the group consisting a compound having a boiling point of 260° C. or less at one atmospheric pressure, a silicon compound having a polyoxyalkylene chain, a silicon compound having an aryl group, and a silicon compound having a polyokyalkylene chain and an aryl group. Hereinafter, each of the compounds included in this group is also referred to as a "specific compound"; the compound having boiling point of 260° C. or less at one atmospheric pressure is also referred to as a "compound having a specific boiling point"; and each of the silicon compounds included in this group is also referred to as a "specific silicon compound". These specific compounds may be used singly or in combination of two or more of them. The compound having a specific boiling point and the specific silicon compound are preferably used in combination.

The curable resin composition for molded bodies of the present invention can improve demoldability when a cured product of the curable resin composition is demolded at the time of molding if including at least one selected from the above-mentioned specific compounds as an essential component. As a result, the operation and effects of the present invention can be sufficiently exhibited.

The reason why the demoldability is improved if the compound having a boiling point of 260° C. or less at one atmospheric pressure is used as the specific compound is mentioned below. This compound has a boiling point of 260° C. or less, and therefore, it easily changes its state when being heated. That is, this compound is easy to be evaporated and become a high energy state. The above-mentioned compound also has a function as a solvent for the thermocurable resin and has a compatibility with they resin component. Accordingly, the compound is homogeneously mixed with the resin component and an additive such as a demolding agent when the resin composition is melted by heat at the time of molding using a mold. If the melted resin composition is charged (injected or casted) in a mold to be cured, the above-mentioned compound tends to change its state as mentioned above. Further, inside the resin composition, the above-mentioned compound is moved to the surface layer side of the mold to be deposited or aggregated, that is, the compound causes a so-called bleed-out. Attributed to this bleed-out, the compound exhibits demoldability.

The reason why the demoldability is improved if the specific silicon compound is used as the specific compound is because the specific silicon compound has a demolding function high enough to be used as a demolding agent or it is a substance which causes the bleed-out.

Further, if the compound having a specific boiling point and the specific silicon compound are used together, the compound having a specific boiling point functions to move the specific silicon compound closer to the surface layer side of a molded body when the both compounds bleed out. That is, the compound having a specific boiling point increases a bleed-out rate of the specific silicon compound, and as a result, the effect attributed to the silicon compound can be dramatically enhanced. In addition, as mentioned above, the bleed-out rated of the silicon compound is increased, and thereby the demoldability can be sufficiently exhibited even by curing for a short time.

A demolding agent is used to enhance the demoldability if the molding is performed using a mold as mentioned above. A demolding agent which is compatible with the resin component and which causes the above-mentioned bleed-out to exhibit demoldability at the time of curing is preferable. As the bleed-out rate of the demolding agent is faster, the more improved productivity can be obtained because the demolding agent can exhibit the demoldability in a short time.

In the present invention, similarly to the above-mentioned case, the compound having a specific boiling point is moved to the surface layer side of the mold together with the demolding agent when the compounds causes the bleed-out, if the resin composition includes the above-mentioned compound having a specific boiling point. As a result, the bleed-out rate of the demolding agent is increased, and the demolding agent sufficiently exhibits the demoldability even by curing for short time. As a result, the productivity can be improved. In addition, the effects of the demolding agent are more sufficiently exhibited if the demolding agent is more easily deposited to the surface layer of, the mold. Further, due to the improved demoldability of the demolding agent, the use amount of the demolding agent can be decreased.

Thus, the above-mentioned compound having a specific boiling point can dramatically enhance the effects of the demolding agent. Therefore, preferable embodiments of the demolding agent which is used together with this compound having a specific boiling point are mentioned below.

As mentioned above, the above-mentioned compound having a boiling point of 260° C. or less atone atmospheric pressure enables the curable resin composition for molded bodies of the present invention to exhibit excellent optical characteristics such as transparency as well as to maintain the basic performances such as heat resistance, and further to improve the demoldability when being cured and demolded. As a result, the curable resin composition for molded bodies of the present invention provides a molded body which is excellent in basic performances such as heat resistance and optical characteristics such as transparency, and further excellent in demoldability when being cured and demolded.

Therefore, the molded body can be continuously produced with high productivity in production processes.

The above-mentioned compound having a boiling. 260° C. or less at one atmospheric pressure is a compound which has such a boiling point and which can be used as a solvent for the thermocurable resin. If the boiling point of the above-mentioned compound having a specific boiling point at one atmospheric pressure is 260° C. or less, the above-mentioned effect of improving the demoldability is more remarkably observed. The above-mentioned boiling point of the compound having a specific boiling point is preferably lower in view. Of evaporation rate. The lower limit of the boiling point at one atmospheric pressure is preferably 30° C., and more preferably 40° C. or more. Thus, the function of the compound having a specific boiling point seems to be, as mentioned above, due to that the compound is moved to (deposited or aggregated on) the surface layer of the molded body to exhibit the demolding function.

With regard to a compound preferable as the compound having a boiling point of 260° C. or less at one atmospheric pressure, a compound which can more sufficiently exhibit the operation and effects of the present invention can be determined, in terms of not only the boiling point but also compatibility with the resin composition, the moving rate (bleed-out rate) at the time of molding process, and the like.

Examples of the above-mentioned compound having a boiling point of 260° C. or less at one atmospheric pressure include alcohols, polyalcohol derivatives, carboxylic acids, carboxylic acid esters, carboxylic acid anhydrides, ketones, and aliphatic hydrocarbons and aromatic hydrocarbons. At least one compound selected from the group consisting of these compounds is preferable. At least one selected from the group consisting of alcohols, polyalcohol derivatives, carboxylic acid esters, and ketones is more preferable. Carboxylic acid esters and ketones are particularly preferable.

If resin composition contains such a compound as an essential component, the curable resin composition for molded bodies and the molded body have sufficient transparency. Further, if such a composition is cured in a mold, the molded body can be easily demolded because of the improved demoldability. As a result, the molded body can be continuously produced without damages on the surface of the molded body. Hence, such a molded body is particularly useful as an electrical or electronic component material or a material in an optical application. The above-mentioned compound having a specific boiling point also has a function as a solvent for the thermocurable resin. Therefore, the compound having a specific boiling point seems to be moved to the surface layer of the molded body, that is, cause the above-mentioned bleed-out, thereby exhibiting the demoldability and the like.

The above-mentioned compound may have a straight-chain, branched, or circular structure.

An embodiment in which the above-mentioned compound having a boiling point of 260° C. or less at one atmospheric pressure includes at least one compound (A-1) having a boiling point of 150° C. or less at one atmospheric pressure and at least one compound (A-2) having a boiling Point of more than 150° C. at one atmospheric pressure is preferable.

It is preferable that the above-mentioned compound (A-1) having a boiling point of 150° C. or less at one atmospheric pressure is easier to evaporate than the above-mentioned compound (A-2) having a boiling point of more than 150° C. at one atmospheric pressure. Further, it is preferable that the compound (A-1) has a boiling point of 130° C. or less. The boiling point is more preferably 110° C. or less.

It is preferable that the compound (A-1) having a boiling point of 150° C. or less is an alcohol. The compound (A-2) having a boiling point of more than 150° C. at one atmospheric pressure is a compound which has a boiling point of more than'150° C. and 260° C. or less at one atmospheric pressure. It is preferable that the compound (A-2) is an alcohol. An aliphatic monoalcohol containing a total of 6 or more carbon atoms is more preferable.

As mentioned above, it is preferable that the boiling point of the above-mentioned compound having a specific boiling point is lower in view of the evaporation rate (bleed-out rate). However, in view of an industrial process, it might be preferable that the compound (A-2) having a boiling point of more than 150° C. is included as the compound having a specific boiling point. For example, when the resin composition for an optical application is molded and processed, the resin composition is subjected to a heating degassing treatment during or before the molding process, in some cases.

During such a heating degassing treatment, the compound (A-1) having a relatively low boiling point possibly evaporates and therefore, the melted resin which is charged (injected or casted) into a mold has a small amount of the compound (A-1), or in some cases, the resin composition includes no compound (A-1). As a result, the demoldability of the compound (A-1) itself or the above-mentioned effects of increasing the bleed-out rate of the demolding agent might not be obtained.

In contrast, the compound (A-2) having a relatively high boiling point is hard to evaporate. Therefore, the content of the specific compound in the molded body can be easily controlled even if the above-mentioned heating degassing treatment is performed. Accordingly, only the compound (A-1) may be included in the cases that even if the molded body includes no compound having a specific boiling point, sufficient demoldability is obtained and that the heating degassing treatment can be performed at a low temperature. However, it is preferable that the compound (A-2) is included, and it is more preferable that both of the compounds (A-1) and (A-2) are included in the cases that the molded product preferably includes the compound having a specific boiling point and that the curable resin composition for molded products of the present invention needs to be subjected to the above-mentioned heating degassing treatment in order to be used in an optical application. Further, if the resin composition includes both of the specific compounds (A-1) and (A-2), it can sufficiently exhibit the effects attributed to the compounds (A-1) and (A-2) regardless of molding process conditions.

As the above-mentioned alcohols, monoalcohols or polyalcohols each having a boiling point of 260° C. or less at one atmospheric pressure are preferable. The total number of carbons in the alcohol is preferably 1 to 12. According to this, the operation and effects of the present invention are more sufficiently exhibited, and further the basic performances such as heat resistance; and functions, e.g., optical, characteristics such as transparency, can be sufficiently exhibited. In addition, the demoldability can be enhanced. The total number of carbons in the alcohol is more preferably 2 to 12, and still more preferably 3 to 8.

Examples of the above-mentioned alcohols include: aliphatic alcohols; aromatic ring-containing aliphatic alcohols such as benzyl alcohol; and polyalcohols such as ethylene glycol, propylene glycol, diethylene glycol, carbitol, and glycerin. These may be used singly or in combination of two or more species of them.

Among these alcohols, the aliphatic alcohols are particularly preferable. Among the aliphatic alcohols, saturated aliphatic alcohols are preferable. The total number of carbons in the alcohol is preferably 1 to 12, and more preferably 2 to 12, and still more preferably 3 to 12. In view of compatibility with the resin composition, it is preferable that the total number of carbons in the alcohol is 3 to 8. In view of the industrial process, it is preferable that the total number of carbons in the alcohol is 6 to 12 because of easy control in the degassing treatment. Especially, the total number of carbons in the alcohol is more preferably 6 to 8 because of the above-mentioned compatibility and easy control in the degassing treatment. Specific examples of the saturated aliphatic alcohols containing 6 to 8 carbon atoms include cyclohexanol, methylcyclohexanol, 1-hexanol, 1-heptanol, 2-heptanol, octyl alcohol, and 2-ethylhexanol. These may be used singly or in combination of two or more species of them.

With regard to specific examples of the above-mentioned aliphatic alcohols, examples of the compound (A-1) include methanol, ethanol, 1-propanol, 2-propanol, 1-butanol, 2-butanol, t-butanol, and 1-amyl alcohol.

Further, examples of the compound (A-2) include aliphatic alcohols containing 6 to 12 carbon atoms. Aliphatic monoalcohols containing 6 to 12 carbon atoms are particularly preferable as the compound (A-2). Specific examples of the compound (A-2) include: $C_6$ compounds such as 1-hexanol, 4-methyl-2-pentanol, and cyclohexanol; $C_7$ compounds such as 1-heptanol, 2-heptanol, 3-heptanol, methylcyclohexanol, and benzyl alcohol; $C_8$ compounds such as octyl alcohol (1-octanol), 2-ethylhexanol (2-ethylhexyl alcohol); $C_9$ compounds such as 1-nonyl alcohol and isononyl alcohol; $C_{10}$ compounds such as 1-decyl alcohol and 2-decyl alcohol; $C_{11}$ compounds such as 1-undecyl alcohol, and $C_{12}$ compounds such as 1-dodecanol (lauryl alcohol). Among these, cyclohexanol, methylcyclohexanol, 1-hexanol, 1-heptanol, 2-heptanol, octyl alcohol, and 2-ethylhexanol, each of which contains 6 to 8 carbon atoms, are particularly preferable.

With regard to the above-mentioned compounds (A-1) and (A-2), the exemplified compounds may be used singly or in combination of two or more of them.

A polyalcohol derivative having a boiling point of 260° C. or less at one atmospheric pressure is mentioned as the above-mentioned polyalcohol derivatives. The total number of carbons in the polyalcohol derivative is preferably 1 to 12, and more preferably 2 to 12, and still more preferably 3 to 8. According to this, the operation and effects of the present invention are more sufficiently exhibited, and further the basic performances as heat resistance; and functions, e.g., optical characteristics such as transparency, can be sufficiently exhibited. In addition, the demoldability can be enhanced.

With regard to specific examples of the above-mentioned polyalcohol derivatives, examples of the compound (A-1) include ethylene glycol dimethyl ether, ethylene glycol diethyl ether, ethylene glycol monomethyl ether, ethylene glycol monoethyl ether, ethylene glycol monoisopropyl ether, and ethylene glycol monomethyl ether acetate.

Further, examples of the compound (A-2) include: polyalcohol ether compounds such as ethylene glycol monobutyl ether, propylene glycol monomethyl ether, propylene glycol monobutyl ether, ethylene glycol dibutyl ether, propylene glycol dimethyl ether, and cellosolve; polyalcohol ether esters such as ethylene glycol methyl ether acetate and propylene glycol methyl ether acetate; and polyalcohol ester compounds such as ethylene glycol monoacetate and ethylene glycol diacetate.

These may be used singly or in combination of two or more species of them.

A mono- or polycarboxylic acid having a boiling point of 260° C. or less at one atmospheric pressure may be mentioned as the above-mentioned carboxylic acids. The total number of carbons in the mono- or polycarboxylic acid is preferably 1 to 9. According to this, the operation and effects of the present invention can be more sufficiently exhibited. The above-mentioned total number of carbons in the mono- or polycarboxylic acid is more preferably 2 to 8 and still more preferably 2 to 7. With regard to specific examples of the above-mentioned carboxylic acids, examples of the compound (A-1) include aliphatic carboxylic acids containing 1 to 3 carbon atoms such as formic acid, acetic acid, and propionic acid.

Further, examples of the compound (A-2) include aliphatic carboxylic acids containing 4 to 9 carbon atoms such as butanoic acid, pentanoic acid (valeric acid), hexanoic acid (caproic acid), octanoic acid (caprylic acid), and 2,2-dimethyl propanoic acid (pivalic acid). Among these, aliphatic carboxylic acids containing 4 to 9 carbon atoms are preferable.

These may be used singly or in combination of two or more species of them.

A compound which has a boiling point of 60° C. or less at one atmospheric pressure and which contains one or more carboxylic acid ester groups is mentioned as the above-mentioned carboxylic acid esters. The total number of carbons in the carboxylic acid ester is preferably 1 to 12. The following carboxylic acid esters are preferable: (1) carboxylic acid ester obtained from the above-mentioned alcohol and carboxylic acid; (2) carboxylic acid esters obtained in combination of the above-mentioned carboxylic acid with an alcohol Containing 1 to 7 carbon atoms such as methanol, ethanol, propanol, heptanol, hexanol, glycerine, and benzyl alcohol; (3) carboxylic acid eaters obtained in combination of the above-mentioned alcohol with a carboxylic acid containing 1 to 18 carbon atoms such as acetic acid, propionic acid, hexanoic acid, and butanoic acid. These may be used singly or in combination of two or more species of them.

With regard to the carboxylic acid esters, examples of the compound (A-1) include: acetic acid esters of aliphatic alcohols containing 1 to 5 carbon atoms, such as methyl acetate, ethyl acetate, isopropyl acetate, n-butyl acetate, s-butyl acetate, amyl acetate, isoamyl acetate, and allyl acetate; propionic acid esters of aliphatic alcohols containing 1 to 4 carbon atoms such as methyl propionate and n-butyl propionate; aliphatic formic acid esters containing 1 to 5 carbon atoms such as methyl formate, n-propyl formate, n-butyl formate, and amyl formate.

Examples of the Compound (A-2) include: acetic acid esters of aliphatic alcohols containing 6 or more carbon atoms such as n-hexyl acetate, 2-ethylhexyl acetate, cyclohexyl acetate, benzyl acetate, methylcyclohexyl acetate, and octyl acetate; propionic acid esters of aliphatic alcohols containing 5 or more carbon atoms such as isoamyl propionate and benzyl propionate; formic acid esters of aliphatic alcohols containing 6 or more carbon atoms such as hexyl formate and benzyl formate; and methyl captylate, propyl captylate, amyl captylate, methyl caprate, and ethyl caprate.

Among these, isopropyl acetate, octyl acetate, and the like are preferable. Isopropyl acetate is particularly preferable.

A compound which has a boiling point of 260° C. or less at one atmospheric pressure and which contains one or more carboxylic acid anhydride groups is mentioned as the above-mentioned carboxylic acid anhydrides. The total number of carbons in the carboxylic acid anhydride is preferably 1 to 7. Examples of the compound (A-1) include acetic anhydride. Examples of the compound (A-2) include carboxylic acid anhydrides containing 3 to 7 carbon atoms such as propionic anhydride, maleic anhydride, butyric anhydride, and isobutyric anhydride.

These may be used singly or in combination of two or more species of them.

A compound which has a boiling point of 260° C. or less at one atmospheric pressure and which contains one or more ketone groups is mentioned as the above-mentioned ketones. The total number of carbons in the ketone is preferably 1 to 12.

Examples of the compound (A-1) include acetone, methyl ethyl ketone, methyl isobutyl ketone, methyl-n-propyl ketone, methyl-n-butyl ketone, 4-methyl-3-penten-2-one (methyloxide), diethyl ketone, di-n-propyl ketone, diisopropyl ketone, ethyl-n-butyl ketone, acetylacetone (2,4-pentadione), and N-methylpyrrolidone.

Examples of the compound (A-2) include diisobutyl ketone, methyl-n-amyl ketone, methyl-n-hexyl ketone, methyl-n-hebutyl ketone, diacetone alcohol (4-hydroxy-4-methyl-2-pentanone), holon, cyclohexanone, methylcyclohexanone, isophorone (isoacetophenone), and acetophenone.

Among these, acetone, methyl ethyl ketone, methyl isobutyl ketone, N-methyl pyrrolidone, and the like, are preferable, and methyl ethyl ketone is particularly preferable. These may be used singly or in combination of two or more species of them.

An aliphatic hydrocarbon which has a boiling point of 260° C. or less at one atmospheric pressure is mentioned as the above-mentioned aliphatic hydrocarbons. The total number of carbons in the aliphatic hydrocarbon is preferably 1 to 12. For example, cyclic hydrocarbons are preferable.

A hydrocarbon which has a boiling point of 260° C. or less at one atmospheric pressure and which contains one or more aromatic groups is mentioned as the above-mentioned aromatic hydrocarbons. The total number of carbons in the aromatic hydrocarbon is preferably 7 to 12.

With regard to the aliphatic and aromatic hydrocarbon examples of the compound (A-1) include hexane, heptane, octane, cyclohexane, cyclopentane, cyclohexene, benzene, toluene, ethylbenzene, xylene, and styrene. Hexane, cyclohexene, toluene, and xylene are preferable.

Examples of the compound (A-2) include nonane, decane, dodecane, decaline, dipentene, tetralin, cyclohexylbenzene, diethylbenzene, isopropylbenzene, amyl benzene, and cymene. These may be used singly or in combination of two or more species of them.

According to one preferable embodiment of the present invention, if the specific compound is the above-mentioned compound having a boiling point of 260° C. or less at one atmospheric pressure, this compound having a specific boiling point accounts for 0.01 to 5% by weight relative to 100% by weight of the curable resin composition for molded bodies.

In the present invention, the compound having a specific boiling point more preferably accounts for 0.05% by weight or more and 4% by weight or less, and more preferably accounts for 0.1% by weight or more and 3% by weight or less because the operation and of attributed to the above-mentioned compound having a specific boiling point are remarkably exhibited.

If the proportion of the above-mentioned compound having a specific boiling point is less than 0.01% by weight, the effect of improving the demoldability, attributed to the addition of this compound, might be insufficiently exhibited. If the proportion of the above-Mentioned compound having a specific boiling point is more than 5% by weight, the mold-following property when the resin composition is molded in a mold is deteriorated, and the molded body might be expanded. As result, the transparency and the refractive index are insufficient if the molded body is used in an optical application, and further the homogeneity of the molded body might be deteriorated.

The following reasons are mentioned as the reason why the demoldability at the time of molding is improved, if the specific compound in the present invention is the specific silicon compound, that is, the silicon compound having a polyoxyalkylene chain and/or an aryl group. The silicon compound has demoldability excellent enough to be used as a demolding agent. Therefore, the silicon compound enables the cured product to exhibit sufficient demoldability when the cured product is demolded. The silicon compound commonly has insufficient compatibility with a curable resin. However, in the present invention, not a simple silicon compound, but a specific silicon compound having a specific organic group, that is, a polyoxyalkylene chain and/or an aryl group, is used, and thereby the silicon compound shows excellent compatibility with other components in the curable resin composition for molded bodies. As a result, the haze is hardly generated. According to this, the optical characteristics such as transparency can be exhibited in both of the curable resin composition for molded bodies and the molded body. In addition, the demoldability at the time when the cured product is demolded and the optical characteristics such as transparency can be simultaneously improved. Further, due to the improved demoldability, the surface of the molded body is not damaged. Therefore, the molded body with high transparency can be continuously produced. Accordingly, the curable resin composition for molded bodies of the present invention is particularly useful as an electrical or electronic component material or as a material in an optical application. Further, even curing for a short time is enough for the molded body to sufficiently exhibit the demoldability. Because of this, the curable resin composition can be particularly preferably used in microoptical applications such as an imaging lens for digital cameras and a pickup lens, in which, for micro-processing, curing needs to be completed in a short time. Further, the demoldability of the molded body is improved, and therefore the use amount of the demolding agent can be decreased.

That is, if the curable resin composition for molded bodies includes the silicon compound having a polyalkylene chain and/or an aryl group, the curable resin composition before and after the curing can exhibit transparency high enough to be useful as an electrical or electronic component material, or a material in an optical application, and further exhibit sufficient excellent demoldability at the time of demolding. In contrast, if the curable resin composition includes a silicon compound which has neither polyoxyalkylene chain nor aryl group and which contains other organic groups such as a methyl group and an epoxy group, the demoldability is exhibited, but the transparency of the resin composition before the curing is insufficient. Therefore, such a resin composition is not substantially used in the above-mentioned applications.

The following three different silicon compounds are mentioned as the silicon compound in the present invention: a silicon compound having a polyoxyalkylene chain; a silicon compound having an aryl group; and a silicon compound having a polyoxyalkylene chain and an aryl group. These silicon compounds commonly exhibit the above-mentioned operation and effects. However, it is not easy for a person skilled in the art to find, based on common technical knowledge, that these silicon compounds exhibit the common effects.

In the above-mentioned silicon compound having a polyoxyalkylene chain and/or an aryl group, the polyoxyalkylene chain and/or the aryl group are/is bonded to at least one silicon constituting the silicon compound. Due to the specified silicon compound having such a structure, the demoldability and the compatibility with other components included in the curable resin composition for molded bodies can be both enhanced and the obtained molded body is excellent in optical characteristics such as transparency.

The content of the silicon compound is preferably 0.01% by weight or more and 10% by weight or less relative to 100% by weight of the curable resin composition for molded bodies of the present invention. If the content of the silicon compound is less than 0.01% by weight, the above-mentioned effects might be insufficient. If the content thereof is more than 10% by weight, the resin might be hard to cure, for example. The content is more preferably 0.01 to 5% by weight and still more preferably 0.1 to 2% by weight.

The above-mentioned polyoxyalkylene chain is generally a chain constituted by two or more oxyalkylene groups, but may be a chain constituted by one oxyalkylene group. The chain constituted by two or more oxyalkylene groups is formed by one or more different oxyalkylene groups. If the chain is formed of two or more different oxyalkylene groups, the addition form of the oxyalkylene groups is not especially limited. For example, the two or more different oxyalkylene groups may be added randomly, alternatively, or in block, but preferably added in block.

The average molar number of addition of the oxyalkylene group in the above-mentioned silicon compound is preferably 2 to 100. Within the above-mentioned range, the effects of the present invention are remarkably exhibited easily. The average molar number of addition of the oxyalkylene group in the above-mentioned silicon compound is more preferably 3 to 60 and still more preferably 5 to 10. The average molar number of addition means an average value of a molar number of the oxyalkylene groups adding in one mol of the polyokyalkylene chain contained in the silicon compound.

With regard to the above-mentioned specific silicon compound, it is preferable that the above-mentioned polyoxyalkylene chain includes an oxyethylene group. According to this, the transparency of the silicon compound is improved and the operation and effects can be sufficiently exhibited.

In the above-mentioned oxyalkylene group, it is preferable that the amount of the oxyethylene group is 50 to 100% by mole relative to 100% by mole of the entire oxyalkylene group. If the amount of the oxyethylene group is 50% by mole or more, the effects of the present invention are remarkably exhibited, easily. Accordingly, the amount of the oxyethylene group is more preferably 60% by mole or more, and still more preferably 70% by mole or more, and most preferably 90% by mole or more.

In addition, an embodiment in which the above-mentioned silicon compound having a polyoxyalkylene chain has a polyoxyethylene chain is particularly preferably.

It is preferable that the above-mentioned aryl group contains 6 to 20 carbon atoms. Within this range, the effects of the present invention are remarkably exhibited, easily. The aryl group more preferably contains 6 to 14 carbon atoms and still more preferably contains 6 to 10. Specifically, preferable examples of the aryl group include a phenyl group, a benzyl group, a phenethyl group, o-, m- or p-tolyl group, a 2,3- or 2,4-xylyl group, a mesityl group, a naphthyl group, an anthryl group, a phenantolyl group, a biphenylyl group, a benzhydryl group, a trityl group, and a pyrenyl group. One or more species of them may be included. A phenyl group is more preferable.

An embodiment which the molecular structure of the above-mentioned silicon compound having a polyoxyalkylene chain and/or an aryl group may have and preferable examples thereof are mentioned below in more detail.

The above-mentioned silicon compound having a polyoxyalkylene chain and/or an aryl group may include one silicon atom (in this description, referred to as a monomer) or include two or more silicon atoms (in this description, referred to as a polymer). However, it is preferable that the silicon compound is a polymer.

According to the silicon compound that is a monomer, the polyoxyalkylene chain and/or the aryl group are/is bonded to one silicon constituting the silicon compound. Examples thereof include a bisubstituted product in which two olyoxyalkylene chains, two aryl groups, or one polyoxyalkylene chain and one aryl group, are bonded to one silicon; a bisubstituted product in which one polyoxyalkylene chain and another substituent are bonded to one silicon; and a bisubstituted product in which one aryl group and another substituent are bonded (for example, dialkoxysilane).

The following trisubstituted products also may be mentioned: three polyoxyalkylene chains, three aryl groups, two polyoxyalkylene chains and one aryl group, or one polyoxyalkylene chain and two aryl groups, are bonded to one silicon (for example, trialkoxysilane); a trisubstituted product in which another substituent and two polyoxyalkylene chains, another substituent and two aryl groups, or another substituent and one polyoxyalkylene chain and one aryl group, are bonded to one silicon; and a trisubstituted product in which one polyoxyalkylene chain and two other substituents are bonded to one silicon; and a trisubstituted product in which one aryl group and two, other substituents are bonded (for example, monoalkoxysilane). Among these bisubstituted products trisubstituted products, dialkoxysilane having a polyoxyalkylene chain and/or an aryl group and monoalkokysilane having a polyoxyalkylene chain and/or an aryl group are preferable. These may be used singly or in combination of two or more species of them. Specifically, triphenyl methoxysilane and/or phenyl methyl diethoxysilane are/is particularly preferable.

As the silicon compound that is a polymer, a polysiloxane compound which includes two or more silicon atoms having a siloxane bond, and in which a polyoxyalkylene chain and/or an aryl group are/is bonded to at least one of the two or more silicon atoms constituting the siloxane bond (in this description, also referred to as a polysiloxane) is preferable.

"Structure and Raw Materials for Polymer"

The structure of the silicon Compound that is a polymer may be, for example, a chain structure, a rubber structure, a cage structure, and a particle structure. The chain structure includes a not-branched chain structure and a branched chain structure. In the present invention, it is preferable that the polymer has a chain molecular structure. An embodiment in which the polymer has a non-branched chain molecular structure is more preferable. It is preferable that the silicon compound polymer having such a structure is produced by the following methods, for example.

(Not-branched) chain structure: a hydrolysis condensation product of dialkoxy silane (main chain) or, if necessary, a hydrolysis condensation product of dialkoxy silane (main chain) with monoalkoxysilane (end).

(Branched) chain structure: a cohydrolysis condensation product of dialkoxy silane (main chain) with trialkoxysilane, a cohydrolysis condensation product of dialkoxy silane (main chain) with tetraalkoxysilane; a cohydrolysis condensation product of dialkoxy silane (main chain), trialkoxysilane, with tetraalkoxysilane. If necessary, monoalkoxysilane is added before or during the cohydrolysis.

Rudder structure: a hydrolysis condensation product of trialkoxysilane (main chain).

Cage structure: a hydrolysis condensation product of trialkoxysilane (main chain).

Particle structure: a hydrolysis condensation product which essentially include tetraalkoxyl silane and/or trialkoxysilane, preferably as a main component.

In any cases, it is preferable that the polymer having the above-mentioned structure is produced essentially using alkoxysilane containing a silane atom to which the polyoxyalkylene chain and/or the aryl group are/is bonded. One or more selected from the group consisting of monoalkoxysilane, dialkoxysilane, and trialkoxysilane are used as the alkoxysilane.

The total content of the oloxyalkylene chain and the aryl group in the above-mentioned silicon compound is preferably 1 to 4 per monomer (per silicon atom). The total content is more preferably 2 to 4 and more preferably 3 or 4.

The ratio of the total number of the polyoxyalkylene chain and the aryl group to the number of the silicon atom contained in the polymer (the total number of the polyoxyalkylene chain and the aryl group)/(the number of the silicon atom) is $1/10$ to $1/2$. The ratio is more preferably $1/8$ to $1/3$, and still more preferably $1/6$ to $1/4$.

It is preferable that the total number of the polyoxyalkylene chain and the aryl group is 1 to 20 per molecule of the polymer. The total number of the polyoxyalkylene chain and the aryl group is more preferably 1 to 15, and still more preferably 2 to 10.

As mentioned above, according to one preferable embodiment, the curable remain composition for molded bodies includes the above-mentioned polysiloxane compound as an essential component.

The above-mentioned polysiloxane compound is a polysiloxane compound which contains two or more silicon atoms having a siloxane bond, and in which the polyoxyalkylene chain and/or the aryl group are/is bonded to at least one of the two or more silicon atoms constituting the siloxane bond. The polysiloxane compound is liquid at 50° C., generally.

According to one preferable embodiment of the above-mentioned polysiloxane compound, the polysiloxane has a structural unit constituted by a bisubstituted siloxane. That is, it is preferable that the polysiloxane compound contains a bisubstituted siloxane unit as a structural unit. That is, according to one preferable embodiment of the curable resin composition for molded bodies of the present invention, the above-mentioned silicon compound is a polysiloxane compound having a structural unit derived from as bisubstituted siloxane.

The above-mentioned bisubstituted siloxane unit means a unit in which two of four bonds of a silicon atom are each bonded to oxygen forming siloxane and the rest two bonds are bonded to the polyoxyalkylene chain, the aryl group, or another organic group (functional group). The above-mentioned "bisubstituted siloxane" or "bisubstituted siloxane unit" is also referred to as a "bifunctional siloxane" or "bifunctional siloxane unit".

A siloxane dimer is mentioned as a polysiloxane compound having the smallest number of silicon atoms. Such a siloxane dimer is represented by the following formula (1).

[Formula 1]

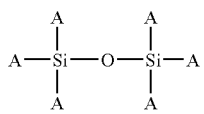

(1)

In the formula, A is an optional group and at least one A represents a polyoxyalkylene chain or an aryl group.

It is preferable that the above-Mentioned silicon compound has the bisubstituted siloxane unit in the molecule, as mentioned above. That is, it is preferable that the silicon, compound includes the bisubstituted siloxane unit. It is particularly preferable that the silicon compound is the above-mentioned polysiloxane compound. The amount of the bisubstituted siloxane unit in the molecule preferably is 60% or more relative to 100% of the total number of the silicon atoms, and more preferably 80% or more, and still more preferably 90% or more. Further, the bisubstituted siloxane unit in the molecule may account for 100%. That is, all of the silicon atoms essentially constitute the bisubstituted siloxane unit.

With regard to the position of the polyoxyalkylene chain and/or the aryl group in the above-mentioned polysiloxane compound, the polyoxyalkylene chain and/or the aryl group may be bonded to an end silicon atom in the polysiloxane compound, or alternatively, the polyoxyalkylene chain and/or the aryl group may be bonded to a silicon atom other than the end silicon atom in the polysiloxane compound.

Specific examples of the above-mentioned polysiloxane compound include silicone oil in which a phenyl group constitutes a part of a side chain of siloxane (trade name: KF-56, product of Shin-Etsu Chemical Co., Ltd.), (trade name: HIVAC-F-4, product of Shin-Etsu Chemical Co., Ltd.); and modified silicone oil in which an organic group having a polyoxyethylene chain and a polyoxypropylene chain, is introduced to each end (trade name: KF-6004, product of Shin-Etsu Chemical Co., Ltd.). These may be used singly or in combination of two or more species of them.

It is preferable that the silicon compound has a weight average molecular weight of 500 or more and 100000 or less. If having a weight average molecular weight within such a range, the above-mentioned specific silicon compound is excellent in compatibility with the curable resin composition, and further, the obtained molded body is excellent in transparency. In addition, such a curable resin composition is also excellent in bleed-out property in the production processes of the molded body. Therefore, the demoldability can be easily enhanced. The above-mentioned specific silicon compound more preferably has a weight average molecular weight of 1000 to 90000 and still more preferably 1500 to 80000.

The weight average molecular weight of the silicon compound may be measured by the following method, for example.

According to this, the effect of the present invention, that is, the effect of improving the demoldability at the time of molding process, can be more remarkably exhibited.

It is preferable that the curable resin composition for molded bodies of the present invention further includes a demolding agent. The demoldability is improved if the resin composition includes the demolding agent. In the case that the resin composition includes the demolding agent in addition to the above-mentioned compound having a specific boiling point, the compound having a specific boiling point increases the bleed-out rate of the demolding agent if the curable resin composition for molded bodies is cured in a mold. As a result, the effect attributed to the addition of the demolding agent is further exhibited. According to this, the cured product (molded body) can be more easily demolded and the surface of the cured product is not damaged and the appearance can be controlled, and therefore, the transparency can be further exhibited. Thus, the molded body is particularly useful as an electrical or electronic component material or a material in an optical application.

A demolding agent which is commonly used in this art and which can be dissolved (compatible with) or dispersed in the thermocurable resin can be used as the above-mentioned demolding agent, and a demolding agent which can be dissolved (compatible with) in the thermocurable resin is preferable. According to one preferable embodiment of the present invention, the demolding agent includes a compound having a boiling point of more than 260° C. at one atmospheric pressure as an essential component considering that the demolding agent exists on the surface layer of the cured product (molded body) to exhibit the demoldability. In this description, the "compound having a boiling point of more than 260° C. at one atmospheric pressure" includes a nonvolatile compound having no boiling point at one atmospheric pressure.

It is preferable that the above-Mentioned demolding agent in the curable resin composition for molded bodies of the present invention includes a compound having a boiling point of more than 260° C. at one atmospheric pressure as an essential component and the demolding agent is in accordance with any one or more of the following embodiments (1) to (4).

(1) An embodiment in which the above-mentioned demolding agent includes at least one compound selected from the group consisting of an alcohol, a carboxylic acid, a carboxylic acid ester, a carboxylic acid salt, and a carboxylic acid anhydride, as an essential component.

(2) An embodiment in which the above-mentioned demolding agent is solid at 20° C.

(3) An embodiment in which the above-mentioned demolding agent includes a silicon compound as an essential component.

(4) An embodiment in which the above-mentioned demolding agent has weight average molecular weight of 500 or more and 100000 or less.

The above-mentioned embodiments (1) to (4) are mentioned below in more detail.

According to the above-mentioned embodiment (1), the demolding agent includes at least one compound selected from the group consisting of an alcohol, a carboxylic acid, a carboxylic acid ester, a carboxylic acid salt, and a carboxylic acid anhydride, as an essential component. In this embodiment, it is more preferable that the demolding agent includes at least one compound selected from the group consisting of an alcohol, a carboxylic acid, a carboxylic acid ester, and a carboxylic acid salt, as an essential component. It is still more preferable that the demolding agent includes at least one compound selected from the group consisting of an alcohol, a carboxylic acid, and a carboxylic acid ester, as an essential component. It is particularly preferable that the demolding agent includes carboxylic acid, as an essential component.

Further, it is also preferable that the demolding agent includes at least one compound selected from the group consisting of an alcohol, a carboxylic acid, a carboxylic acid ester, a carboxylic acid salt, and a carboxylic acid anhydride, and the at least one compound contains a total of 13 or more carbon atoms. The total number of carbons in the at least one compound is more preferably 15 or more, and still more preferably 18 or The upper limit of the total number of carbons is preferably 36, and more preferably 24, and still more preferably 20.

If the total number of carbons is within such a range, a compound having a certain long chain exhibits the operation and effects of the present invention, and shows excellent demoldability without deteriorating basic performances such as heat resistance and optical characteristics such as transparency. The above-mentioned compound having such a carbon number is commercially available relatively easily, and it is excellent in economic efficiency.

These compounds may have a straight-chain, branched, or circular structure. Among these, it is preferable that these compounds have a straight-chain structure.

With regard to the demoldability, it is further preferable that the above-mentioned compound has a boiling point of more than 260° C. at one atmospheric pressure and the total number of carbons in the compound is as follows. That is, it is preferable that the demolding agent includes, as an essential component, at least one compound selected from the group (B-1 to B-3) consisting of (B-1) an alcohol containing a total of 13 or more carbon atoms; (B-2) a carboxylic acid containing a total of 10 or more carbon atoms, a carboxylic acid salt containing a total of 6 or more carbon atoms, a carboxylic acid anhydride containing a total of 8 or more carbon atom; and (B-3) a carboxylic acid ester containing a total of 13 or more carbon atoms. One or more of these compounds can be preferably contained in the above-mentioned demolding agent.

The (B-1) alcohol containing a total of 13 or more carbon atoms; the (B-2) carboxylic acid containing a total of 10 or more carbon atoms, the carboxylic acid salt containing a total of 6 or more carbon atoms, the carboxylic acid anhydride containing a total of 8 or more carbon atom; and the (B-3) carboxylic acid ester containing a total of 13 or more carbon atoms are mentioned below.

The above-mentioned (B-1) alcohol containing a total of 13 or more carbon atoms is a mono- or polyalcohol which has a boiling point of more than 260° C. at one atmospheric pressure and which contains a total of 13 or more carbon atoms. An aliphatic monoalcohol is preferable. Specifically, aliphatic alcohols such as tridecyl alcohol, tetradecyl alcohol, pentadecyl alcohol, palmityl alcohol, margaryl alcohol, stearyl alcohol, nonadecyl alcohol, eicosyl alcohol, myristyl alcohol, and cetyl alcohol are preferable. These may be used singly or in combination of two or more species of them. Among these, stearyl alcohol is more preferable.

The above-mentioned carboxylic acid (B-2) is a mono- or polycarboxylic acid which has a boiling point of more than 260° C. at one atmospheric pressure and which contains a total of 10 or more carbon atoms. An aliphatic carboxylic acid is preferable and a saturated aliphatic carboxylic acid is more Preferable as the above-mentioned carboxylic acid. The carbon number is more preferably 12 or more and particularly preferably 13 or more. Specifically, lauric acid, tridecanoic acid, tetradecanoic acid, pentadecanoic acid, palmitic acid, 1-heptadecanoic acid, stearic acid, nonadecanoic acid, eicosanoic acid, 1-hexacosanoic acid, and behenic acid are preferable. Among these, lauric acid and stearic acid are more preferable and stearic acid is still more preferable. These may be used singly or in combination of two or more species of them.

The above-mentioned carboxylic acid salt (B-21 is a mono- or polycarboxylic acid salt which has a boiling point of more than 260° C. at one atmospheric pressure and contains a total of 6 or more carbon atoms. As the above-mentioned Carboxylic acid salt (B-2), an aliphatic carboxylic acid salt is preferable, and an aliphatic carboxylic acid salt containing 10 or more carbon atoms is more preferable, and an aliphatic carboxylic acid salt containing a total of 13 or more carbon atoms is particularly preferable. In the present invention, a carboxylic acid salt obtained in combination of the above-mentioned carboxylic acid (B-2) with at least one selected from the group consisting of amine, sodium, potassium, magnesium, calcium, manganese, iron, cobalt, nickel, copper, zinc, and tin is preferable. These may be used singly or in combination of two or more species of them. Among these, at least one selected from the group consisting of zinc stearate, magnesium stearate, and zinc 2-ethylhexanoate is preferable.

The above-mentioned carboxylic acid anhydride (B-2) is a carboxylic acid anhydride which has a boiling point of more than 260° C. at one atmospheric pressure and which contains a total of 8 or more carbon atoms. An aliphatic carboxylic acid anhydride is preferable as the above-mentioned carboxylic acid anhydride. An aliphatic carboxylic acid anhydride containing 10 or more carbon atoms is more preferable. An aliphatic carboxylic acid anhydride containing a total of 13 or more carbon atoms is more preferable. Specifically, succinic anhydride, phthalic anhydride, and the like, are mentioned. These may be used singly or in combination of two or more species of them. Among the above-mentioned compounds, stearic acid and steric acid compounds such as stearic acid ester are more preferable. Thus, it is preferable that the durable resin composition for molded bodies of the present invention includes a stearic acid compound. It is more preferable that the curable resin composition for molded bodies of the present invention includes stearic acid.

A carboxylic acid ester which has a boiling point of more than 260° C. at one atmospheric pressure and which contains a total of 13 or more carbon atoms is mentioned as the above-mentioned carboxylic acid ester (B-3). (1) a carboxylic acid ester obtained from the above-mentioned alcohol (B-1) and the above-mentioned carboxylic acid (B-2); (2) a carboxylic acid ester obtained in combination of the above-mentioned carboxylic acid (B-2) with an alcohol containing 1 to 7 carbon atoms such as methanol, ethanol, propanol, heptanol, hexanol, glycerin, and benzyl alcohol; and (3) a carboxylic acid ester obtained in combination of the above-mentioned alcohol (B-1) with a carboxylic acid containing 1 to 7 carbon atoms such as acetic acid, propionic acid, hexanoic acid, and butanoic, acid. Those mentioned in the above-mentioned carboxylic acid (B-2) are mentioned as preferable carboxylic acids. The preferable embodiments mentioned in the above-mentioned carboxylic acid (B-2) may be mentioned as preferable carboxylic acids. Among these, stearic acid methyl ester, stearic acid ethyl ester, and the like are preferable. These may be used singly or in combination of two or more species of them.

According to one preferable embodiment of the present invention, the above-mentioned demolding agent has a boiling point of more than 260° C. at one atmospheric pressure and the carboxylic acid ester containing a total of 13 or more carbon atoms is solid at 20° C. That is, a carboxylic acid ester which has a boiling point of more than 260° C. at one atmospheric pressure and which contains a total of 13 or more carbon atoms is in accordance with one preferable embodiment.

The above-mentioned embodiment (2) is mentioned.

According to the above-mentioned embodiment (2), the demolding agent is solid at 20° C. According to this embodiment, the demolding agent is more preferably solid at 25° C., and still more preferably at 30° C., and particularly preferably at 50° C.

If including the demolding agent having such characteristics, the resin composition remarkably exhibits the effect of improving the bleed-out rate of the demolding agent, attributed to the specific compound in the present invention when being cured in a mold. This seems to be because of the following reasons. If a molding temperature is low, for example, a demolding agent having a high melting point is generally difficult to bleed out. However, if the demolding agent is used together with the above-mentioned compound having a boiling point of 260° C. or less at one atmospheric pressure, the demolding agent is more easily transferred to the surface side of the molded body due to this compound. As a result, the bleed-out rate is dramatically improved. Further, it also seems to be because the demolding agent which has deposited and aggregated on the surface side of the molded body is more easily solidified as the temperature of the molded body decreases, because of the above-mentioned characteristics, and as a result, the demolding agent which has deposited on the surface dramatically enhances the demoldability. As a result, the demoldability can be dramatically enhanced while the basic performances such as heat resistance, and the optical characteristics such as transparency are sufficiently maintained.

The above-mentioned embodiment (3) is mentioned below.

According to the above-mentioned embodiment (3), the demolding agent includes a silicon compound (B-4) as an essential component. According to this embodiment, it is preferable that the silicon compound (B-4) is a polysiloxane compound. That is according to one preferable embodiment of the present invention, the above-mentioned, demolding agent includes a polysiloxane compound as an essential component. Embodiments of the polysiloxane compound, are the same as those of the above-mentioned specific silicon compound.

The content of the above-mentioned silicon compound (B-4) is preferably 0.01% by weight or more and 10% by weight or less relative to 100% by weight, of the curable resin composition for molded bodies of the present invention. If the content thereof is within such a range, the curable resin composition and a molded body thereof are particularly excellent in transparency. If content of the silicon compound (B-4) is less than 0.01% by weight, the above-mentioned effects might be insufficiently exhibited. If it is more than 10% by weight, the resin might be difficult to cure, for example. The content is more preferably 0.01% to 5% by weight and still more preferably 0.1 to 2% by weight.

The above-mentioned embodiment (4) is mentioned below.

According to the above-mentioned embodiment (4), the above-mentioned demolding agent includes a substance having a weight average molecular weight of 500 or more and 100000 or less. The effects of the present invention might be insufficiently exhibited if the weight average molecular weight is less than 500. If the weight average molecular weight is more than 100000, the compatibility with the resin component is insufficient and therefore the effects of the present invention might be insufficiently exhibited. The weight average molecular weight is more preferably 1000 or more and 10000 or less.

If the demolding agent includes a substance having such a weight average molecular weight, the demoldability can be dramatically enhanced while the basic performances such as heat resistance, and the optical characteristics such as transparency are sufficiently maintained. Particularly if the demolding agent including a substance having such a weight average molecular weight is used together with the above-mentioned compound having a boiling point of 260° C. or less at one atmospheric pressure, the bleed-out rate is dramatically increased if the composition is molded in a mold. This may be because the substance having such a weight average molecular weight is more easily moved to the surface of the molded body and the rate is dramatically improved if such a demolding agent is used together with the above-mentioned compound having a boiling point of 260° C. or less at one atmospheric pressure. As a result, the demoldability can be dramatically enhanced while the basic performances such as heat resistance, and the optical characteristics such as transparency are sufficiently maintained.

The weight average molecular weight of the demolding agent can be measured by the following method, for example.
"Measurement Method of Weight Average Molecular Weight"

The weight average molecular weight of the above-mentioned demolding agent can be measured by gel permeation chromatography (GPC), for example. The above-mentioned weight average molecular weight is preferably measured under the following conditions using HLC-8220GPC (gel permeation chromatography, trade name, product of TOSOH CORP.).
"Measurement Condition of Weight Average Molecular Weight".
Column: four columns, "TSK-GEL SUPER HZM-N 6.0× 150" product of TOSOH CORP.
Eluent: tetrahydrofuran,
Flow rate: 0.6 mL/min
Temperature: 40° C.
Calibration curve: drawn using a polystyrene Standard sample (product of TOSOH CORP.)

As mentioned above, it is preferable that the above-mentioned demolding agent in the curable resin composition for molded bodies of the present invention includes the compound having a boiling point of more than 260° C. at one atmospheric pressure as an essential component and the demolding agent is in accordance with any one or more of the above-mentioned embodiments (1) to (4). Among these embodiments, an embodiment in which the demolding agent includes a compound in accordance with the above-mentioned embodiments (1) and (2) as an essential component is more preferable. This embodiment is an embodiment in which the demolding agent includes, as an essential component, at least one of the compounds (B-1) to (B-3) as an essential component and the at least one compound is solid at 20° C. That is, this embodiment is an embodiment in which the above-mentioned demolding agent includes, as an essential component, at least one compound selected from the group consisting of an alcohol, a carboxylic acid, a carboxylic acid ester, a carboxylic acid salt, and a carboxylic acid anhydride; the total number of carbons in the at least one compound is 13 or more; and the at least one compound is solid at 20° C. According to this embodiment, the at least one compound is more preferably solid at 30° C., and still more preferably solid at 50° C.

According to one preferable embodiment of the present invention, the above-mentioned demolding agent includes a compound in accordance with the above-mentioned embodiments (3) and (4) as an essential component. This embodiment is an embodiment in which the demolding agent includes a least one silicon compound (B-4) which has a weight average molecular weight of 500 or more and 100000 or less as an essential component. That is, it is more preferable that the demolding agent includes the silicon compound (B-4) as an essential component and that the silicon compound (B-4) has a weight average molecular weight of 500 or more and 100000 or less.

Further, an embodiment in which the demolding agent includes a compound in accordance with the embodiment (1) and compound in accordance with the embodiment (3), as an essential component, that is, an embodiment in which the demolding agent includes at least one of the compounds (B-1) to (B-3) and at least one silicon compound (B-4) as an essential component, is more preferable. An embodiment in which the demolding agent includes a compound in accordance with the above-mentioned embodiment (2) and a compound in accordance with the above-mentioned embodiment (4), as an essential component, is more preferable. Further, an embodiment in which the demolding agent includes a compound in accordance with the above-mentioned embodiments (1) and (2) and a compound in accordance with the above-mentioned embodiments (3) and (4), as an essential component, is particularly preferable.

In the curable resin composition for molded bodies of the present invention, the content of the demolding agent having the above-mentioned embodiment is preferably 0.01% by weight or more and 10% by weight or less relative to 100% by weight of the curable resin composition for molded bodies of the present invention. If the content of the demolding agent is less 0.01% by weight, the effects attributed to the demolding agent might be insufficiently exhibited. If it is more than 10% by weight, the resin might be difficult to cure. The content is more preferably 0.01 to 5% by weight, and still more preferably 0.1 to 2% by weight.

The following Tables 1 and 2 show specific examples, melting point, boiling points, and the like, of the above-mentioned compounds (A-1) and (A-2) having a boiling point of 260° C. or less at one atmospheric pressure and those of the above-mentioned compounds (B-1) to (B-4).

In the following Tables 1 and 2, A-1 represents the compound having a boiling point of 150° C. or less at one atmospheric pressure; A-2 represents the compound having a boiling point, of more than 150° C. and 260° C. or less at one atmospheric pressure. B-1 represents the alcohol having a boiling point of more than 260° C. B-2 represents the carboxylic acid, the carboxylic acid salt, or the carboxylic acid anhydride, having a boiling point of more than 260° C. B-3 represents the carboxylic acid ester having a boiling point of more than 260° C. B-4 represents the silicon compound MEK represents methyl ethyl ketone. The boiling point was measured at one atmospheric pressure unless otherwise specified.

TABLE 1

|  |  | 20° C. | 25° C. | 30° C. | 50° C. |
| --- | --- | --- | --- | --- | --- |
| Low-boiling ketones such as MEK | | Liquid | Liquid | Liquid | Liquid |
| Acetic acid ester (C1-Cn) | | Liquid | Liquid | Liquid | Liquid |
| Other low-boiling solvents | | — | — | — | — |
| 1-amyl alcohol | $C_5H_{11}OH$ | Liquid | Liquid | Liquid | Liquid |
| 1-hexanol | $C_6H_{13}OH$ | Liquid | Liquid | Liquid | Liquid |
| Cyclohexanol | $C_6H_{13}OH$ | Solid | Solid/Liquid | Liquid | Liquid |
| 1-heptanol | $C_7H_{15}OH$ | — | — | — | — |
| 1-octanol | $C_8H_{17}OH$ | Liquid | Liquid | Liquid | Liquid |
| 2-ethylhexanol | $C_8H_{17}OH$ | Liquid | Liquid | Liquid | Liquid |
| Nonyl alcohol | $C_9H_{19}OH$ | Liquid | Liquid | Liquid | Liquid |
| 1-decyl alcohol | $C_{10}H_{21}OH$ | Liquid | Liquid | Liquid | Liquid |
| 2-decyl alcohol (methyl octyl carbinol) | $C_{10}H_{21}OH$ | Liquid | Liquid | Liquid | Liquid |
| Lauryl alcohol | $C_{12}H_{25}OH$ | Solid | Solid/ | Liquid | Liquid |

TABLE 1-continued

|  |  |  |  |  |  |
|---|---|---|---|---|---|
|  |  |  | Liquid |  |  |
| Stearyl alcohol | $C_{18}H_{37}OH$ | Solid | Solid | — | — |
| Stearyl alcohol (industrial standard) |  | Solid | Solid | — | — |
| Caprylic acid (octylic acid) | $C_7H_{15}COOH$ | Liquid | Liquid | Liquid | Liquid |
| Capric acid (decylic acid) | $C_9H_{19}COOH$ | Solid | Solid | Solid | Liquid |
| Lauric acid | $C_{11}H_{23}COOH$ | Solid | Solid | Solid | Liquid |
| Palmitic acid | $C_{15}H_{31}COOH$ | Solid | Solid | Solid | Solid |
| Stearic acid | $C_{17}H_{35}COOH$ | Solid | Solid | Solid | Solid |
| Commercially available stearic acid (Mixture with palmitic acid) |  | Solid | Solid | Solid | Solid |
| (Unsaturated) oleic acid | $C_{17}H_{33}COOH$ | Liquid | Liquid | Liquid | Liquid |
| Industrial oleic acid (7-12% of saturated fatty acid such as palmitic acid and stearic acid are contained and linolic acid, etc., are mixed.) |  | Liquid | Liquid | Liquid | Liquid |
| Caprylic anhydride |  | Liquid | Liquid | Liquid | Liquid |
| Capric anhydride |  | — | — | — | — |
| Lauric anhydride |  | Solid | Solid | Solid | Liquid |
| Palmitic anhydride |  | Solid | Solid | Solid | Solid |
| Stearic anhydride |  | Solid | Solid | Solid | Solid |
| Oleic anhydride |  | Solid | Liquid | Liquid | Liquid |

|  |  | Melting point | Freezing point | Boiling point |  |
|---|---|---|---|---|---|
| Low-boiling ketones such as MEK |  | <20 | — | <150 | A-1 |
| Acetic acid ester (C1-Cn) |  | <20 | — | <150 | A-1 |
| Other low-boiling solvents |  | — | — | <150 | A-1 |
| 1-amyl alcohol | $C_5H_{11}OH$ | Liquid at normal temperature | — | 138 | A-1 |
| 1-hexanol | $C_6H_{13}OH$ | Liquid at normal temperature | — | 157 | A-2 |
| Cyclohexanol | $C_6H_{13}OH$ | 25 | — | 161 | A-2 |
| 1-heptanol | $C_7H_{15}OH$ | — | — | 176 | A-2 |
| 1-octanol | $C_8H_{17}OH$ | −15 | — | 195 | A-2 |
| 2-ethylhexanol | $C_8H_{17}OH$ | ≤−76 | — | 183.5 | A-2 |
| Nonyl alcohol | $C_9H_{19}OH$ | Liquid at normal temperature | — | 213 | A-2 |
| 1-decyl alcohol | $C_{10}H_{21}OH$ | Liquid at normal temperature | — | 228-232 | A-2 |
| 2-decyl alcohol (methyl octyl carbinol) | $C_{10}H_{21}OH$ | Liquid at normal temperature | — | 210-211 | A-2 |
| Lauryl alcohol | $C_{12}H_{25}OH$ | 26 | — | 255-259 | A-2 |
| Stearyl alcohol | $C_{18}H_{37}OH$ | 59.4-59.8 | 58 | 210/15 mm | B-1 |
| Stearyl alcohol (industrial standard) |  | 56-59 | — | — | B-1 |
| Caprylic acid (octylic acid) | $C_7H_{15}COOH$ | 16 | — | 237 | A-2 |
| Capric acid (decylic acid) | $C_9H_{19}COOH$ | 31.5 | — | 268-270 | B-2 |
| Lauric acid | $C_{11}H_{23}COOH$ | 44 | — | — | B-2 |
| Palmitic acid | $C_{15}H_{31}COOH$ | 63-64 | — | 390 | B-2 |
| Stearic acid | $C_{17}H_{35}COOH$ | 71.5-72 | 69.41 | — | B-2 |
| Commercially available stearic acid (Mixture with palmitic acid) |  | 58.5-65 | — | — | B-2 |
| (Unsaturated) oleic acid | $C_{17}H_{33}COOH$ | 12-16 | 11.8-12.2 | 360 decomposition/760 mm | B-2 |
| Industrial oleic acid (7-12% of saturated fatty acid such as palmitic acid and stearic acid are contained and linolic acid, etc., are mixed.) |  | 8-16 | ≤15 | — | B-2 |
| Caprylic anhydride |  | −1 | — | — | B-2 |
| Capric anhydride |  | (<0) | — | 280-285 | B-2 |
| Lauric anhydride |  | 41.8 | — | — | B-2 |
| Palmitic anhydride |  | 64 | — | — | B-2 |
| Stearic anhydride |  | 72 | — | — | B-2 |
| Oleic anhydride |  | 22-24 | — | — | B-2 |

TABLE 2

|  |  | 20° C. | 25° C. | 30° C. | 50° C. |
|---|---|---|---|---|---|
| Methyl captylate | — | Liquid | Liquid | Liquid | Liquid |
| Ethyl captylate | — | Liquid | Liquid | Liquid | Liquid |
| Propyl captylate | — | Liquid | Liquid | Liquid | Liquid |
| Amyl captylate | — | Liquid | Liquid | Liquid | Liquid |
| Methyl caprate | — | Liquid | Liquid | Liquid | Liquid |
| Ethyl caprate | — | Liquid | Liquid | Liquid | Liquid |
| Methyl laurate | — | Liquid | Liquid | Liquid | Liquid |

TABLE 2-continued

| | | | | | |
|---|---|---|---|---|---|
| Ethyl laurate | — | — | — | — | — |
| Methyl palmitate | — | Solid | Solid | Solid/Liquid | Liquid |
| Ethyl palmitate | — | Solid/Liquid | Liquid | Liquid | Liquid |
| Propyl palmitate | — | Solid/Liquid | Liquid | Liquid | Liquid |
| Butyl palmitate | — | Liquid | Liquid | Liquid | Liquid |
| Amyl palmitate | — | Liquid | Liquid | Liquid | Liquid |
| Heptyl palmitate | — | Liquid | Liquid | Liquid | Liquid |
| Octyl palmitate | — | Liquid | Liquid | Liquid | Liquid |
| Decyl palmitate | —$C_{10}H_{21}$ | Solid | Solid | Solid/Liquid | Liquid |
| Dodecyl palmitate | —$C_{12}H_{25}$ | Solid | Solid | Solid | Liquid |
| Phenyl palmitate | — | Solid | Solid | Solid | Liquid |
| Methyl stearate | — | Solid | Solid | Solid | Liquid |
| Ethyl stearate | — | Solid | Solid | Solid | Liquid |
| Propyl stearate | — | Solid/Liquid | Solid/Liquid | Liquid | Liquid |
| Cetyl stearate | —$C_{16}H_{33}$ | Solid | Solid | Solid | Solid |
| Methyl oleate | — | Liquid | Liquid | Liquid | Liquid |
| Butyl oleate | — | Liquid | Liquid | Liquid | Liquid |
| Silicone oil | — | Liquid | Liquid | Liquid | Liquid |

| | | Melting point | Freezing point | Boiling point | |
|---|---|---|---|---|---|
| Methyl captylate | — | Liquid at normal temperature | — | 193-194 | A-2 |
| Ethyl captylate | — | Liquid at normal temperature | — | 207-208/753 mm | A-2 |
| Propyl captylate | — | −45 | — | 225 | A-2 |
| Amyl captylate | — | −34.5 | — | — | A-2 |
| Methyl caprate | — | Liquid at normal temperature | — | 224 | A-2 |
| Ethyl caprate | — | Liquid at normal temperature | — | 243-245 | A-2 |
| Methyl laurate | — | 5 | — | — | B-3 |
| Ethyl laurate | — | — | −10 | — | B-3 |
| Methyl palmitate | — | 30.5 | — | 190.5/15 mm | B-3 |
| Ethyl palmitate | — | α: 24 β: 19.3 | — | 185/10 mm | B-3 |
| Propyl palmitate | — | 20.4 | — | — | B-3 |
| Butyl palmitate | — | 16.9 | — | — | B-3 |
| Amyl palmitate | — | 19.4 | — | — | B-3 |
| Heptyl palmitate | — | Liquid at normal temperature | — | — | B-3 |
| Octyl palmitate | — | 22.5 | — | — | B-3 |
| Decyl palmitate | —$C_{10}H_{21}$ | 30 | — | — | B-3 |
| Dodecyl palmitate | —$C_{12}H_{25}$ | 41 | — | — | B-3 |
| Phenyl palmitate | — | 45 | — | — | B-3 |
| Methyl stearate | — | 38.5-39.5 | — | — | B-3 |
| Ethyl stearate | — | 33.4 | 30.9 | 213-215/15 mm | B-3 |
| Propyl stearate | — | 28.6 | — | — | B-3 |
| Cetyl stearate | —$C_{16}H_{33}$ | 55-60 | — | — | B-3 |
| Methyl oleate | — | Liquid at normal temperature | — | 212-213/15 mm | B-3 |
| Butyl oleate | — | Liquid at normal temperature | — | 227-228/15 mm | B-3 |
| Silicone oil | — | — | — | — | B-4 |

It is preferable that the above-mentioned specific compound and/or the above-mentioned specific demolding agent remain(s) in a molded body after completion of the molding. As a result, sufficient demoldability can be obtained even at the completion of the molding.

Whether or not the above-mentioned specific compound and/or the above-mentioned specific releasing agent remain(s) in the molded body can be determined by subjecting the molded body obtained by the molding process to pyrolysis GC-Mass (Gas Chromatograph Mass) spectrum measurement.

That is, the present invention is a molded body obtainable by molding the curable resin composition for molded bodies of the present invention, wherein the molded body includes at least one compound selected from the group consisting of a compound hailing a boiling point of 260° C. or less at one atmospheric pressure, a silicon compound having a polyoxyalkylene chain, a silicon compound having an aryl group, and a silicon compound having a polyalkylene chain and an aryl group.

Preferable embodiments of this molded body are the same as those mentioned in the curable resin composition for molded bodies and the molded body of the present invention.

The above-mentioned "molded body obtainable by molding the curable resin composition for molded bodies" is a molded body obtained by subjecting the curable resin composition for molded body to molding process, especially a molded body obtained by subjecting the curable resin composition for molded body to molding process using a mold.

The curable resin composition for molded bodies of the present invention includes a thermocurable resin. The above-mentioned thermocurable resin is not especially limited as long as the operation and effects of the present invention are exhibited. It is preferable that the thermocurable resin is excellent in compatibility with a component other than the thermocurable resin in the resin composition and this component is homogeneously dispersed in the thermocurable resin. The thermocurable resin has not been widely used yet because it is more difficult to process than a thermoplastic resin. However, even such a thermocurable resin can be preferably used in the present invention because the above-mentioned specific compound, the above-mentioned specific demolding agent, and the like are used. Accordingly, the resin composition of the present invention can be applied in a plastic lens, application, for example. The resin composition in the present invention is easy to process than a lens made of inorganic glass and the like, and the size or shape of the molded body can be freely adjusted. Further, such a resin composition is suitable for mass production.

The above-mentioned thermocurable resin is not especially limited as long as it has a thermocurable property and it contains a resin with a high molecular weight to a molecular weight equivalent to that of a monomer. The following embodiments may be mentioned as the embodiment of the thermocurable resin, for example. (1) an embodiment in which the thermocurable resin is a liquid or solid curable resin; (2) an embodiment in which the thermocurable resin contains a liquid or solid curable resin and a curable compound or (noncurable) solvent having a molecular weight lower than that of the liquid or solid curable resin; and (3) an embodiment in which the thermocurable resin contains a liquid or solid noncurable resin and a curable compound having a molecular weight lower than that of the liquid or noncurable resin. Examples of the above-mentioned embodiment (3) include an embodiment in which the thermocurable resin contains an oligomer component of an acrylic resin such as PMMA (polymethyl methacrylate) and a (meth)acrylate monomer.

It is preferable that the above-mentioned thermocurable resin is a cationic curable resin (hereinafter, also referred to as a "cationic curable compound", "cationic polymerizable group-containing resin component", "cationic polymerizable compound", or "cationic polymerizable resin"). The above-mentioned cationic curable resin is a compound which contains at least one cationic polymerizable group in the molecule. In the present invention, it is preferable that the cationic curable resin is a compound containing two or more cationic polymerizable groups. It is more preferable that the cationic curable resin is a polyfunctional cationic curable compound containing two or more cationic polymerizable groups.

The curable resin composition for molded bodies in the present invention includes the above-mentioned cationic curable resin, and therefore, the curing reaction (cationic polymerization reaction) can be completed in a short time and the curing rate can be increased. Further, it becomes possible to sufficiently suppress the above-mentioned compound having a specific boiling point and the above-mentioned demolding agent from being evaporated and substantially absent in the cured product. Thus, the effects of the present invention are more remarkably exhibited. In addition, the curable resin composition has processability equivalent to that of a conventional thermocurable plastic material, and further it shows heat resistance, equal to that of inorganic glass and excellent characteristics such as moldability and processability. As a result, the cured product becomes excellent in demoldability (demolding strength).

The above-mentioned cationic curable resin is not especially limited, but an epoxy rein (hereinafter, also referred to as "an epoxy compound" or "an epoxy group-containing compound") is preferable.

Preferable examples of a cationic polymerizable group which can be attributed to these effects include: glycidyl groups such as a glycidyl ether group and a glycidyl ester group; glycidyl ether groups bonded to a completely or partly saturated aliphatic cyclic hydrocarbon such as a hydrogenerated aromatic glycidyl ether compound; oxetane groups; dioxolane groups; trioxane groups; epoxy groups containing an alicyclic epoxy group such as an epoxycyclohexane group; vinyl ether groups; and styryl groups.

Among these, the curable resin composition for molded bodies, including an oxetane group as an essential component, is effective for improving the curing property and also obtaining a cured product with a high refractive index, if a compound having a conjugate structure constituted by seven or more carbon atoms and a glycidyl group (an aromatic epoxy compound, and others), particularly an epoxy compound having a fluorene skeleton, is used as the curable resin.

Among the above-mentioned cationic polymerizable groups, an alicyclic epoxy group and a glycidyl ether group directly or indirectly bonded to a saturated aliphatic cyclic hydrocarbon are preferable if the curable resin composition is used in an optical application such as a lens. The curable resin composition including these cationic polymerizable groups excellent in curing rate. An alicyclic epoxy group is particularly preferable. An epoxycyclohexane group is preferable among the alicyclic epoxy groups. Not only the species of the group but also an organic skeleton to which the group is bonded have an influence on the curing characteristics of the cationic polymerizable group.

The above-mentioned epoxy resin is a compound containing at least one epoxy group. In the present description, the "epoxy group" means a group containing an oxysilane ring that is a three-membered ring ether. Specifically, an epoxy group, and a glycidyl group having an epoxy group structure are preferable. Preferable examples of the epoxy group include epoxy groups such as an epoxycyclohexyl group and glycidyl groups such as a glycidyl ether group and a glycidyl ester group.

It is preferable that the above-mentioned epoxy group-containing compound includes at least one selected from the group consisting of an aliphatic epoxy compound, a hydrogenerated epoxy compound, an alicyclic epoxy compound, and an aromatic epoxy compound. Among the above-mentioned epoxy group-containing compounds, an alicyclic epoxy compound, a hydrogenerated epoxy compound, an aliphatic epoxy compound, and an aromatic epoxy compound are preferable in this order. If the curable resin composition includes an aromatic epoxy compound, the following embodiments are mentioned as particularly preferable embodiments.

Aliphatic glycidyl ether epoxy resins are preferable as the above-mentioned aliphatic epoxy compound. These may be used singly or in combination of two or more species of them.

Specifically, preferable examples of the above-mentioned aliphatic glycidyl ether epoxy resins include those obtained by a condensation reaction of epihalohydrin with ethylene glycol, diethylene glycol, triethylene glycol, tetraethylene glycol, polyethylene glycol (PEG600), propylene glycol, dipropylene glycol, tripropylene glycol, tetrapropylene glycol, polypropylene glycol (PPG), glycerol, diglycerol, tetraglycerol, polyglycerol, trimethylolpropane and its polymer, pentaerythritol and its polymer, mono/polysaccharides, such as glucose, fructose, lactose, and maltose; and those having a propylene glycol skeleton, an alkylene skeleton, or an oxyalkylene skeleton.

Among these, aliphatic glycidyl ether epoxy resins having propylene glycol skeleton, an alkylene skeleton, or an oxyalkylene skeleton and the like, as the central skeleton, are preferable.

A polyfunctional glycidyl ether compound (hereinafter, also referred to as a simply "polyfunctional glycidyl ether compound") which contains a glycidyl group directly or indirectly bonded to a saturated aliphatic cyclic hydrocarbon skeleton preferable as the above-mentioned hydrogenerated epoxy compound. Specifically, hydrogenerated aromatic polyfunctional glycidyl ether compounds such as hydrogenerated bisphenol epoxy resins are preferable. These may be used singly or in combination of two or more species of them.

A hydrogenerated bisphenol A epoxy resin, a hydrogenerated bisphenol S epoxy resin, a hydrogenerated bisphenol F epoxy and the like, are more preferable. A hydrogenerated bisphenol epoxy resin, a hydrogenerated bisphenol F epoxy resin, and the like, are still more preferable. Further, completely or partly hydrogenerated aromatic epoxy compounds are preferable. Aromatic glycidyl ether compounds are included in the aromatic epoxy compound.

Alicyclic epoxy group-containing polyfunctional alicyclic epoxy compounds (hereinafter, also referred to as a "polyfunctional alicyclic epoxy compound") are preferable as the above-mentioned alicyclic epoxy compound. Specifically, an epoxy resin having an epoxycyclohexane skeleton (epoxycyclohexane group), and an epoxy resin in which an epoxy group is added to a cyclic aliphatic hydrocarbon directly or with a hydrocarbon group therebetween, are preferable. These may be used singly or in combination of two or more species of them. An epoxy resin having an epoxycyclohexane skeleton is more preferable.

Preferable examples of the above-mentioned epoxy resin having an epoxycyclohexane skeleton include 3,4-epoxycyclohexylmethyl-3,4-epoxycyclohexane carboxylate, epsilon-caprolactone-modified 3,4,-epoxycyclohexylmethyl 3',4'-epoxycyclohexane carboxylate, and bis-(3,4-epoxycyclohexyl) adipate.

Examples of alicyclic epoxy compounds other than the above-mentioned epoxy resin having an epoxycyclohexane skeleton include 1,2-epoxy-4-(2-oxilanyl)cyclohexane adduct of 2,2-bis(hydroxymethyl)-1-butanol; and alicyclic epoxides, e.g., hetero ring-containing epoxy resin such as triglycidyl isocyanurate.

Glycidyl compounds containing an aromatic conjugated system such as a bisphenol skeleton, a fluorene skeleton, a bisphenyl skeleton, a naphthalene ring, and an anthracene ring are preferable as the above-mentioned aromatic epoxy compound. These may be used singly or in combination of two or more species of them. An epoxy and/or glycidyl compound (fluorene compound) having a fluorene skeleton is more preferable. An aromatic glycidyl ether compound is still more preferable.

Use of a brominated aromatic epoxy compound can increase the refractive index, but it also increases the Abbe number slightly. Therefore, it is preferable that the brominated aromatic epoxy compound is used depending on the application.

An aromatic glycidyl ether compound is preferable as the aromatic epoxy compound. Examples of the above-mentioned aromatic glycidyl ether compound include epibis glycidyl ether epoxy resins, high molecular weight epibis glycidyl ether epoxy resins, and novolac aralkyl glycidyl ether epoxy resins.

An epibis glycidyl ether epoxy resin obtained by a condensation reaction of a bisphenol such as bisphenol A, bisphenol F, bisphenol S, and fluorene bisphenol with epihalohydrin is preferable as the above-mentioned epibis glycidyl ether epoxy resins.

A high molecular weight epibis ether epoxy resin obtained by further adding the above-mentioned epibis ether epoxy resin to the above-mentioned bisphenol such as bisphenol A, bisphenol F, bisphenol S, and fluorene bisphenol is preferable as the above-mentioned high molecular weight epibis glycidyl ether epoxy resins.

Preferable examples of the above-mentioned novolac aralkyl glycidyl ether epoxy resins include those obtained by a condensation reaction of epihalohydrin with a polyphenol obtained by a condensation reaction of a phenol such as phenol, cresol, xylenol, naphthol, resorcin, catechol, bisphenol A, bisphenol F, bisphenol S, and fluorene bisphenol with formaldehyde, acetaldehyde, propionaldehyde, benzaldehyde, hydroxy benzaldehyde, salichlaldehyde, dicyclopentadiene, terpene, coumarin, paraxylylene glycol dimethyl ether, dichroloperaxylylene, or bishydroxymethyl biphenyl.

Examples of the aromatic epoxy resins include aromatic crystalline epoxy resins obtained by a condensation reaction of epihalohydrin with tetramethylbiphenol, teteramethylbisphenol F, hydroquinone, naphthalenediol, and the like, and high molecular weight aromatic crystalline epoxy resins obtained by further adding the above-mentioned bisphenol, tetramethylbiphenol, tetramethylbisphenol F, hydroquinone, or naphthalenediol to such aromatic crystalline epoxy resins; and glycidyl ester epoxy resins obtained by a condensation reaction of epihalohydrin with tetrahydrophthalic acid, hexahydrophthalic acid, or benzoic acid. One or more species of them may be used.

In the present invention, among the above-mentioned aromatic epoxy compounds, a bisphenol A epoxy resin, a bisphenol F epoxy resin, an epoxy resin having a fluorene skeleton (fluorene epoxy resin), end an aromatic epoxy resin having a bromo substituent are preferable. A bisphenol A epoxy resin and a fluorene epoxy resin are particularly preferable. These may be used singly or in combination of two or more species of them.

Specific examples of the fluorene epoxy resin include ONCOAT EX-1020, ONCOAT EX-1010, OGSOL EG210, and OGSOL PG (trade name, each produced by Osaka Gas Chemical Co., Ltd.).

The abovementioned epoxy resins can be cured in a short time. Therefore, even if the curable resin composition for molded bodies of the present invention is cured in a short time, the effect of the present invention, that is, the effect of improving both of the demoldability and the transparency, is remarkably exhibited. Among these, a polyfunctional alicyclic epoxy compound and a polyfunctional hydrogenerated epoxy compound are preferable because the curing rate of the curable resin composition containing such a compound can be increased. In comparison to the case where other epoxy resins are used, if the polyfunctional alicyclic epoxy compound or the polyfunctional hydrogenerated epoxy compound is used, a cured product can be obtained in a shorter time as long as the catalyst amount is the same. In addition, in order to suppress deterioration of appearance, caused by photo-irradiation, the above-mentioned aliphatic glycidyl ether epoxy resin and the above-mentioned epoxy resin having an epoxycyclohexane skeleton are more preferably used.

In addition, tertiary amine-containing glycidyl ether epoxy resins which are solid at a room temperature and which are obtained by a condensation reaction of epihalohydrin with hydantoin, cyanuric acid, melamine, or benzoguanamine, may be used as the above-mentioned epoxy resin.

It is preferable that the curable resin composition of the present invention includes a thermocurable resin having an Abbe number of 45 or more. The above-mentioned thermocurable resin is not especially limited as long as the above-mentioned thermocurable resin contains a thermocurable resin having an Abbe number of 45 or more and the operation and effects of the present invention are exhibited.

The content of the above-mentioned thermocurable resin having an Abbe number of 45 or more is preferably 1% by weight or more in the entire curable resin. The content of the thermocurable resin having an Abbe number of 45 or more is more preferably 5% by weight or more and still more preferably 10% by weight or more in the entire curable resin. Particularly in an optical application in which a high Abbe number is needed, the content of the thermocurable resin having an Abbe number of 45 or more is preferably 60% by weight or more and more preferably 70% by weight or more in the entire curable resin. In an optical application in which the Abbe number may be small, the content of thermocurable resin having an Abbe number of 45 or more is preferably 1 to 70% by weight in the entire curable resin. The content of the thermocurable resin having an Abbe number of 45 or more is more preferably 10 to 60% by weight and still more preferably 20 to 50% by weight.

A cationic curable resin is more preferable and an epoxy resin is still more preferable as the above-mentioned thermocurable resin having an Abbe number of 45 or more. It is preferable that the curable resin composition including the thermocurable resin having an Abbe number of 45 or more includes a cationic curing catalyst. The cationic curing catalyst is mentioned below.

It is preferable that the above-mentioned thermocurable resin having an Abbe number of 45 or more is a compound which contains at least one cationic polymerizable group in the molecule. It is more preferable that the above-mentioned thermocurable resin having an Abbe number of 45 or more is an epoxy compound. Preferable embodiments of the above-mentioned epoxy resin having an Abbe number of 45 or more are the same as those mentioned in the above-mentioned epoxy compound.

An alicyclic epoxy compound and a hydrogenerated epoxy compound are preferable as the above-mentioned thermocurable resin having an Abbe number of 45 or more, specifically.

Among these, an alicyclic epoxy compound, a hydrogenerated bisphenol A epoxy resin, a hydrogenerated bisphenol S epoxy resin, a hydrogenerated bisphenol F epoxy resin, and the like are more preferable. An alicyclic epoxy compound is still more preferable. An alicyclic epoxy compound is also preferable in terms of stability of the curable resin-composition and curing characteristics when the composition is cured, if the above-mentioned specific silicon compound is used.

The use of the alicyclic epoxy resin as the above-mentioned epoxy resin improves the Abbe number and improves optical characteristics. Therefore, such a curable resin composition can be preferably used in various applications.

CELL-2021P, CELLOXIDE 2081, EHPE-3150 (trade name, each produced by DAICEL CHEMICAL INDUSTRIES., LTD.), and the like, are preferable as the above-mentioned alicyclic epoxy resin. Thus, according to one preferable embodiment of the present invention, the curable resin composition for molded bodies essentially includes an alicyclic epoxy resin. As long as the alicyclic epoxy resin is included in the thermocurable resin constituting the curable resin composition for molded bodies, the content thereof is not especially limited. It is preferable that the content thereof is 40% by weight or more in the entire thermocurable resin. The content is more preferably 60% by weight or more and still more preferably 80% by weight or more. Particularly preferably, the thermocurable resin is composed of substantially only the alicyclic epoxy resin. According to this, the effects of the present invention can be more sufficiently exhibited.

The thermocurable resin composition in the present invention may contain an alicyclic compound other than the epoxy compound having an Abbe number of 45 or more.

Examples of alicyclic compounds other than the above-mentioned epoxy compound having an Abbe number of 45 or more include: alicyclic modified neopentyl glycol (meth)acrylate ("R-629" or "R-644", product of NIPPON KAYAKU Co., Ltd.); alicyclic acrylates containing an oxygen atom and/or a nitrogen atom in the structure such as tetrahydrofurfuryl(meth)acrylate and morpholinoethyl(meth)acrylate; alicyclic monofunctional maleimides such as N-cyclohexyl maleimide; and alicyclic bismaleimides such as N,N'-methylenebismaleimide, N,N'-ethylenebismaleimide, N,N'-trimethylenebismaleimide, N,N'hexamethylenebismaleimide, N,N'-dodecamethylenebismaleimide, and 1,4-dimaleimide cyclohexane. These may be used singly or in combination of two or more species of them.

In order to produce a material with a high refractive index such as a material used in an optical application and the like, it is preferable that a compound which has a conjugate structure constituted by seven or more carbon atoms and a glycidyl group is used as the curable resin. A cured product with a high refractive index can be obtained by curing for a short time from the curable resin composition including the above-mentioned oxetane group as an essential component. Particularly, the above-mentioned epoxy compound having a fluorene skeleton is easily available industrially and has a high refractive index. Therefore, the effect attributed to a combination use with the oxetane compound is high. Also if the above-mentioned aromatic epoxy compound and the below-mentioned (meth)acrylate having a conjugate structure constituted by seven or more carbon atoms (fluorene skeleton structure) are used as the curable resin, a cured product with a high refractive index can be obtained.

This is mentioned below in more detail.

In the present invention, the compound which has a conjugate structure constituted by seven or more carbon atoms and a glycidyl group is a resin which has a conjugate structure constituted by seven or more carbon atoms and in which the glycidyl group causes cationic polymerization. An epoxy resin is mentioned in accordance with one preferable embodiment of this compound.

The compound which has the conjugate structure and the glycidyl group in the present invention may include another organic group as long as it includes the glycidyl group. The compound which has the conjugate structure and the glycidyl group includes at least one glycidyl group in one molecule, but preferably includes two or more glycidyl groups in one molecule. Such a compound having two or more glycidyl groups in one molecule improves mechanical strength of the cured product, advantageously. The compound more preferably includes two or three glycidyl groups, and still more preferably two glycidyl groups.

One or more species of the compound which has the conjugate structure and the glycidyl group can be used.

A conjugated system (aromatic ring) containing seven or more carbon atoms is preferable as a conjugate unit constituting the conjugate structure in the above-mentioned compound having the conjugate structure and the glycidyl group. Specifically, it is preferable that the conjugate unit has any one of the following structures represented by formulae (2-1) to (2-8).

[Formula 2]

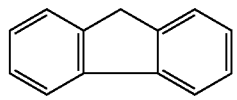

(2-1)

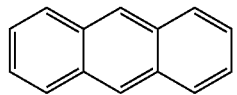

(2-2)

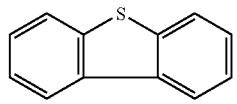

(2-3)

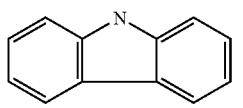 (2-4)

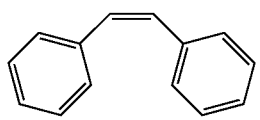 (2-5-1)

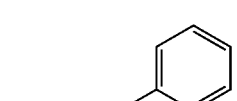 (2-5-2)

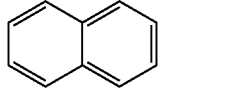 (2-6)

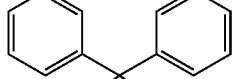 (2-7)

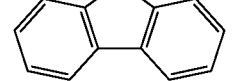 (2-8)

That is, it is preferable that the conjugate unit has any one of the following structures: a fluorene skeleton represented by the above formula (2-1) (a conjugate structure constituted by 13 carbon atoms), an anthracene ring represented by the above formula (2-2) (a conjugate structure constituted by 14 carbon atoms), a dibenzothiophene ring represented by the above formula (2-3) (a conjugate structure constituted by 12 carbon atoms), a carbazole represented by the above formula (2-4) (a conjugate structure constituted by 12 carbon atoms), stillbenes represented by the above formula (2-5-1) and (2-5-2) (a conjugate structure constituted by 14 carbon atoms), a biphenyl represented by the above formula (2-6) (a conjugate structure constituted by 12 carbon atoms), and a naphthalene ring represented by the above formula (2-7) (a conjugate structure constituted by 10 carbon atoms). Among these, it is more preferable that the conjugate structure includes fluorene, carbazole, and the like as the skeleton structure or includes an anthracene ring or a dibenzothiophene ring in order to increase the refractive index. That is, according to one preferable embodiment of the present invention, the above-mentioned conjugate structure essentially includes at least one structure selected from the group consisting of a fluorene skeleton, an anthracene ring, a dibenzothiophene ring, and a carbazole skeleton. Any of the above-mentioned conjugate structures which include the above-mentioned skeleton or ring structure can be preferably used. The structure in which bisphenol is bonded to a fluorene skeleton, represented by the above formula (2-8), (the conjugate structure constituted by 25 carbon atoms) is in accordance with a more preferable embodiment.

If the conjugate structure includes the above-mentioned compound as the skeleton structure, this skeleton structure may have a substituent as long as it is a resonating structure.

How the conjugate structure of the above-mentioned compounds and the like is counted is mentioned below, specifically.

For example, in a fluorene structure represented by the following formula (a), six-membered rings are bonded to each other, also at the thick line part. As a result, the five-membered ring which is between the aromatic rings also has a resonating structure. Therefore, the carbon circled with the dotted line is also part of the conjugate structure, and therefore, 13 carbon atoms constitute the conjugate structure. Further, as shown in a structure represented by the following formula (b) a fluorene structure is directly bonded to a benzene ring, and the conjugate structure is further extended. As a result, 25 carbon atoms constitute the conjugate structure.

In contrast, in a compound having a structure like bisphenol A, represented by the following formula (c), the central carbon is bonded to an aromatic ring, as in the fluorene ring, but the central carbon itself is not a part of the ring structure and does not have a conjugate structure. In this case, 6 carbon atoms constitute one conjugate structure.

[Formula 3]

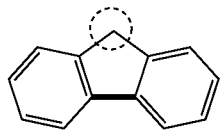 (a)

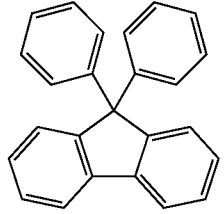 (b)

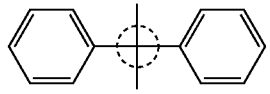 (c)

In a straight-chain compound, the number of carbons constituting one conjugate structure is 7 in each of the following structures represented by the following formulae (d) and (e)

[Formula 4]

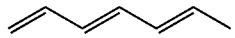 (d)

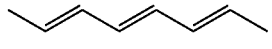 (e)

It is preferable that the above-mentioned conjugate structure essentially includes a bisphenyl skeleton structure. The compound having a conjugate structure including a bisphenyl skeleton structure has the following advantages: high refractive index; excellent heat resistance; and high transparency in a visible light region. In addition, such a compound can be used at low costs. The "compound having a conjugate structure including a bisphenyl skeleton structure" is also referred to as a "biphenyl compound", simply.

A compound represented by the following formula (3) is preferable as the above-mentioned biphenyl compound.

[Formula 5]

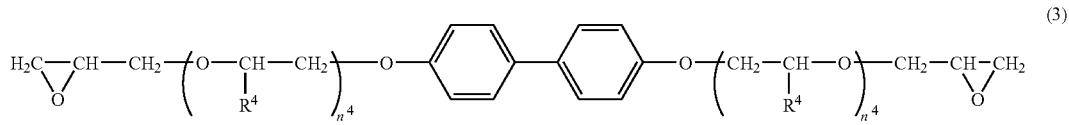

(3)

In the formula, $R^4$ are the same or different and each represent a hydrogen atom or a methyl group; $n^4$ are the same or different and each are an integer of 0 to 10.

Specifically, JER YX4000 (product of Japan Epoxy Resins Co., Ltd., a biphenyl epoxy resin) represented by the following formula (4) is preferable in order to reduce the costs.

[Formula 6]

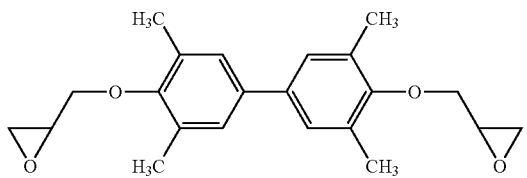

(4)

Among the above-exemplified conjugate structures, it is preferable that the above-mentioned conjugate structure essentially has a fluorene skeleton structure. The use of the compound having a conjugate structure including a fluorene skeleton structure (hereinafter, also referred to as a fluorene compound) enables a cured product obtained by curing the curable resin composition of the present invention to have a refractive index of 1.58 or more and more preferably 1.60. As a result, such a cured product can be preferably used as a lens with a high refractive index. In addition, the above-mentioned fluorene compound shows various excellent properties such as high refractive index, excellent heat resistance, and high transparency in a visible light region. Further, such a compound can be homogeneously dispersed in the composition. Therefore, such a composition can be used in various applications such as an optical application.

Compounds represented by the following formulae (5-1) and (5-2) are preferable as the above-mentioned fluorene compound.

[Formula 7]

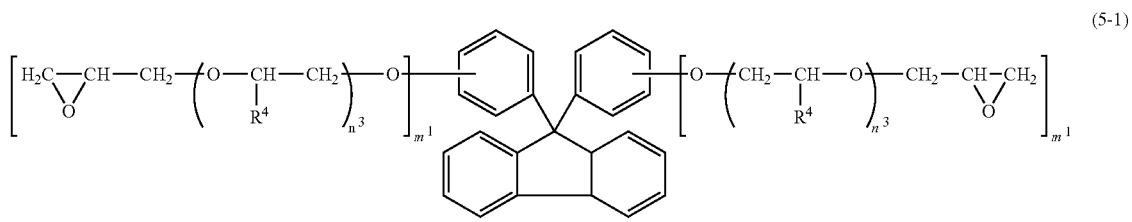

(5-1)

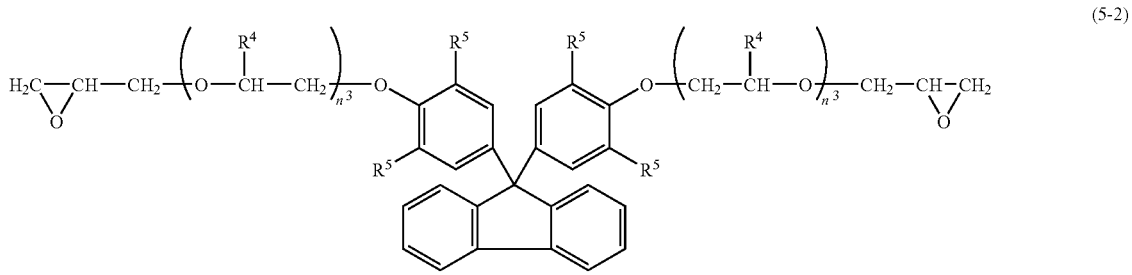

(5-2)

In the formula, $R^4$ are the same or different and each represent a hydrogen atom or a methyl group; $R^5$ are the same or different and each represent a hydrogen atom, an alkyl group containing 1 to 5 carbon atoms, a phenyl group, or a halogen atom; $m^1$ are the same or different and each are an integer of 1 to 5; $n^3$ are the same or different and each are an integer of 0 to 10.

Specifically, OGSOL EG-210 (product of Osaka Gas Chemical Co., Ltd., a fluorene epoxy resin) represented by the following formula (6) is preferable.

[Formula 8]

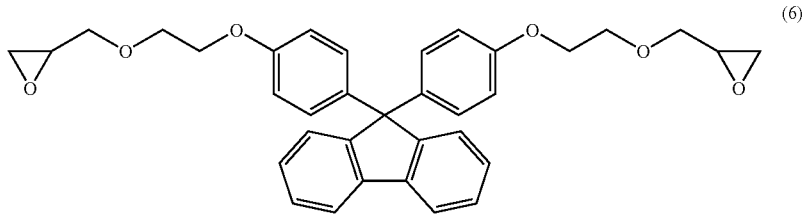

(6)

A compound having a monofunctional oxetane group and a compound having a bi- or higher functional oxetane group are mentioned as the above-mentioned compound containing an oxetane group (also referred to as an oxetane compound). Examples of the compound having a monofunctional oxetane group include: 3-ethyl-3-hydroxymethyloxetane (for example, product of UBE INDUSTRIES, LTD., trade name: EHO); 3-ethyl-3-(2-ethylhexyloxymethyl)oxetane (for example, product of TOAGOSEI CO., LTD, trade name: OXT-212); 3-ethyl-3-(phenoxymethyl)oxetane (for example, product of TOAGOSEI CO., LTD, brand name: OXT-211); 3-ethyl-3-(2-methacryloxymethyl)oxetane (for example, product of UBE INDUSTRIES, LTD., trade name: OXMA); and 3-ethyl-3-{[3'-(triethoxysilyl)propoxy]methyl}oxetane (for example, product of TOAGOSEI CO., LTD, trade name: OXT-610).

A compound represented by the following formula (7) is particularly preferable as the compound having a monofunctional oxetane group.

[Formula 9]

(7)

In the formula, $R^1$ are the same or different and each represent a hydrocarbon group containing 1 to 10 carbon atoms, an alkoxy group containing 1 to 10 carbon atoms, or a hydroxyalkylene group containing 1 to 10 carbon atoms.

In the above formula (7), the number of carbons in $R^1$ is more preferably 1 to 4, and still more preferably 1 or 2, and particularly preferably 1.

Specifically, 3-ethyl-3-hydroxymethyl oxetane represented by the following formula (8) and 3-ethyl-3-(2-ethylhexyloxymethyl)oxetane represented by the following formula (9) are preferable.

[Formula 10]

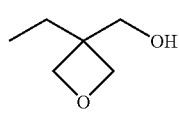

(8)

-continued

[Formula 11]

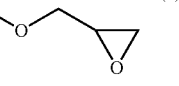

(9)

Examples of the compound having a bifunctional oxetane include:
4,4'-bis[(3-ethyl-3-oxetanyl)methoxymethyl]biphenyl (for example, product of UBE INDUSTRIES, LTD., trade name: OXBP),
1,4-bis[(3-ethyl-3-oxetanyl)methoxymethyl]benzene (for example, product of UBE INDUSTRIES, LTD., trade name: OXTP),
1,4-bis{[(3-ethyl-3-oxetanyl)methoxy]methyl}benzene (for example, product of TOAGOSEI CO., LTD, trade name: OXT-121), and di[1-ethyl(3-oxetanyl)]methyl ether (for example, product of TOAGOSEI CO., LTD, trade name: OXT-221).

A compound represented by the following formula (10) is preferable as the compound having a bifunctional oxetane.

[Formula 12]

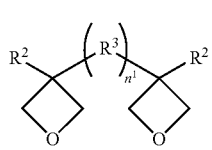

(10)

In the formula, $R^2$ are the same or different and each represent a hydrocarbon group containing 1 to 10 carbon atoms, an alkoxy group containing 1 to 10 carbon atoms, or a hydroxyalkylene group containing 1 to 10 carbon atoms; and $R^3$ represents a bivalent organic group containing 1 to 30 carbon atoms; and $n^1$ is an integer of 1 to 20.

The number of carbons in $R^2$ is more preferably 1 to 4, and still more preferably 1 or 2, and particularly preferably 1.

As the compound represented by the formula (10), 4,4'-bis[(3-ethyl-3-oxetanyl)methoxymethyl]biphenyl represented by the following formula (11), which is the compound including the conjugate structure constituted by seven or more carbon atoms and the oxetane group, is preferable.

[Formula 13]

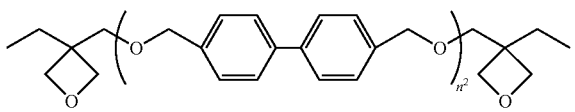

(11)

In the formula, $n^2$ is an integer of 1 to 10.

Silsesquioxane which contains an oxetane group such as oxetanylsilsesquioxane is mentioned as the oxetane compound.

Specific examples of the compound represented by the above formula (10) or (11) include: 3-ethyl-3-hydroxymethyloxetane, 3-ethyl-3-(2-ethylhexyloxymethyl)oxetane, 3-ethyl-3-(2-phenoxymethyl)oxetane, 1,4-bis{[(3-ethyl3-3oxetanyl)methoxy]methyl}benzene, and di[1-ethyl(3-oxetanyl)]methyl ether. Among these, 3-ethyl-3-hydroxymethyloxetane, 3-ethyl-3-(2-ethylhexyloxymethyl)oxetane, 3-ethyl-3-(2-phenoxymethyl)oxetane, and the like, are preferable.

It is preferable that the curable resin composition of the present invention essentially includes a monofunctional oxetane group among the above-mentioned oxetane compounds. If a bi- or higher functional oxetane group is included, the viscosity in the resin is increased because the oxetane monomer includes two or more polymerizable groups, which leads to deterioration of workability. Accordingly, the curing rate can be more increased if the oxetane group is a monofunctional one. The above-mentioned monofunctional oxetane group is preferable.

The content of the oxetane compound in the curable resin composition for molded bodies of the present invention is preferably 20% by weight or less relative to the total weight of the compound including the conjugate structure, constituted by seven or more carbon atoms and the glycidyl group, and the oxetane compound. If the content of the oxetane compound is 20% by weight or more, the refractive index of the cured product of the curable resin composition might be reduced. The content of the oxetane compound is more preferably 10% by weight or less and still more preferably 5% by weight or less.

As mentioned above, if the fluorene compound is used as the curable resin, a cured product (molded body) with a high refractive index can be obtained. In addition, the resin composition is possibly thickened if containing the fluorene compound. However, if the resin composition also includes the above-mentioned oxetane compound, the polymerization of the fluorene compound is accelerated and thereby the viscosity can be decreased. As a result, the curing rate of the resin composition can be increased and the productivity of the cured product (molded body) can be improved. In addition, if the oxetane compound is included, a cured product excellent in surface smoothness and glossiness can be produced. Further, for example, in comparison to the case where only the epoxy resin is used as the compound having a conjugate structure and a glycidyl group, a cured product excellent in toughness and ductility can be obtained.

Thus, according to one preferable embodiment of the present invention, the resin composition includes both of the epoxy compound having the conjugate structure such as a fluorene skeleton structure and the oxetane compound.

If the material with a high refractive index is obtained as mentioned above, according to one preferable embodiment of the present invention, the above-mentioned aromatic epoxy compound and the above-mentioned (meth)acrylate having a conjugate structure constituted by seven or more carbon atoms, especially, a fluorene skeleton structure are used as the curable resin.

The above-mentioned aromatic epoxy compound generally has a high refractive index and therefore it can be preferably used to produce a cured product with a high refractive index. However, the curing rate of the aromatic epoxy compound is low, and therefore the moldability is slightly insufficient. In contrast, the above-mentioned (meth)acrylate having a conjugated structure constituted by seven or more carbon atoms, particularly a fluorene skeleton structure, is a resin which has a high refractive index and also has a high curing rate. This is because an electron density of a substance is increased due to the existence of the conjugate structure.

In the present invention, the resin composition includes a specific compound and a specific demolding agent, as mentioned above, and therefore, the moldability can be improved. However, in addition to this, a curable resin composition for molded bodies, which has a high refractive index, a high curing rate, and an excellent moldability, can be obtained if the above-mentioned aromatic epoxy compound and the above-mentioned (meth)acrylate having a conjugate structure constituted by seven more carbon atoms, particularly a fluorene skeleton structure, are used as the curable resin. Further, such a curable resin composition for molded bodies can provide a cured product with a refractive index, and the cured product can be particularly preferably used in an optical application and the like.

Thus, the curable resin composition which has a high refractive index, a high curing rate, and an excellent formability can be obtained. According to one preferable embodiment of the present invention, the aromatic epoxy compound and the above-mentioned (meth)acrylate including a conjugate structure having a fluorene skeleton structure are used as the curable resin.

It is preferable that the above-mentioned (meth)acrylate having a conjugate structure constituted by seven or more carbon atoms includes two or more acrylic groups in one molecule. Such a (meth)acrylate containing two or more acrylic groups is advantage in terms of improvement in mechanical strength of a cured product. The compound more preferably includes two or three acrylic groups, and still more preferably two acrylic groups.

The above-mentioned (meth)acrylate having a conjugate structure constituted by seven or more carbon atoms means (meth)acrylate in which one conjugate unit includes seven or more carbon atoms, that is, (meth)acrylate in which seven or more carbon atoms belong to an atomic group which is to constitute one conjugate unit and at least one such conjugate structure is included.

It is preferable that the conjugate unit include a conjugate double bond. More preferably, an aromatic ring is included in the conjugate structure. That is, it is more preferable in the (meth)acrylate having a conjugate structure constituted by seven or more carbon atoms that seven or more carbon atoms constitute the conjugate structure and an aromatic ring is included. If the (meth)acrylate is a compound having an aromatic ring, a cured product having a high refractive index can be obtained. In the present description, (meth)acrylate means an ester of acrylic acid or methacrylic acid and includes at least one acryloyl group or methacryloyl group in one molecule.

The conjugate unit includes at least two double bonds and one single bond, if the conjugate double bond is exemplified. In the present invention, a structure unit including all of the double bond and the single bond which can be conjugated is defined as one conjugate unit, and the carbon number is counted. In a bond structure including this structure unit, one unit in the part which involves resonance is defined as one conjugate unit. Preferable embodiments of the conjugate unit are as mentioned above.

It is particularly preferable that the conjugate structure is a fluorene compound among the abovementioned compounds. The use of the compound having a conjugate structure including a fluorene skeleton structure enables the cured product obtained by curing the curable resin composition of the present invention to have a refractive index of 1.60 or more.

Compounds represented by the following formulae (12-1) and (12-2) are preferable as the above-mentioned fluorene compound.

[Formula 14]

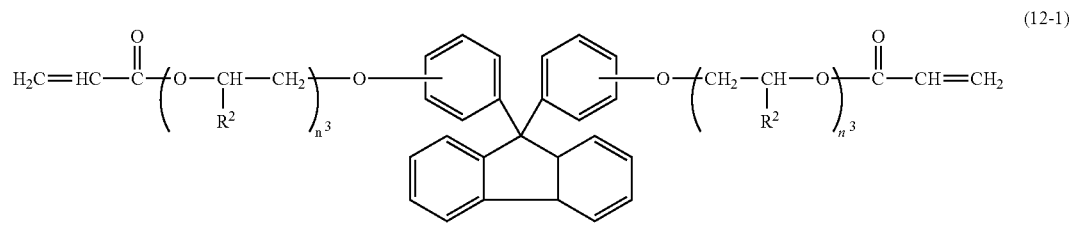

(12-1)

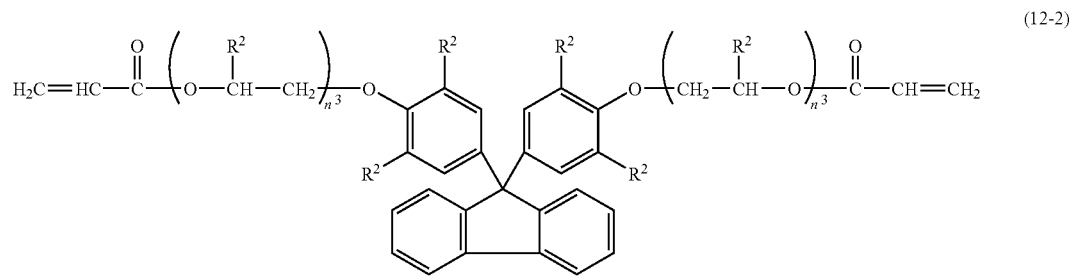

(12-2)

In the formula, $R^2$ are the same or different and each represent a hydrogen atom or a methyl group; $R^2$ are the same or different and each represent a hydrogen atom, an alkyl group containing 1 to 5 carbon atoms, a phenyl group, or a halogen atom; and $n^3$ are the same or different and each are an integer of 0 to 10.

OGSOL EA-0200 (product of Osaka Gas Chemical Co., Ltd., a fluorene epoxy resin) represented by the following formula (13) is more preferable.

[Formula 15]

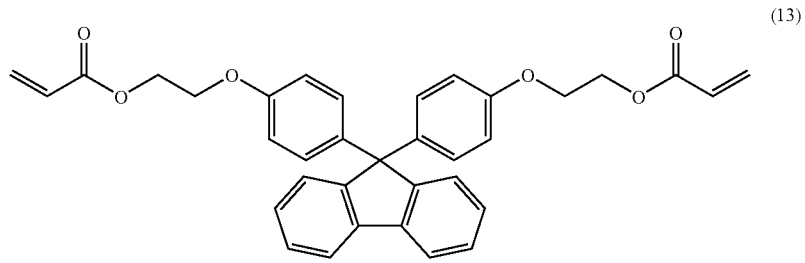

(13)

Ogsol acrylate such as OGSOL EA-0200 includes bisaryl fluorene as a basic structure and it is advantage in terms of high refractive index, low curing shrinkage, and high transparency.

A compound represented by the following formula (14) is mentioned as the (meth)acrylate which includes a biphenyl skeleton as the conjugate structure.

[Formula 16]

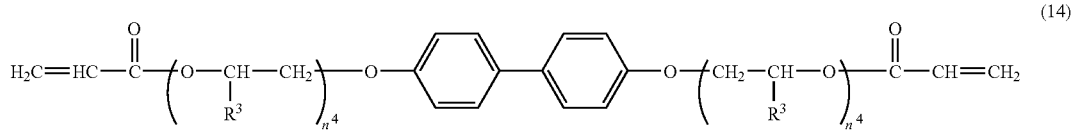

(14)

In the formula, $R^3$ are the same or different and each represent a hydrogen atom or a methyl group; $n^4$ are the same or different and each are an integer of 0 to 10.

If the above-mentioned curable resin composition includes the compound having a biphenyl skeleton as the conjugate structure, the content of the biphenyl compound in the curable resin composition is preferably 30% by weight or more relative to 100% by weight of the entire (meth)acrylate having the conjugate structure. The content is more preferably 35% by weight or more and still more preferably 40% by weight or more.

In the embodiment in which the curable resin composition of the present invention includes the aromatic epoxy compound and the (meth)acrylate having a conjugate structure as the curable resin, it is preferable that the total content of the both compounds accounts for 90% by weight or more relative to 100% by weight of the curable resin. If the total content is less than 90% by weight, a cured product having a high refractive index which is particularly needed in an optical application and the like is hard to obtain. The total content is more preferably 95% by weight or more, and still more preferably 98% by weight or more, and particularly preferably 100% by weight (that is, an embodiment in which the curable resin is constituted by the aromatic epoxy compound and the (meth)acrylate having a conjugate structure or an embodiment in which the curable resin is essentially composed of the both compounds). According to the above-mentioned embodiment, it is preferable that the content of the (meth) acrylate is 10 to 90% by weight relative to 100% by weight of the total content of the both compounds. If the content of the (meth)acrylate is less than 10% by weight, a cured product having a high refractive index which is particularly needed in an optical application and the like is hard to obtain. If the content of the (meth)acrylate is more than 90% by weight, the viscosity of the composition is increased, and therefore the molding might be hard to accurately perform or the workability might be reduced. It is more preferable that the content of the (meth)acrylate is 20 to 80% by weight.

A radical curing catalyst (thermal-latent radical curing catalyst, a photolatent radical curing catalyst, and the like) is needed to polymerize the (meth)acrylate having a conjugate structure constituted by seven or more carbon atoms. In the present invention, in order to allow a cationic curing reaction and a radical polymerization reaction to proceed, a cationic curing catalyst (a thermal-latent cationic curing catalyst, a photolatent cationic curing catalyst) and a radical during catalyst are used in combination.

It is preferable that the content of the radical curing catalyst in the curable resin composition of the present invention is 0.001% by weight or more relative to 100% by weight of the curable resin composition, in terms of yield and economic efficiency. The content is more preferably 0.005% by weight or more, and still more preferably 0.01% by weight or more, and particularly preferably 0.1% by weight or more. Further, the content is preferably 30% by weight or less, and more preferably 20% by weight or less, and still more preferably 15% by weight or less, and particularly preferably 10% by weight or less.

The above-mentioned radical curing catalyst is not especially limited as long as it is a compound which generates a radical to initiate polymerization of the above-mentioned curable resin composition. Specific examples of the thermal-latent radical curing catalyst include: azo initiators such as 2,2'-azobis-(2-methylbutylonitrile), 2,2'-azobisisobutylonitrile, 2,2'-azobis(2,4-dimethylvaleronitrile), methyl 2,2'-azobis-2-methylpropionate, methyl 2,2'-azobisisobutyrate; 2,2'-azobis-2-methylvaleronitrile, 1,1'-azobis-1-cycloheptanenitrile, 1,1'-azobis-1-phenyl ethane, and phenylazo triphenylmethane; peroxide initiators such as benzoyl peroxide, acetyl peroxide, tert-butylperoxide, propionyl peroxide, lauroyl peroxide, tert-butyl peracetate, tert-butyl perbenzoate, tert-butyl hydroperoxide, tert-butyl peroxypivalate, 1,1-bis(t-butylperoxy)-3,3,5-trimethylcyclohexane, and t-butylperoxy-2-ethylhexanoate. Among these, the peroxide initiators are particularly preferable. Specifically, PERBUTYL O (product of NOF Corp., a radical generator) is preferably used, for example.

According to one preferable embodiment of the present invention, the above-mentioned radical curing catalyst is a photolatent radical curing catalyst. Examples of the photolatent radical curing catalyst include: acetophenones such as diethoxyacetophenone, 2-hydroxy-2-methyl-1-phenylpropane-1-one, benzyl dimethyl ketal, 4-(2-hydroxyethoxy)phenyl-(2-hydroxy-2-propyl)ketone, 1-hydroxycyclohexyl phenyl ketone, 2-methyl-2-morpholino(4-thiomethylphenylpropane-1-one, 2-benzyl-2-dimethylamino-1-(4-morpholinophenyl)butanone, and 2-hydroxy-2-methyl-1-[4-(1-methylvinyl)phenyl]propane oligomer; benzoins such as benzoin, benzoin methyl ether, benzoin ethyl ether, benzoin isopropyl ether, and benzoin isobutyl ether; benzophenones such as benzophenone, methyl o-benzoylbenzoate, 4-phenylbenzophenone, 4-benzoyl-4'-methyl-diphenylsulfide, 3,3',4,4'tetra(t-butylperoxylcarbonyl)benzophenone, 2,4,6-trimethyl benzophenone, 4-benzoyl-N,N-dimethyl-N-[2-(1-oxo-2-propenyloxy)ethyl] benzenemethanaminium bromide, and (4-benzoylbenzyl)trimethylammonium chloride; and thioxanthones such as 2-isopropylthioxanthone, 4-isopropylthioxanthone, 2,4-dichlorothioxanthone, 1-chloro-4-propoxythioxanthone, and 2-(3-dimethylamino-2-hydroxy)-3,4-dimethyl-9H-thioxanthone-9-one mesochloride. Among these, the acetophenones and the benzophonenes are preferable. 2-methyl-2-morpholino(4-thiomethylphenyl)propane-1-one is more preferable.

The curable resin composition for molded bodies of the present invention may include metal oxide particles to control the refractive index or the Abbe number if the curable resin composition further includes the above-mentioned cationic curing catalyst to be a cationic curable resin composition.

The above-mentioned metal oxide particles may be in any form of a single oxide, and a solid solution, and a composite oxide. One or more species may be used. Further, it is more preferable that the cationic curable resin composition is attributed to crystals of these metal oxide particles in terms of X-ray diffraction or electron diffraction.

It is preferable that the primary particle diameter (crystallite diameter, specific surface area diameter) of the above-mentioned metal oxide particles is less than 50 nm. If the primary particle diameter is 50 nm or more, the transparency might be deteriorated. The primary particle diameter is more preferably less than 20 nm and still more preferably less than 15 nm, and particularly preferably less than 10 nm. If the resin composition is used in an optical application, generally, the resin composition needs to essentially include fine particles in order to obtain sufficient transparency. In the present invention, the metal oxide particles have the particle diameter within the above-mentioned range. Therefore, such a resin composition can be preferably used in an optical application and the operation and effects of the present invention can be sufficiently exhibited.

In the case that the curable resin composition is used in an optical application such as a lens, in which both of the refractive index and the Abbe number need to be satisfied, the below-mentioned thermal-latent radical curing catalyst is preferably used together if the curing is performed by thermal curing, and the below mentioned photolatent radical curing catalyst is preferably used together if the curing is performed by photocuring.

In addition, the above-mentioned cationic curing resin is preferable as the curable resin.

The content of the metal oxide in the curable resin composition for molded bodies of the present invention is preferably 1% by weight or more and 80% by weight or less relative to the entire thermocurable resin composition. If the content of the metal oxide is less than 1% by weight, the above-mentioned effects, e.g., control of the refractive index such as an improvement in refractive index, the control of the Abbe number, can be insufficiently obtained. If the content of the metal oxide is more than 80% by weight, a cured product of the curable resin composition might have a low mechanical strength such as elasticity. Accordingly, the content of the metal oxide is more preferably 5% by weight or more and 70% by weight or less, and still more preferably 5% by weight or more and 60% by weight or less.

It is preferable that the above-mentioned metal oxide particles are particles of the following oxide with a high refractive index. If such an oxide with a high refractive index is used, both of the curable resin composition including such metal oxide particles and a cured product (molded body) of the curable resin composition have a high refractive index, and they can be preferably used in an optical application and the like.

It is preferable that the above-mentioned metal oxide particles have a refractive index of 1.9 or more. If the metal oxide particles have a refractive index of less than 1.9, the refractive index of the curable resin composition might be insufficiently increased. However, if the metal oxide particles have a refractive index of 1.9 or more, the curable resin composition can be preferably used in an optical application. The refractive index is more preferably 2.0 or more and still more preferably 2.1 or more. Specifically, the refractive index is 1.9 to 2.7.

Specifically, preferable examples of the metal oxide particles having a refractive index of 1.9 to 2.7 include metal oxide particles (metal oxide particles with a high refractive index) which includes at least one metal component selected from the group consisting of titanium (Ti), zirconium (Zr), zinc (Zn), niobium (Nb), yttrium (Y), lanthanum (La), indium (In), and tin (Sn).

More preferable examples of the above-mentioned metal oxide particles with a high refractive index include titanium oxide, zirconium oxide, zinc oxide, niobium oxide, yttrium oxide, lanthanum trioxide, indium oxide, and tin oxide. Among these, titanium oxide, zirconium oxide, zinc oxide, and niobium oxide are preferred. Zirconium oxide is particularly preferable.

The refractive index of the zirconium oxide varies depending on its crystal system, but it is as high as 2.0 to 2.3. In addition, the zirconium oxide has a transmittance for visible light or a UV ray having a long wavelength, and therefore it is a substance with a low photocatalyst activity. Accordingly, if the resin composition includes such zirconium oxide, the matrix resin component of the cured product is hardly photo-deteriorated, advantageously. Therefore, the zirconium oxide is suitably used in the curable resin composition for a lens with a high refractive index.

The above-mentioned metal oxide particles with a high refractive index are useful when being contained in the curable resin composition as an additive for improving the refractive index and controlling the Abbe number of an optical material such as a lens. However, in an embodiment in which these metal oxide particles are added into a conventional curable resin, the curing rate of the curable resin is influenced, and therefore the curing of the curable resin might not proceed depending on the species of the metal oxide. For example, if a metal oxide including titanium (Ti), zirconium (Zi), or zinc (Zn) as the metal component and the epoxy resin that is a curable resin are used in combination, the curing does not proceed, and therefore it is difficult to form a cured product with a practical productivity. In the present invention, if the curable resin composition essentially includes a compound including two or more specific cationic polymerizable groups as the curable resin and further includes the below-mentioned radical curing catalyst, the curable resin composition can obtain excellent curability and a high refractive index.

The above-mentioned compound including two or more specific cationic polymerizable groups is a compound which includes two or more cationic polymerizable groups each containing two or more of at least one species selected from the group consisting of an oxetane group, an epoxycyclohexane group, a dioxolane group, $R^1R^2$—C=C—O group ($R^1$ and $R^2$ are the same or different and each represent a hydrogen atom or an alkyl group), and a styryl group. If the cationic curable resin includes two or more cationic polymerizable groups, the curing rate is increased and the mechanical strength of the molded body can be exhibited, advantageously. The cationic curable resin includes two or more cationic polymerizable groups, and preferably two to four, and more preferably two or three, and still more preferably two cationic polymerizable groups.

With regard to $R^1R^2$—C=C—O group mentioned in the above-mentioned cationic polymerizable group, $R^1$ and $R^2$ are the same or different and represent a hydrogen atom or an alkyl group. If $R^1$ and $R^2$ are alkyl groups, a straight-chain or branched alkyl group containing 2 to 5 carbon atoms is preferable. An isopropenyl ether group and a vinyl ether group are more preferable and a vinyl ether group is still more preferable.

A styryl group and the like is preferable as the above-mentioned group which includes one or more double bonds and one or more benzene rings.

Specific examples of the above-mentioned cationic polymerizable compounds including two or more cationic polymerizable groups in one molecule include: alicyclic epoxy resins such as CELLOXIDE 2021P (product of DAICEL CHEMICAL INDUSTRIES., LTD.); oxetane resins (the below-mentioned oxetane group-containing compound) such as Eternacoll®OXBP; and divinyl ethers such as cyclohexane dimethanol divinyl ether (product of Nippon Carbide Industries Co., Inc.). Alicyclic epoxy resins, oxetane resins, and cyclohexane dimethanol divinyl ethers are more preferable.

If the curable resin composition for molded bodies of the present invention includes the above-mentioned metal oxide with a high refractive index to be a curable resin composition with a high refractive index, it is preferable that a cationic curable compound with a high refractive index is used as the curable resin. The above-mentioned aromatic epoxy compound is preferable as the cationic curable compound with a high refractive index. Among these, the aromatic epoxy compound having an aromatic ring-containing structure that is a conjugate structure constituted by seven or more carbon atoms is preferable, and the epoxy compound having a fluorene skeleton is particularly preferable.

Thus, according to one preferable embodiment of the curable resin composition with a high refractive index, the curable resin composition includes metal oxide particles with a high refractive index and essentially includes, as the curable resin, the above-mentioned compound including two or more specific cationic polymerizable groups and the above-mentioned cationic curable compound with a high refractive index.

"Flexible Component"

The above-mentioned curable resin composition for molded bodies may appropriately contain a flexible component in order to improve the mechanical strength, and the like, unless the effects of the present invention are sacrificed. If including a flexible component, the resin composition can be a unified composition. Both of an embodiment (1) in which the flexible component is a compound different from the above-mentioned epoxy resin and an embodiment (2) in which one species of the epoxy resin is a flexible component may be preferably applied to the above-mentioned flexible component.

The content of the flexible component is not especially limited and it can be appropriately determined. The content is generally selected from 0.01 to 50% by weight, and preferably selected from 0.1 to 20% by weight, relative to 100% by weight of the curable resin composition for molded bodies.

Specifically, the following compound is mentioned as the above-mentioned flexible component: a compound having an oxyalkylene skeleton represented —[—$(CH_2)_n$—O—]$_m$— (n representing an integer of 2 or more, m representing an integer of 1 or more, and preferably, n representing an integer of 2 to 12, m representing an integer of 1 to 1000, and more preferably, n representing an integer of 3 to 6, and m representing an integer of 1 to 20). A compound which has an oxyalkylene skeleton and an epoxy group is preferable as the above-mentioned flexible component. Among these, a compound which has an oxybutylene skeleton and an epoxy group is preferable. As an industrial product of such a compound, YL-7170, product of Japan Epoxy Resins Co., Ltd.; (epoxy equivalent: 437, a liquid epoxy resin) is mentioned.

The following epoxy compounds area preferable as the flexible component. Hydrogenated epoxy compounds such as YL-7170 (YX-8040) produced by Japan Epoxy Resins Co., Ltd. (epoxy equivalent: 1000, a hydrogenated bisphenol epoxy resin); aromatic epoxy compounds such as JER 1007 produced by Japan Epoxy Resins Co., Ltd. (epoxy equivalent: 1750 to 2200, a bisphenol A epoxy resin); high molecular weight alicyclic solid epoxy resins such as EHPE3150 (solid state at a normal temperature) produced by DAICEL CHEMICAL INDUSTRIES., LTD.; and epoxy resins which contains a total of 4 or more carbon atoms and has an alkylene skeleton such as CELLOXIDE 2081 (liquid state at a normal temperature) produced by DAICEL CHEMICAL INDUSTRIES., LTD. YL-7170 (YX-8040) and JER 1007, each produced by Japan Epoxy Resins Co., Ltd., are preferably used because each has a high molecular weight.

In addition, liquid rubbers such as a liquid nitrile rubber, polymer rubbers such as polybutadiene, and fine particle rubbers having a particle diameter of 100 nm or less are preferable as the flexible component.

A compound containing a curable functional group at an end or in a side chain or a skeleton in the main chain is more preferable.

Thus, according to one preferable embodiment of the present invention, the curable resin composition for molded bodies includes a curable functional group as the above-mentioned flexible component. The above-mentioned "curable functional group" means a thermocurable or photocurable functional group such as an epoxy group (a group causing curing reaction of the resin composition).

An epoxy resin is preferable, and an epoxy resin having an oxybutylene skeleton is more preferable, as the compound containing a curable functional group.

As mentioned above, it is preferable that the curable resin composition for molded body of the present invention includes a flexible component. An embodiment in which the curable resin composition includes an alicyclic curable substance containing a flexible material (preferable, epoxy) is more preferable. An epoxy resin is particularly preferable as the flexible component.

The average number of epoxy groups per molecule of the above-mentioned epoxy resin is generally two, but in some cases, it may be three or more.

An embodiment in which a curable resin composition for molded products, including the thermocurable resin, is obtainable using two or more different thermocurable resins is preferable as the above-mentioned curable resin composition for molded bodies. Such a resin composition in accordance with such an embodiment can be continuously produced and can be unified when being cured. Further, such a composition has a high strength and shows high transparency and heat resistance. Such a curable resin composition for molded bodies, having such characteristics, can be preferably used as an optical material, and for example, it can provide a thermocurable material having a transmittance of 80% or more at 500 nm, which is useful as a lens material.

It is preferable that with regard to the above-mentioned two or more different thermocurable resins, one is a thermocurable resin having a molecular weight of 700 or more and the other is a thermocurable resin whose molecular weight is less than the molecular weight of the above-mentioned thermocurable resin. Especially, it is more preferable that one is a thermocurable resin having a molecular weight of 700 or more and the other is a thermocurable resin having a molecular weight of less than 700. It is preferable that the curable resin composition for molded bodies includes these two or more different thermocurable resins. If the curable resin composition essentially includes a thermocurable resin having a molecular weight of 700 or more (high molecular weight organic resin, polymer material) and a thermocurable resin having a molecular weight of less then 700 (low molecular weight organic resin, low molecular material), an effect of reducing the viscosity during the production and improving the mechanical strength of the product can be obtained.

It is preferable that the above-mentioned curable resin composition for molded bodies includes a polymer material and a low molecular material. As a method of preparing the curable resin composition including a polymer material and a low molecular material, a method of mixing a low molecular material (and if necessary, other components) with the curable resin composition and adding a polymer material thereinto is preferably used. According to this method, a preferable resin composition can be obtained without an increase in viscosity of the curable resin composition for molded bodies. Further, the polymer material can be more compatible with the resin composition. Thus, the preferable embodiments of the present invention include a production method of a curable resin composition for molded bodies, the curable resin composition including a thermocurable resin, wherein the production method includes a step of mixing two or more thermocurable resins. This production method more preferably has an embodiment in which the above-mentioned two or more different thermocurable resins essentially include a thermocurable resin having a molecular weight of 700 or more (polymer material) and a thermocurable resin having a molecular weight of less than 700 (low molecular material). The above-mentioned molecular weight is preferably measured by the above-mentioned method.

With each proportion (by weight) of the polymer material having a molecular weight of 700 or more and the low molecular material having a molecular weight of less than 700, the proportion of the polymer material having a molecular weight of 700 or more is preferably 10 to 90% relative to the entire resin composition. The proportion of the polymer material is more preferably 20 to 80% and still more preferably 30 to 70%.

It is preferable that the above-mentioned two or more thermocurable resins are two or more different epoxy resins. Among these, an alicyclic epoxy resin is included as the two or more different thermocurable resins.

"Small Abbe Number and High Refractive Index"

It is preferable that a thermocurable resin having many unsaturated bonds is used if the above-mentioned resin composition and the above-mentioned molded body need to have a small Abbe number and a high refractive index. That is, a curable resin composition including a thermocurable resin, wherein the curable resin composition has an unsaturated bond amount of 40% by weight or more relative to 100% by weight of a cured body of the composition, is preferable.

The "unsaturated bond amount" used herein means a total amount of unsaturated bonds contained in the cured body. If a component other than the thermocurable resin (another component) contains an unsaturated bond, the amount of the unsaturated bond contained in the another component is also included in the above-mentioned total amount.

It is preferable that the resin composition has an unsaturated bond of 40% by weight or more relative to 100% by weight of a cured body of the composition (also referred to as "cured product"). The unsaturated bond amount used herein means the total weight of the following atoms which form the unsaturated bond: a carbon atom, a sulfur atom, a nitrogen atom, a boron atom, a silicon atom, a phosphorus atom, a germanium atom, an oxygen atom; and hydrogen and halogen atoms which are added to these atoms. That is, the unsaturated bond amount means the total weight of: atoms forming the unsaturated bond contained in 100% by weight of the cured body; and hydrogen and halogen atoms which are bonded to the atoms. Specifically, the unsaturated bond amount means the total weight at CH=CCl part if the resin composition has a structure of —CH$_2$CH$_2$CHCl—CH=CCl—CH$_2$CH$_2$—.

If the carbon atom forms an aromatic ring, the unsaturated bond amount represents an amount % by weight of an aromatic ring contained in 100% by weight of the cured body. That is, if the aromatic ring has a substituent, the weight of the substituent not containing an unsaturated bond is not included, and only the weight of the aromatic ring constituted by a carbon atom and a hydrogen atom is included in the total weight of the unsaturated bond, and in such a manner, the total amount of the unsaturated bond is calculated. If a halogen atom is bonded to the aromatic ring as a substituent, the total weight of the unsaturated bond, which includes the weight of the halogen atoms, is calculated based on the above-mentioned definition. In the present invention, an embodiment in which the unsaturated bond is constituted by an aromatic ring is one of the preferable embodiments.

With respect to the above-mentioned thermocurable resin, it is preferable that the thermocurable resin essentially contains the aromatic ring; an amount of the aromatic ring is preferably 40% by weight or more relative to 100% by weight of a cured body of the composition; and the thermocurable resin has an Abbe number of 35 or less. The "Abbe number of 35 or less" means that "an average value of the Abbe number in the entire thermocurable resin is 35 or less", and a thermocurable resin having an Abbe number of more than 35 may be included. If a curable resin composition having an Abbe number is produced, it is preferable that the curable resin composition essentially includes a thermocurable resin having a low Abbe number of 45 or more and that an average value of the Abbe number in the entire thermocurable resin is 35 or less. As mentioned above, it is preferable that the thermocurable resin includes a thermocurable resin having an Abbe number of 45 or more as a component. If the thermocurable resin contains no thermocurable resin having an Abbe number of 45 or more, the cationic curing rate is not improved, possibly resulting in insufficient productivity. The proportion of the thermocurable resin having an Abbe number of 45 or more is preferably 1% by weight or more relative to 100% by weight of the thermocurable resin. The proportion is more preferably 5% by weight or more, and still more preferably 10% by weight or more, and particularly preferably 20% by weight or more.

In the present invention, if having an Abbe number of 35 or less (the average value of the Abbe number in the entire thermocurable resin is 35 or less), the curable resin composition can exhibit excellent optical characteristics in an optical application.

If the thermocurable resin has an Abbe number of more than 35, a degree of light scattering might not be large. Therefore, a curable resin composition including such a thermocurable resin might insufficiently exhibit various optical characteristics and therefore it might not be suitably used as a material in various optical applications. If the curable resin composition of the present invention is cured to be used as an optical member (for example, lens), the effects attributed to the Abbe number of 35 or less is remarkably exhibited. Specifically, if the optical member (lens) having a small Abbe number of the present invention and a lens having a large Abbe number are used in combination, effects such as reduction in degree of light scattering, increase in resolution, and no blurring (no occurrence of aberration) can be obtained. Such excellent optical characteristics are remarkably exhibited as a difference in Abbe number between lenses used in combination is large. The difference in Abbe number between the lenses is preferably 20 or more, and commonly within a range of 20 to 70. Lenses having an Abbe number of 20 to 40 are mainly used as the lens having a large Abbe number. Therefore, it is difficult to use lenses having different Abbe numbers by 20 or more together. It is effective that one lens has a smaller Abbe number in order to increase the difference in Abbe number as much as possible. As mentioned above, if a plurality of lenses is used in combination in an optical application, it is preferable that a difference in Abbe number among the lenses is large. If a lens having an Abbe number of 33.5 and a lens having an Abbe number of 36.3 are used, a difference in Abbe number between these lenses is 2.8. Even if the difference in Abbe number is about 2.8, a remarkable difference in effects might be generated in an optical application.

The above-mentioned Abbe number can be evaluated with a refractometer. It is preferable that the Abbe number is evaluated at 20° C. using DR-M2 (refractometer, trade name, product of ATAGO CO., LTD.) as the refractometer.

With regard to the above-mentioned thermocurable resin, the Abbe number can be decreased to 35 or less by appropriately combining the below-mentioned preferable embodiments. The above-mentioned Abbe number is preferably 35 or less, and more preferably 34 or less, and still more preferably 33.5 or less, and particularly preferably 30 or less. As mentioned above, the above-mentioned thermocurable resin is not especially limited as long as it has an Abbe number of 35 or less (the average value of the Abbe number in the entire curable resin is 35 or less). It is preferable that the thermocurable having an Abbe number of 35 or less accounts for 40% by weight or more in the entire thermocurable resin. The proportion of the thermocurable resin having an Abbe number of 35 or less is more preferably 60% by weight or more, and still more preferably 80% by weight or more. The upper limit thereof is 99% by weight.

As the above-mentioned thermocurable resin having an Abbe number of 35 or less, polyphenol compound, a polymerizable unsaturated bond-containing compound, and an aromatic epoxy (also, referred to as an "aromatic epoxy compound") may be used singly or in combination of two or more species of them. Among these, it is preferable that the aromatic epoxy compound is essentially used because a curable resin composition having excellent optical characteristics can be produced and such a composition can be preferably used in various applications. Thus, the preferable embodiments of the present invention include the above-mentioned, curable resin composition in which the above-mentioned thermocurable resin essentially includes an aromatic epoxy compound.

A polyphenol compound having a structure in which aromatic skeletons each containing at least one phenol hydroxyl group are bonded with an organic skeleton containing a total of two or more carbon atoms can be preferably used as the above-mentioned polyphenol compound. With regard to the above-mentioned polyphenol compound, the aromatic skeleton is an aromatic ring containing at least one phenol hydroxyl group. This aromatic skeleton is a site having a phenol structure and the like. Phenol, hydroquinone, naphthol, anthracenol, bisphenol, biphenol, structures are preferable. Among these, a phenol structure is preferable. The site having a phenol structure and the like may be appropriately substituted by an alkyl group, alkylene group, an aralkyl group, a phenol group, and a phenylene group.

With regard to the above-mentioned polyphenol compound, the organic skeleton means a site which bonds the aromatic ring skeletons constituting the polyphenol compound to each other and which essentially includes carbon atoms. It is preferable that the organic skeleton containing a total of 2 or more carbon atoms has a ring structure. The ring structure means a structure including a ring, such as an aliphatic ring and an aromatic ring. Preferable examples of the ring include a cyclopentane ring, a cyclohexane ring, a benzene ring, a naphthalene ring, and an anthracene ring. It is preferable that the organic skeleton has a ring structure containing a nitrogen atom, such as a triazine ring and a phosphoazin ring, and/or an aromatic ring. Among these, it is particularly preferable that the organic skeleton has a triazine ring and/or an aromatic ring. The polyphenol compound may include an aromatic skeleton and an organic skeleton other than those mentioned above, and simultaneously have a structure in which the aromatic skeletons each containing at least one phenol hydroxyl group are bonded to each other with an organic skeleton containing 1 carbon atom.

The above-mentioned polymerizable unsaturated bond-containing compound is a compound containing a polymerizable unsaturated bond, and preferably it is a compound containing at least one group selected from the group consisting of (meth)acryloyl groups, vinyl groups, fumarate groups, and maleimide groups. That is, it is preferable that the above-mentioned polymerizable unsaturated bond-containing compound is at least one compound selected from the group consisting of (meth)acryloyl group-containing compounds, vinyl group-containing compounds, fumarate group-containing compounds, and maleimide group-containing compounds. In the present invention, the (meth)acryloyl group means an acryloyl group or a methacryloyl group. If the compound contains an acryloyl group, the acryloyl group contains a vinyl group. However, in this case, the compound is not regarded as a compound containing both of an acryloyl group and a vinyl group but as a compound containing an acryloyl group. The fumarate group means a group having a fumarate structure, i.e., a fumaric acid ester structure.

The curable resin composition for molded bodies of the present invention may further include a noncurable component such as a thermoplastic resin. The thermocurable resin may include a noncurable component such as a thermoplastic resin and a low molecular weight curable compound. Examples of the thermoplastic resin include polyethylene, polypropylene, polystyrene, acrylonitrile-styrene copolymer (AS resin), ABS resin consisting of acrylonitrile, butadiene, and styrene, vinyl chloride resin, (meth)acrylic resin, polyamide resin, acetal resin, polycarbonate resin, polyphenylene oxide, polyester, and polyimide. As the low molecular weight curable compound which is used in addition to such a thermoplastic resin, appropriate one can be selected from the above-exemplified polyphenol compounds, polymerizable unsaturated bond-containing compounds, and epoxy resins.

If the noncurable component such as a thermoplastic resin and the low molecular weight curable compound are used in combination, it is preferable that the thermocurable resin accounts for 90% by weight or more relative to 100% by weight of the curable resin composition for molded bodies. The thermocurable resin more preferably accounts for 95% by weight or more and still more preferably 98% by weight or more.

It is preferable that the curable resin composition for molded bodies of the present invention includes a curing agent. Among these, it is preferable that the curable resin composition for molded bodies of the present invention further includes a cationic curing catalyst. Such a cationic curing catalyst is not especially limited as long as it generates a cationic species which initiates polymerization by heat or light. The above-mentioned cationic curing catalyst is preferably thermal-latent cationic curing catalyst (thermal acid generator) or a photolatent cationic curing catalyst (photoacid generator). The above-mentioned thermal-latent cationic curing catalyst is also called thermal acid generation thermal-latent curing agent, thermal-latent cation generator, or cationic polymerization initiator. The thermal-latent cationic curing catalyst excites a compound including a cationic species by heat, and causes a thermal decomposition reaction, and further, exhibits substantial functions as a curing agent at a curing temperature of the resin composition. In addition, the above-mentioned photolatent cationic curing catalyst is also called photoacid generator, photolatent curing agent, photolatent cation generator, or photocationic polymerization initiator. If the resin composition is irradiated with light, the photolatent cationic curing catalyst exhibits substantial functions as a curing agent. Therefore, if this photolatent cationic curing catalyst is used, a compound including a cationic species is excited by the light, and thereby a photodecomposition reaction is generated and photocuring proceeds.

In the present invention, the thermal-latent cationic curing catalyst is particularly preferable if the above-mentioned resin composition is used as an optical material. The thermal-latent cationic curing catalyst contained in the resin composition causes neither an increase in viscosity nor gelling of the resin composition with lapse of time at a normal temperature, which is different from acid anhydrides, amines, phenol resins, which are commonly used as a curing agent. Further, the thermal-latent cationic curing catalyst contained in the resin composition can sufficiently accelerate the curing reaction to exhibit excellent effects as a function of the thermal-latent cationic curing catalyst. As a result, a resin composition excellent in handling ability can be provided.

Due to the use of such a thermal-latent cationic curing catalyst, even if a thermocurable resin curing of which proceeds at a room temperature is used, the curing is suppressed from proceeding at a room temperature, and therefore, the curing reaction can be easily handled. Further, a molded body obtained from the resin composition has a drastically improved moisture resistance and maintains the excellent optical characteristics even in a harsh use environment. Therefore, such a molded body can be preferably used in various applications. Generally, if the resin composition or the molded body (cured product) contains moisture, the moisture causes haze because of its low refractive index. However, if the thermal-latent cationic curing catalyst is used, the excellent moisture resistance can be exhibited, which suppressed such haze. Therefore, the molded body can be preferably used in an optical application such as a lens. Particularly in applications such as an in-vehicle camera and a bar-code reader for delivery service, yellowing or deterioration of strength may be caused due to UV irradiation for a long time or exposure to summer high temperatures. These phenomena are caused because the molded body is irradiated with UV or exposed to heat in the presence of air or moisture and as a result, oxygen radicals are generated. The improved moisture resistance suppresses the molded body to absorb moisture, and therefore, generation of oxygen radicals, attributed to the UV irradiation or the heat exposure, can be suppressed. Therefore, the molded body exhibits excellent heat resistance for a long time without yellowing or decrease in strength.

It is preferable that the above-mentioned thermal-latent cationic curing catalyst is represented by the following formula (15):

(15)

(in the formula, Z representing at least, one element selected from the group consisting S, Se, Te, P, As, Sb, Bi, O, N, and halogen elements; $R^1$, $R^2$, $R^3$, and $R^4$ being the same or different and each representing an organic group; a, b, c, and d being 0 or a positive number, and the total number of a, b, c, and d being equal to a valency of Z; a cation $(R^1_a R^2_b R^3_c R^4_d Z)^{+m}$ representing an onium salt; A representing a metal element or a metalloid element that is the center atom of a halide complex and being at least one selected from the group consisting of B, P, As, Al, Ca, In, Ti, Zn, Sc, V, Cr, Mn, and Co; X representing a halogen element; m being a net positive charge of a halide complex ion; and n being the number of a halogen element in the halide complex ion).

The thermal-latent cationic curing catalyst represented by the above formula (15) normally generates a cation at a curing temperature. The curing temperature is preferably 25 to 250° C. The curing temperature is more preferably 60 to 200° C., and still more preferably 80 to 180° C.

With the regard to the curing conditions, the curing temperature may be changed in phases. For example, in order to improve productivity when a cured product of the resin composition is produced, the resin composition is maintained within a mold at a specific temperature for a specific time and then demolded and left in air or inert gas such as nitrogen atmosphere to be subjected to heat treatment. In this case, the holding temperature as a curing temperature is preferably 25 to 250° C., and more preferably 60 to 200° C., and still more preferably 80 to 180° C. The holding time is 10 seconds to 5 minutes, and more preferably 30 seconds to 5 minutes, and still more preferably 1 to 3 minutes.

Specific examples of an anion $(Axn)^{-m}$ in the above formula (15) include tetrafluoroborate ($BF_4^-$), hexafluorophosphate ($PF_6^-$), hexafluoroantimonate ($SbF_6^-$), hexafluoroarsenate ($AsF_6^-$), and hexachloroantimonate ($SbCl_6^-$).

Further, an anion represented by the formula AXn (OH)$^-$ may be used. Examples of other anions include a perchlorate ion ($ClO_4^-$), a trifluoromethyl sulfite ion ($CF_3SO_3^-$), a fluorosulfonate ion ($FSO_3^-$), a toluenesulfonate ion, and a trinitrobenzene sulfonate ion.

Specific examples of the above-mentioned thermal-latent cationic curing catalyst include: diazonium salt products such as AMERICURE series (product of American Can Corp.), ULTRASET series (product of ADEKA Corp.), and WPAG series (product of Wako Pure Chemical Industries, Ltd.); iodonium salt products such as UVE series (product of General Electric Co.), FC series (product of 3M), UV9310C (product of GE Toshiba Silicones Co., Ltd.), Photoinitiator 2074 (product of Rhone-Poulenc Inc.), and WPI series (product of Wako Pure Chemical Industries, Ltd.); sulfonium salt products such as CYRACURE series (product of Union Carbide Corp.), UVI series (product of General Electric Co.), FC series (product of 3M), CD series (product of Satomer Co., Inc.), optomer SP series and optomer CP series (product of ADEKA Corp.), San-Aid SI series (product of SANSHIN CHEMICAL INDUSTRY CO., LTD.), CI series (product of NIPPON SODA CO., LTD.), WPAG series (product of Wako Pure Chemical Industries Ltd.), and CPI series (product of SAN-APRO Ltd.).

Examples of the above-mentioned photolatent cationic curing catalyst include: metal fluoroboron complex salt and trifluoride complex compound, disclosed in U.S. Pat. No. 3,379,653; bis(perfluoroalkyl sulfonyl)methane metal salt, disclosed in U.S. Pat. No. 3,586,616; aromatic onium salts of elements in VIa Group, disclosed in U.S. Pat. No. 4,058,400; aromatic onium salts of elements in Va Group, disclosed in U.S. Pat. No. 4,069,055; dicarbonyxylate of elements in IIIa to Va Groups, disclosed in U.S. Pat. No. 4,068,091; elements in VIb Group such as $MF_6^-$ anion (herein, M is selected from phosphorus, antimony, and arsenic), disclosed in U.S. Pat. No. 4,161,478; aromatic iodonium complex salts and aromatic sulfonium complex salts, disclosed in U.S. Pat. No. 4,256,828; bis[4-(diphenylsulfonio)phenyl]sulfide-bishexafluoro metal salt (for example, phosphate, arsenate, antimonate), disclosed in "Journal of Polymer Science, Polymer Chemistry Edition", vol. 22, p. 1789, 1984 by W. R. Watt, et al.; mixed ligand metal salts of iron compounds; and silanol-aluminum complexes. These compounds are also referred to as an UV polymerization initiator. These photolatent cationic curing catalysts may be used singly or in combination of two or more species of them.

Among the above-mentioned photolatent cationic curing catalysts, aryl sulfonium complex salts, aromatic iodonium complex salts or aromatic sulfonium complex salts of halogen-containing complex ions, and aromatic onium salts of elements in II, V, and VI Groups, are preferable.

Preferable examples of the above-mentioned photolatent cationic curing catalyst include: triphenylsulfonium hexafluoroantimonate, triphenylsulfonium phosphate, p-(phenylthio)phenyl diphenyl sulfoniumhexafluoroantimonate, p-(phenylthio)phenyl diphenyl sulfonium hexafluorophosphate, 4-chlorophenyl diphenyl sulfonium hexafluorophosphate, 4-chlorophenyl diphenyl sulfoniumhexafluoroantimonate, bis[4-(diphenylsulfonio)phenyl]sulfide bishexafluorophosphate, bis[4-(diphenylsulfonio)phenyl]sulfide bishexafluoroantimonate, (2,4-cyclopentadiene-1-yl)[(1-methylethyl)benzene]-Fe-hexafluorophosphate, and diaryliodonium hexafluoroantimonate. These can be commercially available. Preferable examples thereof include: SP-150, SP-170, SP-172 (product of Asahi Denka Co., Ltd.); IRGACURE 261 (product of Ciba-Geigy K.K.); UVR-6974 and UVR-6990 (product of Union Carbide Corp.); and CD-1012 (product of Satomer Co. Inc.). Among these, onium salts are preferably used as the photolatent cationic curing catalyst. It is preferable that at least one of triarylsulfonium salts and diaryliodonium salts is used as the onium salt.

It is preferable that the curable resin composition of the present invention is demolded at a strength (peel strength) of $4 \times 10^{-2}$ N/m$^2$ or less when a cured product of the composition is removed from a mold.

According to this art, if the above-mentioned curable resin composition is demolded at a strength of $4 \times 10^{-2}$ N/m$^2$ or less, a molded body of the resin is demolded with ease and it can be continuously produced with high productivity in production processes. If the peel strength is more than $4 \times 10^{-2}$ N/m$^2$, the molded body might not be produced with high productivity, which possibly results in economic inefficiency. The peel strength is preferably $2 \times 10^{-2}$ N/m$^2$ or less, end more preferably $1 \times 10^{-2}$ N/m$^2$ or less, and still more preferably $1 \times 10^{-3}$ N/m$^2$ or less, and particularly preferably $1 \times 10^{-4}$ N/m$^2$ or less.

With respect to the above-mentioned peel strength, it is preferable that a material hardness of the resin composition becomes a certain level in a short time at a temperature of 150° C. or less where a side reaction occurs (the curable resin composition is demolded at a strength of $4 \times 10^{-2}$ N/m$^2$ or less), according to one necessary condition for continuous production of the molded body. Such a peel strength (material hardness) can be evaluated as follows, for example. The resin composition is coated on a SUS304 substrate and cured at 140° C. for 2.5 minutes 1 to have a thickness of 1 mm. Then, the cured resin is cooled to 30° C. within 30 seconds. Then, the resin is evaluated for demolding easiness by applying a desired strength (for example, a peel strength of $4 \times 10^{-2}$ N/m$^2$) to the interface between the resin and the SUS 304 using a cutter (product of NT Inc., the body model number: L-500, the edge model number: BL-150P). The peel strength of $4 \times 10^{-2}$ N/m$^2$ is calculated as a value in case that a load of 1.5 kg is applied to the interface between the resin with a length of 2 cm and the SUS304 using the cutter. The area to which the load is applied by a cutter edge is 0.04 cm$^2$.

Various methods such as thermal curing and photocuring can be preferably used as a method of curing the curable resin composition for molded bodies of the present invention. With regard to the molding method, it is preferable that the curable resin composition is casted to be cured. For example, the following method is preferably used: A one-composite solution is prepared by mixing a curing agent and if necessary other materials with the curable resin composition for molded bodies, and then, this one-composite solution is charged (injected and casted) into a mold having a shape which a desired cured product has, and this cured product is demolded. In the casing method, a solvent is not used, generally. Therefore, the effects of the present invention can be more sufficiently exhibited.

The effects of the present invention can be sufficiently exhibited under the conditions where the curing reaction proceeds in a short time, as mentioned above, and therefore the cationic curing is preferable.

In such a method, it is preferable that the viscosity of the curable resin composition for molded bodies with which the curing agent and the like has been mixed is not remarkably increased in terms of handling. With regard to a viscosity at which the handling is easy, for example, it is preferable that an increase rate of the viscosity of the curable resin composition for molded bodies is 200% or less after three days preservation at 25° C. relative to the viscosity just after the mixing. If the increase rate of the viscosity is more than 200%, it might become difficult to charge (inject or cast) the solution into a mold and the flowability of the resin composition within the mold may be adversely affected. The increase rate is more preferably 180% or less and still more preferably 150% or less. Thus, the preferable embodiments of the present invention include the one-composite mixture as the above-mentioned curable resin composition for molded bodies has an increase rate of the viscosity of 200% or less after 3 days preservation at 25° C. relative to the viscosity just after the mixing.

Commonly employed methods can be preferably used as a method for producing a cured product by curing the above-mentioned curable resin composition for molded bodies. The curable resin composition of the present invention is thermally cured using a curing agent to provide a cured product. The methods can be appropriately adopted depending on the kind of the resin composition, as mentioned-below. It is preferable that the above-mentioned curable resin composition for molded bodies is cured in a short time. A method of producing a cured product by curing the above-mentioned curable resin composition for molded bodies within 5 minutes is more preferable. Specifically, it is preferable that the curing agent and if necessary other materials are mixed with the above-mentioned curable resin composition for molded bodies to prepare a one-composite solution and this one-composite solution is charged (injected or casted) into a mold having a shape which a desired cured product has and then cured within 5 minutes. In the case that the compound having a boiling point of 260° C. or less is used as the above-mentioned specific compound, evaporation of the compound having a boiling point of 260° C. or less is sufficiently suppressed because the curing is performed using a mold in a short time. Therefore, the effects of the present invention can be sufficiently exhibited. Thus such a method is excellent in economic efficiency.

If the above-mentioned curing time (curing time if a mold is used) is more than 5 minutes, the above-mentioned compound having a boiling point of 260° C. or less is evaporated and substantially absent in the cured product, the effects of the present invention such as demoldability might be insufficiently exhibited. Accordingly, the curing time is more preferably 4 minutes or less, still more preferably 3.5 minutes or less, and most preferably 3 minutes or less. The above-mentioned curing temperature can be appropriately adopted depending on the resin composition to be cured, and the like, and it is preferably 80 to 200° C. The curing temperature is more preferably 100 to 180° C., and still more preferably 110 to 150° C. Specifically, it is preferable that the curing is performed at 140° C. for 3 minutes.

According to the above-mentioned curing method, the cured product has a hardness high enough to maintain its shape when being demolded. With respect to the curing strength (hardness), it is preferable that the change rate of the shape when the cured product is demolded at a strength of $1 \times 10^{-3}$ N/cm$^2$ or more is 10% or less. The above-mentioned change rate of the shape is preferably 1% or less, and more preferably 0.1% or less, and still more preferably 0.01% or less.

It is preferable that the curable resin composition for molded bodies of the present invention is cured within a mold for 5 minutes or less, as mentioned above, and the cured product is demolded and subjected to post-curing (baking). Due to the post-curing, the cured product has a sufficient hardness to be preferably used in various applications. The cured product having a certain level of hardness is further cured in the post-curing, and therefore, the cured product after the post-curing is excellent in handling ability. In addition, there is no need to use a mold, and therefore, a large number of products can be subjected to post-curing within a smaller area.

In the above-mentioned post-curing, the curing temperature and the curing time can be appropriately adopted depending on a resin composition to be cured and the like. The curing temperature is preferably 80 to 200° C. The curing temperature is more preferably 100 to 180° C. and still more preferably 110 to 150° C. The curing time in the post-curing is preferably 1 to 48 hours, although depending on the curing temperature. The curing time is more preferably 1 to 10 hours and still more preferably 2 to 5 hours.

The resin composition of the present invention may further contain an additive, in addition to the above-mentioned resin. Examples of the additive include a curing accelerator, a reactive diluent, a saturated compound not having an unsaturated bond, a pigment, a dye, an antioxidant, a UV absorber, a light stabilizer, a plasticizer, a non-reactive compound, a chain transfer agent, a thermal polymerization initiator, an anaerobic polymerization initiator, a polymerization inhibitor, an inorganic or organic filler, an agent for improving adhesion such as a coupling agent, a thermostabilizer, a antibacterial and antifungal agent, a flame retarder, a delustering agent, a degassing agent, a leveling agent, a wetting dispersant, an anti settling agent, a thickener and an antisagging agent, a color separation inhibitor, an emulsifier, a slip and scrape proofing agent, an antiskinning agent, a drying agent, an IR (infrared ray)-cut agent, a stain proofing agent, an antistatic agent, and a conductive agent (electrostatic assistant).

The method of curing the resin composition of the present invention is mentioned below. Commonly used methods can be applied for curing of the resin composition of the present invention, depending on characteristics of a resin to be used.

If the resin composition of the present invention contains an epoxy resin as the thermocurable resin, the resin composition is thermally cured using a curing agent to provide a cured product, as mentioned above. It is preferable that the above-mentioned thermal-latent cationic curing catalyst is used as the above-mentioned curing agent. Examples of curing agents other than the thermal-latent cationic curing catalyst include: acid anhydrides such as methyltetrahydrophthalic anhydride, hexahydrophthalic anhydride, methylhexahydrophthalic anhydride, pyromellitic anhydride, and methylnadic acid; various phenol resins such as a phenol novolac resin, a cresol novolac resin, a bisphenol A novolac resin, a dicyclopentadiene phenol resin, a phenol aralkyl resin, and a terpene phenol resin; various phenol resins such as polyphenol resins obtained by a condensation reaction of various phenols with various aldehydes such as hydroxybenzaldehyde, crotonaldehyde, and glyoxal; BF$_3$ complexes, sulfonium salts, and imidazoles. One or more species of them may be used. The above-mentioned epoxy resin can be cured using a polyphenol compound.

A curing accelerator may be used for the above-mentioned curable resin composition for molded bodies including an epoxy resin. Examples of such a curing accelerator include organic phosphorus compounds such as triphenylphosphine, tributylhexadecylphosphonium bromide, tributylphosphine, and tris(dimethoxylpenyl)phosphine. One or more species of them are preferably used. The above-mentioned curing temperature is preferably 70 to 200° C., and more preferably 80 to 150° C.

If the curable resin composition for molded bodies of the present invention includes a polyphenol compound as the thermocurable resin, the curable resin composition is thermally cured using a curing agent to provide a cured product. A compound containing two or more epoxy groups (also referred to as an epoxy resin curing agent) may be mentioned as the above-mentioned curing agent. An epoxy resin containing an average of two or more epoxy groups in one molecule is preferable as the above-mentioned compound containing two or more epoxy groups The above-mentioned various polyfunctional epoxy resins can be used.

The mixing ratio by weight of the above-mentioned polyphenol compound to the epoxy resin curing agent (polyphenol compound/epoxy resin curing agent) is preferably 30/70 or more and 70/30 or less the mixing ratio by weight is less than 30/70, the mechanical characteristics and the like of the cured product might be reduced. If the mixing ratio is more than 70/30, the flame retardancy of the cured product might be insufficient. The mixing ratio by weight is more preferably 35/65 or more and 65/35 or less. A curing accelerator may be used for the above-mentioned curing. Examples of the above-mentioned curing accelerator include: imidazols such as 2-methylimidazole and 2-ethyl-4-methylimidazole; amines such as 2,4,6-tris(dimethyl aminomethyl)phenol, benzyl methylamine, DBU (1,8-diazabicyclo [5.4.0]-7-undecene), DCMU (3-(3,4-dichlorophenyl)-1,1-dimethylurea); and organic phosphorus compounds such as tributyl phosphine, triphenyl phosphine, and tris(dimethoxy phenyl)phosphine.

If the resin composition of the present invention includes the polymerizable unsaturated bond-containing compound as the thermocurable resin, the resin composition may be cured by irradiation of an active energy ray or by heat. The resin composition of the present invention has a specific spectral sensitivity at 200 to 400 nm and therefore, the resin composition can be polymerized by irradiation of UV ray having a wavelength of 180 to 500 nm or visible light in the absence of a photolatent radical curing catalyst. Particularly, lights at wavelengths of 254 nm, 308 nm, 313 nm, and 365 nm are effective for the curing. Accordingly, the curing method using irradiation of an active energy ray is preferable. The resin composition of the present invention can be cured in air and/or inert gas.

The above-mentioned resin composition includes the polymerizable unsaturated bond-containing compound can be cured by irradiation of an active energy ray other than the above-mentioned UV ray and visible light. The active energy ray generates a radical active species, and in addition to the above-mentioned UV ray and visible light, electron beam, ionizing radiation such as α rays, β rays, and γ rays, microwaves, high frequency wave, infrared ray, laser beam, and the like are preferably used as the active energy ray. The active energy ray may be appropriately selected depending on an absorption wavelength of the compound which generates a radical active species.

Preferable examples of a light source which generates the above-mentioned UV ray having a wavelength of 180 to 500 nm or visible light include: a low pressure mercury lamp, a high pressure mercury lamp, an extra high pressure mercury lamp, a metal halide lamp, a chemical lamp, a black light lamp, a mercury-xenon lamp, an excimer lamp, a short arc lamp, a helium cadmium laser, an argon laser, an excimer laser, and sunlight. The irradiation time of the UV ray having a wavelength of 180 to 500 nm or visible light may be appropriately determined depending on a wavelength or irradiation amount of the active energy ray. The irradiation time is preferably 0.1 microseconds to 30 minutes, and more preferably 0.1 milliseconds to 1 minute.

A commonly used photolatent radical curing catalyst may be added in order to more efficiently perform the curing reaction if the above-mentioned curing is performed by irradiation of the active energy ray. As the photolatent radical curing catalyst, the above-mentioned photolatent radical curing catalyst is preferable. The mixing amount of the above-mentioned photolatent radical curing catalyst is preferably 0.1 to 10 parts by weight relative to 100 parts by weight of the thermocurable resin 100 parts by weight of the present invention. If the mixing amount of the photolatent radical curing catalyst is less than 0.1 parts by weight, photopolymerization might not proceed efficiently. If it is more than 10 parts by weight, the effect of increasing the curing agent is not improved any more, and instead, the curing might be insufficient.

Examples of the above-mentioned photolatent radical curing catalyst include an intramolecular bond cleavage type photolatent radical curing catalyst and an intramolecular hydrogen abstraction type photolatent radical curing catalyst. Examples of the above-mentioned intramolecular bond cleavage type photolatent radical curing catalyst include: acetophenones such as diethoxyacetophenone, 4-(2-hydroxyethoxy)phenyl-(2-hydroxy-2-propyl)ketone, 2-methyl-2-morpholino(4-thiomethylphenyl)propane-1-one (product of Ciba-Geigy K.K., "IRGACURE 907"), 2-benzyl-2-dimethylamino-1-(4-morpholinophenyl)-butanone, 2-hydroxy-2-methyl-1-phenylpropane-1-one (product of Merck & Co., Inc., "Darocur 1173"), 1-hydroxycyclohexyl phenyl ketone (product of Ciba-Geigy K.K. "IRGACURE 184"), 1-(4-isopropylphenyl)-2-hydroxy-2-methylpropane-1-one (product of Merck & Co., Inc., "Darocur 1116"), benzyl dimethyl ketal (product of Ciba-Geigy K.K., "IRGACURE 651"), oligo{2-hydroxy-2-methyl-1-[4-(1-methylvinyl)phenyl]propane} (product of Fratelli Lamberti co., "ESACURE KIP 100"), and 4-(2-acryloyl-oxyethoxy)phenyl-2-hydroxy-2-propyl ketone (product of Ciba-Geigy K.K., "ZLI3331"); benzoin derivatives, such as benzoin, benzoin isopropyl ether, benzoin isobutyl ether, and benzoin alkyl; a mixture of 1-hydroxycyclohexyl phenyl ketone with benzophenone (product of Ciba-Geigy K.K., "IRGACURE 500"); acylphosphine oxides such as 2,4,6-trimethyl benzoyl diphenylphosphine oxide (product BASF Ltd., "Lucirin TPO") and bisacylphosphine oxide (product of Ciba-Geigy K.K., "CGI1700"); benzyl and benzyl derivatives; methylphenylglyoxyester; and 3,3',4,4'-tetra(t-butyl peroxycarbonyl)benzophenone (product of NOF CORPORATION, "BTTB").

Examples of the intramolecular hydrogen abstraction type photolatent radical curing catalyst include: benzophenones such as benzophenone, methyl ortho benzoylbenzoate, alkyl ortho benzoylbenzoate, 4-phenylbenzophenone, 4,4'-dichlorobenzophenone, hydroxybenzophenone, 4-benzoyl-4'-methyl-diphenylsulfide, acrylated benzophenone, 3,3',4,4'-tetra (t-butylperoxycarbonyl)benzophenone, 3,3'-dimethyl-4-methoxybenzophenone; thioxanthones such as 2-isopropylthioxanthone, 2,4-dimethylthioxanthone, 2,4-diethylthioxanthone, and 2,4-dichlorothioxanthone; aminobenzophenones such as Michler's ketone and 4,4'-diethylaminobenzophenone; and 10-butyl-2-chloroacridone, 2-ethylanthraquinone, 9,10-phenanthrenequinone, and camphorquinone.

The following compounds also may be used as the above-mentioned photolatent radical curing catalyst. 2,2-dimethoxy-1,2-diphenylethane-1-one, 1-hydroxy-cyclohexyl-phenyl-ketone 2-methyl-1-[4-(methylthio)phenyl]-2-morpholinopropanone-1,2-hydroxy-2-methyl-1-phenyl-propane-1-one and derivatives thereof, 4-dimethylaminobenzoate, 1,1-dialkoxy acetophenone, benzophenone and a benzophenone derivative, alkyl benzoylbenzoate, bis(4-dialkylaminophenyl)ketone, benzyl and benzyl derivatives, benzoin and benzoin derivatives, benzoin alkyl ether, 2-hydroxy-2-methylpropiophenone, thioxanthone and thioxanthone derivatives, 2,4,6-trimethylbenzoyl diphenyphosphine oxide, 2-benzyl-2-dimethylamino-1-(4-morpholinophenyl)-butanone-1, bis(2,6-dimethoxybenzoyl)-2,4,4-trimethylpentylphosphine oxide, and bis(2,4,6-trimethyl phenyl)-phenyl phosphine oxide.

It is preferable that a photosensitizer is used together for the curing by the above-mentioned active energy ray irradiation. The mixing amount of the above-mentioned photosensitizer is preferably 0.1 to 20% by weight relative to 100% by weight of the resin composition of the present invention. If the mixing amount is less than 0.1% by weight, the photopolymerization might not proceed efficiently. If the mixing amount is more than 20% by weight, the UV ray is prevented from passing through the inside of the coating film, possibly resulting in insufficient curing. The mixing amount of the photosensitizer is more preferably 0.5 to 10% by weight.

Preferable examples of the above-mentioned photosensitizer include amines such as triethanolamine, methyldiethanolamine, triisopropanolamine, methyl 4-dimethylaminobenzoate, ethyl 4-dimethylaminobenzoate, isoamyl 4-dimethylaminobenzoate, ethyl(2-dimethylamino)benzoate, (n-butoxy)ethyl 4-dimethylaminobenzoate, and 2-ethylhexyl 4-dimethylaminobenzoate.

The above-mentioned additive may be further added for curing of the above-mentioned resin composition including the polymerizable unsaturated bond.

The curable resin composition for molded bodies of the present invention can provide a molded body by the above-mentioned curing method.

The present invention is also a molded body prepared by molding the above-mentioned curable resin composition for molded bodies. Preferable embodiments of a raw material resin composition, a curing method in the molded body of the present invention are the same as mentioned in the curable resin composition for molded bodies and the curing method of the present invention, respectively.

The present invention is a production method of a molded body from a curable resin composition for molded bodies, the curable resin composition for molded bodies including a thermocurable resin, wherein the production method includes a step of molding a curable resin composition including at least one compound selected from the group consisting of a compound having a boiling point of 260° C. or less at one atmospheric pressure, a silicon compound having a polyalkylene chain, a silicon compound having aryl group, and a silicon compound having a polyalkylene group and an aryl group.

The preferable embodiments of a raw material, reaction conditions, and the like, in the production method of the molded body of the present invention are the same as in mentioned in the above-mentioned preferable embodiments in the curable resin composition for molded bodies and the molded body of the present invention.

The molded body of the present invention is excellent in various optical characteristics. For example, it is preferable that the molded body has a haze of 20% or less. Thus, the preferable embodiments of the present invention include the resin composition, wherein a cured product of the resin composition has a haze of 20% or less. The haze is more preferably 18% or less, and still more preferably 15% or less. The haze of the molded body is preferably 5% or less. The haze of the molded body is more preferably 2% or less, and still more preferably 1% or less.

With respect to the transparency, it is preferable that the molded body has a light transmittance in a visible region (a range having a wavelength of 360 to 780 nm) of 75% or more. The light transmittance is more preferably 80% or more, and still more preferably 85% or more, and particularly preferably 87% or more.

The refractive index and the Abbe number which the molded body need to have widely vary depending on an optical design of an optical system to which the molded body is applied. The light transmittance of the cured product can be measured according to JIS K7361-1. The haze thereof can be measured according to JIS K7136. The refractive index and the Abbe number thereof can be measured according to JIS K7142.

The moisture absorptivity (saturated absorptivity in air at 30° C. and a relative humidity of 40%) after PCT (pressure cooker test) of the above-mentioned molded body varies depending on the curing conditions. It is preferable that the curing conditions are optimized to adjust the moisture absorptivity to 1.0 or less. The moisture absorptivity is more preferably 0.5% or less, and still more preferably 0.2% or less.

With regard to the heat resistance of the above-mentioned molded body, it is preferable that any changes in appearance such as crack generation are not observed and the change rate of each of the total light transmittance and the haze is 20% or less. The change rate is more preferably 15% or less, and still more preferably 10% or less.

As mentioned above, the molded body exhibits excellent optical characteristics such as transparency, and therefore it can be preferably used in various applications such as an optical application, an opto device application, and a display device application. Specifically, the following applications are preferable. Optical applications, for example, a spectacle lens, a camera lens, a filter, a diffraction grating, a prism, a light guide element, a light beam condenser lens, a light diffusing lens, a watch glass, a transparent glass or cover glass such as a cover glass for display devices; opto device applications such as a photosensor, a photoswitch, an LED (Light Emitting Diode), a light-emitting element, an optical waveguide tube, a multiplexer, a demultiplexer, a disconnector, an optical divider, and an optical-fiber adhesive; and display device applications, for example, a substrate for display elements such as a LCD (Liquid Crystal Display), an organic EL (Electro Luminescence), and a PDP (Plasma Display Panel), a color filter substrate, a touch panel substrate, a display protective film, a display backlight, a light guide plate, an antireflective film, and an antifogging film.

The shape of the above-mentioned cured product is not especially limited and it can be appropriately determined depending on the application. The cured product may be a molded body such as a deformed product, or may have a film, sheet, or pellet shape.

Among these, the cured product is excellent in optical characteristics such as transparency, and therefore it can be preferably used in an application such as a lens molding, and particularly preferably used in a microoptical application. Examples of the microoptics include an imaging lens for cellular phones and digital cameras, and a pickup lens. Curing of such a molded body can be completed in a short time because the molded body is prepared by micro processing. The curable resin composition for molded bodies of the present invention can satisfy the demoldability and the transparency even when being cured in a short time, and therefore the effects of the present invention can be more remarkably exhibited. If the curable resin composition for molded bodies includes the compound having a boiling point of 260° C. or less at one atmospheric pressure as the specific compound, evaporation of this compound can be suppressed. Therefore, the effects of the present invention can be more remarkably exhibited.

It is preferable that a cured body of the curable resin composition for molded bodies of the present invention has a large surface area relative to a unit volume because the curable resin composition for molded bodies of the present invention is excellent in demoldability. With regard to the demolding surface area relative to the unit volume of the cured body, a ratio of (surface area)/(unit volume) is preferably 0.1 mm$^2$/mm$^3$ or more, for example. The ratio of (surface area)/(unit volume) is more preferable 1 mm$^2$/mm$^3$ or more, and still more preferably 3 mm$^2$/mm$^3$ or more. The preferable upper limit is 100 mm$^2$/mm$^3$. As a result, the effects of the present invention can be remarkably exhibited. More preferably, a ratio of demolding (surface area (mm$^2$))/(unit volume (mm$^3$)) is within the above-mentioned range.

The above-mentioned demolding surface area (mm$^2$) means an area where a product obtained after curing of the resin composition is in contact with a mold before demolding.

As the above-mentioned cured product having a large demolding surface area relative to the volume, a micro cured product, a thin film, and the like may be mentioned, for example.

Effect of the Invention

Each of the curable resin composition for molded bodies, the molded body, and the production method of the present invention has the above-mentioned configuration. According to such curable resin composition for molded bodies, molded body, and production method, a molded body which is excellent in basic performances such as heat resistance and which satisfy both of the demoldability at the time when being removed from a mold and the optical characteristics such as transparency. The obtained molded body is useful in an optical application, an opto device application, a display device application, or useful as a mechanical component material, an electrical or electronic component material or a material in an optical application.

BEST MODES FOR CARRYING OUT THE INVENTION

The present invention is described in more detail below with reference to Examples, but the present invention is not limited to only the following Examples. The terms, "part(s)" and "%" represent "part(s) by weight" and "% by weight", respectively, unless otherwise specified.

Example 1

Preparation of Curable Resin Composition for Molded Bodies

Into a four-necked flask equipped with a gas inlet, a condenser, and a stirring bar, the following thermocurable resins: a liquid epoxy resin CELL-2021P (an alicyclic epoxy resin, trade name, product of DAICEL CHEMICAL INDUSTRIES., LTD.) 30 part; EHPE-3150 (an alicyclic epoxy resin, trade name, product of DAICEL CHEMICAL INDUSTRIES., LTD.) 20 parts; and OGSOL EG210 (an aromatic epoxy resin, trade name, product of Osaka Gas Chemical Co., Ltd.) 50 parts, and stearic acid 0.5 parts as the demolding agent were charged and stirred well at 130° C. to provide a homogeneous mixture. After that, the temperature was decreased to 70° C. Then, into the mixture, isopropyl acetate 0.5 parts was added as the compound having a boiling point of 260° C. or less at one atmospheric pressure and stirred to provide a homogeneous mixture. After the mixture was cooled, a viscous transparent and slightly yellow liquid was obtained.

This liquid was cooled to 40° C., and then thereto San-Aid SI-80L (trade name, product of SANSHIN CHEMICAL INDUSTRY CO., LTD.) as a thermal-latent cationic curing catalyst was added to account for 0.6 parts relative to 100 parts of the resin composition to provide a homogeneous mixture.

Preparation of Molded Body

The above-prepared resin composition (hereinafter, also referred to as a preparation liquid) was subjected to vacuum degassing treatment, if necessary, by heating at 50° C., and casted in a mold and cured at 140° C. for 3 minutes. Then, the cured product was demolded to provide a cast plate (coating film) with a thickness of 250 µm as a molded body.

The following Table 3 shows components and proportions thereof in the resin composition.

The above-mentioned preparation liquid and molded body (casting plate) were measured for various physical properties by the following methods.

Physical Properties

"Demoldability"

The molded body of the present invention needs to obtain a certain level of material hardness in a short time at a temperature of 250° C. or less where a side reaction occurs, according to one necessary condition for continuous production of the molded body. The above-mentioned preparation liquid was applied on a SUS 304 substrate with an applicator to have a height (thickness) of 1 mm. Then, the applied liquid was cured at 140° C. for 2.5 minutes. The cured resin (coating film) was evaluated for demolding easiness by applying a peel strength of $4 \times 10^{-2}$ N/m$^2$ to the interface between the cured resin and the SUS 304 substrate using a cutter (product of NT Inc., the body model number: L-500, the edge model number: BL-150P), thereby separating the cured resin from the substrate. In such a manner, the resin was measured for demoldability.

The peel strength of $4 \times 10^{-2}$ N/m$^2$ was calculated as a value obtained when 1.5 kg of a load was applied to the interface between the SUS 304 substrate and the resin with a height (thickness) 1 mm and a length of 2 cm, formed on the SUS 304 substrate, using the cutter. The area to which the load is applied by an edge of the cutter was 0.04 cm$^2$. Further, the coating film had a width of 2 cm and the ratio of the demolding surface area to the unit volume (surface area)/(volume) was 1 mm$^2$/mm$^3$.

The demoldability was evaluated on a scale of 1 to 8. 8 (strong, difficulty in peeling) >7>6>5>4>3>2>1 (weak, easy in peeling)

That is, in the above-mentioned test, as the value is small, the demoldability is more excellent. If the demoldability is evaluated as 7 or smaller, such a molded body can be applied in an optical application as an optical product such as a lens which needs to have a precise surface shape in the order of several micrometers. The demoldability is just to be high enough for the optical product to be continuously produced.

"Transparency"

The resin composition (preparation liquid) before curing and the resin composition (cured product) after curing were measured for a haze value (transmittance) at 25° C. with turbidimeter (product of Nippon Denshoku, NDH 2000), thereby being evaluated for the transparency based on a scale of 1 to 5. In the following Table, the preparation liquid turbidity of which was observed by eyes is shown as "turbid liquid", and the cured product turbidity of which was observed by eyes is shown as "turbid solid", in addition to the following evaluations.

(Preparation liquid): The above-mentioned preparation liquid was charged into a cell with an optical path length of 1 cm and measured for haze with the above-mentioned turbidimeter.

(Cured product): The above-mentioned molded body with a thickness of 250 µm was measured for haze with the above-mentioned turbidimeter.

(Evaluation): The transparency was evaluated on a scale of 1 to 5 based on the haze values of the preparation liquid and the cured body, measured in the above-mentioned manner.

5 (turbid)>4>3>2>1 (transparent)

"Viscosity"

The resin composition before addition of the curing agent was measured for viscosity at 40° C. and at a rotation speed D of 1/s using an R/S Rheometer (product of Brookfield Engineering Laboratories, Inc.). A measuring jig RC 25-1 was used for measuring the viscosity of 20 Pa·s or more and a measuring jig RC 50-1 was used for measuring the viscosity of less than 20 Pa·s.

If the viscosity at D of 1/s could not be measured, the viscosity was extrapolated from a value at D of 5 to 100/s to evaluate the viscosity of the resin composition.

"Evaluation of Refractive Index and Abbe Number"

The refractive index and the Abbe number were measured according to JIS K7142 in the following manners, respectively.

The cured product (molded body with a thickness of 250 µm) was measured for refractive index at 20° C. at wavelengths of 486 nm, 589 nm, and 656 nm using refractometer (product of ATAGO CO., LTD., DR-M2).

The above-mentioned cured product (molded body with a thickness of 250 µm) was evaluated for an Abbe number at 20° C. using a refractometer (product of ATAGO CO., LTD., DR-M2).

The following Table 4 shows measurement results and evaluation results of the above-mentioned various physical properties.

Example 2

A curable resin composition for molded bodies and a molded body were prepared in the same manner as in Example 1, except that components and proportions thereof in the curable resin composition were changed as shown in Table 3. Then, the curable resin composition and the molded body were measured for the above-mentioned physical properties. The following Table 4 shows the obtained evaluation results

Example 3

As the specific compound, a silicon compound having a specific organic group was used instead of the compound having a specific boiling point, used in the above-mentioned Examples 1 and 2. Then, a curable resin composition for molded bodies and a molded body were prepared in the following manner and measured for the above-mentioned various physical properties.

Preparation of Curable Resin Composition for Molded Bodies

Into a four-necked flask equipped with a gas inlet, a condenser, and a stirring bar, the following epoxy resins: a liquid epoxy resin CELL-2021P (an alicyclic epoxy resin, trade name, product of DAICEL CHEMICAL INDUSTRIES., LTD.) 30 parts; EHPE-3150 (an alicyclic epoxy resin, trade name, product of DAICEL CHEMICAL INDUSTRIES., LTD.) 20 parts; and OGSOL EG210 (an aromatic epoxy resin, trade name, product of Osaka Gas Chemical Co., Ltd.) 45 parts, and stearic acid 0.5 parts as the demolding agent were charged and stirred well at 130° C. As a result, a homogeneous mixture was obtained.

Then, into the mixture, KF-56 (a straight silicone oil in which a phenyl group constitutes a part of a side chain of polysiloxane which is dissolved in the epoxy resins (demolding agent), trade name, product of Shin-Etsu Chemical Co., Ltd.), 5 parts was added as the silicon compound having a specific organic group and then stirred. As a result, a homogeneous mixture was obtained.

The obtained liquid was cooled to 40° C., and then thereto San-Aid SI-80L (trade name, product of SANSHIN CHEMICAL INDUSTRY CO., LTD.) as a thermal-latent cationic curing catalyst was added to account for 0.6 parts relative to 100 parts of the resin composition, and then mixed. As a result, a homogeneous preparation liquid was obtained.

Preparation of Molded Body

The above-prepared resin composition was subjected to vacuum degassing treatment, if necessary, by heating (at 50° C.), and then casted in a mold and cured at 140° C. for 3 minutes. Then, the cured product was demolded to provide a cast plate (coating film) with a thickness of 250 μm as a molded body.

The following Table 3 shows components and proportions thereof in the resin composition in Example 3. The following Table 4 shows the obtained evaluation results.

Also in Examples 4 to 23, curable resin compositions for molded bodies and molded bodies were produced in the same manner as in Example 3, except that components and proportions thereof in the resin compositions were changed as shown in the following Table 3. Then, the curable resin compositions for molded bodies and the molded bodies were measured for the above-mentioned physical properties. The following Table 4 shows the obtained evaluation results.

Examples 24 to 44

Curable resin compositions for molded bodies and molded bodies were prepared in the same manner as in Example 1, except that: a compound having a specific boiling point and a silicon compound having a specific organic group were used as the specific compound; components and proportions thereof in the curable resin compositions were changed as shown in Table 5; and the silicon compound was charged together with the epoxy resin, and stirred enough at 130° C., and thereby a homogeneous mixture was obtained. Then, the obtained curable resin compositions and molded bodies were measured for the above-mentioned physical properties.

The following Table 6 shows the obtained evaluation results.

Molded bodies in Examples 32, 34, 40, and 44 (curing conditions: the resin composition with a thickness of 1 mm was cured at 40° C. for 2.5 minutes) were subjected to pyrolysis GC-Mass spectrometric measurement. The apparatus and conditions employed in the measurement are shown below.

"Apparatus"
GC-Mass: product of Thermoquest Corp., Polaris Q
Pyrolysis apparatus: product of Frontier Laboratories Ltd., PY2020D
"Conditions"
Pyrolysis temperature: 260° C.,
Gas: He 1 ml/mm
Column (0.25 mm in inside diameter×30 m, 0.25 μm in thickness, TRACETM TR-5MSGC column)
"Results"

Each of the molded bodies in Examples 32, 34, 40, and 44 was observed to have peaks of dodecanol, stearic acid, and an epoxy decomposed matter. In addition, silicon was identified by element analysis.

These measurement results show that each of the molded bodies in Examples 32, 34, 40, and 44 includes the specific compound in the present invention, the demolding agent, and the thermocurable resin. Table 6 clearly shows that each of the molded bodies in Examples 32, 34, 40, and 44 is excellent in demoldability.

Comparative Examples 1 to 15

Curable resin compositions for molded bodies and molded bodies were prepared in the same manner as in Example 1, except that: the curable resin composition was prepared without using the specific compound in the present invention; and components and proportions thereof in the resin compositions were changed as shown in Table 7. Then, the curable resin compositions and the molded bodies were measured for the above-mentioned physical properties.

The silicon compound not dissolved the thermocurable resin was charged together with the epoxy resin, and stirred enough at 130° C., and thereby a homogeneous mixture was obtained.

The following Table 8 shows the obtained evaluation results.

Examples 45 to 57, Reference Examples 1 to 3

Curable resin compositions for molded bodies and molded bodies were prepared in the same manner as in Example 1, except that: the compound having a specific boiling point was used as the specific compound; compounds shown in Table 9 were used as the compound having a specific boiling point; and components and proportions thereof in the resin compositions were changed as shown in Table 9. Then, the obtained curable resin compositions and molded bodies were measured for the above-mentioned physical properties. The following Table 9 shows the obtained evaluation results.

Comparative Example 16

A curable resin composition for molded bodies and a molded body were prepared in the same manner as in Example 1, except that: hexadecanol (1-hexadecanol, boiling point of 344° C.) that is the compound having a boiling point of more than 260° C. at one atmospheric pressure was used instead of the compound having a specific boiling point; and components and proportions thereof in the resin composition was changed as shown in Table 9. Then, the obtained curable resin composition and molded body were measured for the above-mentioned various physical properties. The following Table 9 shows the obtained evaluation results.

Examples 58 and 59

Curable resin compositions for molded bodies and molded bodies were prepared in the same manner as in Example 1, except that: a compound having a specific boiling point and a silicon compound having a specific organic group were used as the specific compound; as the compound having a specific boiling point, octanol was used; as the silicon compound, BYK-333 (product of BYK Chemie Japan K.K., a polyether-modified polydimethyl siloxane solution) was used in Example 58 and BYK-307 (product of BYK Chemie Japan K.K., a polyether-modified polydimethylsiloxane) was used in Example 59; these silicon compounds were charged together with the epoxy resin and the mixture was stirred well at 130° C.; and components and proportion thereof in the resin compositions were changed as shown in Table 10.

The obtained resin compositions and molded bodies were measured for the above-mentioned physical properties. The following Table 11 shows the obtained evaluation results.

Example 60

Octanol that is the compound having a specific boiling point was used as the specific compound. An oxetane compound was also used. In the following manner, a resin composition was prepared. Table 10 shows components and proportions thereof in the resin composition.

Octanol 0.5 parts, OGSOL EG-210 (product of Osaka Gas Chemical Co., Ltd., a fluorene epoxy resin) 50 parts, EHO (product of UBE INDUSTRIES, LTD., 3-ethyl-3-hydroxymethyloxetane) 5 parts, JER 828EL (product of Japan Epoxy Resins Co., Ltd., a bisphenol A epoxy resin) 45 parts, and stearic acid 0.5 parts were mixed at 100° C., After cooling, San-Aid SI-80L (product of SANSHIN CHEMICAL INDUSTRY CO., LTD., a thermal acid generator) 1 part was added, and then mixed and degassed with a revolving/rotating centrifugal mixer (product name: Awatori Rentaro, product of THINKY Co., Ltd.). As a result, the resin composition was prepared.

A molded body of the obtained resin composition was prepared in the above-mentioned manner, and the molded body was measured for various physical properties and the like.

Table 11 shows the obtained measurement results.

Example 61

A compound having a specific boiling point and a silicon compound having a specific organic group were used as the specific compound. A resin composition and a cured product were prepared in the same manner as in Example 60, except that: octanol was used as the compound having a specific boiling point and BYK-333 (product of BYK Chemie Japan K.K., a polyether-modified polydimethylsiloxane solution) was used as the silicon compound; and components and proportions of the resin composition were changed as shown in Table 10.

The obtained resin composition and molded body were Measured for various physical properties and the like.

Table 11 shows the obtained measurement results.

Comparative Example 17

A resin composition and a molded body were prepared in the same manner as in Example 60, except that octanol that is a compound having a specific boiling point was not used; and components and proportions thereof in the resin composition were changed as shown in Table 10. The obtained resin composition and molded product were measured for various physical properties and the like.

Table 11 shows the obtained measurement results.

Comparative Example 18

A resin composition was prepared in the same manner as in Example 60, except that: octanol that is the compound having a specific boiling point and an oxetane compound were not used; and components and proportions thereof in the resin composition were changed as shown in Table 10. A molded body could not be prepared because the resin composition was not cured.

Table 11 shows the obtained measurement results.

Example 62

A resin composition was prepared under the following conditions. Table 10 shows components and proportions thereof in the resin composition. Octanol that is a compound having a specific boiling point was used as the specific compound, and further zirconium oxide was also used.

As the zirconium oxide, zirconium oxide particles satisfying the followings was used: negatively charged zirconium oxide nanoparticles having an average particle diameter of 5 nm; the zirconium oxide nanoparticles have a structure mainly including a tetragonal crystal, but slightly including a monoclinic crystal; and the zirconium oxide nanoparticles were coated with two different coating materials of neodecanoic acid and phenyltrimethoxysilane.

The above-mentioned zirconium oxide particles 10 parts, liquid epoxy resin CELL-2021P (an alicyclic epoxy resin, trade name, product of DAICEL CHEMICAL INDUSTRIES., LTD.) 20 parts, octanol 0.5 parts, JER 828EL (product of Japan Epoxy Resins Co. Ltd., a bisphenol A epoxy resin) 70 parts, and PLACCEL FM-1 (product of DAICEL CHEMICAL INDUSTRIES., LTD.) 0.2 parts as the dispersant were mixed to a homogeneous mixture. This mixture was subjected to vacuum distillation at 90° C. As a result, a resin composition was prepared.

"Preparation of Curable Resin Composition"

Stearic acid 0.5 parts was added as the demolding agent to the above-mentioned resin composition, and then mixed at 80° C. As a result, a homogeneous mixture was prepared. After the mixture was cooled to 50° C., a thermal-latent cationic curing catalyst (product of SANSHIN CHEMICAL INDUSTRY Co., Ltd., San-Aid SI-80L) 1 part was added to the mixture and then mixed. As a result, a homogeneous mixture was prepared. Then, this mixture was subjected to vacuum degassing treatment. The resin composition after the vacuum degassing treatment was used to prepare a molded body in the above-mentioned manner. The obtained resin composition and molded body were measured for various physical properties and the like.

Table 11 shows the obtained measurement results.

Example 63

A resin composition and a molded body were prepared in the same manner as in Example 62, except that: the liquid epoxy resin CELL-2021P (an alicyclic epoxy resin, trade name, product of DAICEL CHEMICAL INDUSTRIES., LTD.) was not used; Eternacoll® OXBP (product of UBE INDUSTRIES, LTD., oxetane resin) 20 parts was added as the oxetane compound; and components and proportions thereof in the resin composition were changed as shown in Table 10. The obtained resin composition and molded product were measured for various physical properties and the like.

Table 11 shows the obtained measurement results.

Comparative Example 19

A resin composition and a molded body were prepared in the same manner as in Example 62, except that: the octanol that is a compound having a specific boiling point was not used; and components and proportions thereof in the resin composition were changed as shown in Table 10. The obtained resin composition and molded body were measured for various physical properties and the like.

Table 11 shows the obtained measurement results.

Comparative Example 20

A resin composition was prepared in the same manner as in Example 62, except that: neither octanol that is a compound having a specific boiling point nor the liquid epoxy resin CELL-2021P (an alicyclic epoxy resin, trade name, product of DAICEL CHEMICAL INDUSTRIES., LTD) were used; and components and proportions thereof in the resin composition were changed as shown in Table 10. A molded body of the resin composition could not be prepared because the resin composition was not cured.

Table 11 shows the obtained measurement results.

Example 64

A compound having a specific boiling point (octanol) and a silicon compound having a specific organic group (BYK-333, product of BYK Chemie Japan K.K., a polyether-modified polydimethylsiloxane solution) were used as the specific compound. Further, an oxetane resin and a radical polymerization generator were also used. Under such conditions, a resin composition was prepared in the following manner. Table 10 shows components and proportions thereof in the resin composition.

Octanol 0.5 parts, a siloxane compound (BYL-333, product of BYK Chemie Japan K.K., a polyether-modified polydimethylsiloxane solution) 0.1 parts, OGSOL EA-0200 (product of Osaka Gas Chemicals Co., Ltd., a fluorene acrylate) 50 parts, Eternacoll®OXBP (product of UBE INDUSTRIES, LTD., an oxetane resin) 20 parts, JER 828EL (product of Japan Epoxy Resins Co., Ltd., a bisphenol A epoxy resin) 30 parts, and stearic acid 0.5 parts were mixed at 100° C. After cooling, San-Aid SI-80L (product of SANSHIN CHEMICAL INDUSTRY CO., LTD., a thermal acid generator) 0.5 parts and PERBUTYL (product of NOF Corp., a radical generator) 1 part were added, and then mixed and degassed with a revolving/rotating centrifugal mixer (product name: Awatori Rentaro, product of THINKY Co., Ltd.). As a result, the resin composition was prepared.

A molded body of the obtained resin composition was prepared by curing under nitrogen atmosphere in the same manner as in Example 1. The resin composition and the molded body were measured for various physical properties, and the like.

Table 11 shows the obtained measurement results.

Example 65

A resin composition and a molded body were prepared in the same manner as in Example 64 except that: neither the aromatic epoxy resin PER 828EL, product of Japan Epoxy Resins Co., Ltd., a bisphenol A epoxy resin) nor the oxetane resin (Eternacoll®OXBP, product of UBE INDUSTRIES, LTD.) were used; and components and proportions thereof were changed as shown in Table 10. Table 10 shows components and proportions thereof in the resin composition. The obtained resin composition and molded body were measured for various physical properties, and the like. The resin composition was cured under nitrogen atmosphere.

Table 11 shows the obtained measurement results.

Example 66

A resin composition and a molded body were prepared in the same manner as in Example 64 except for the for the followings. The thermal-latent cationic curing catalyst was not used and SP-172 as the photolatent cationic curing catalyst and IRGACURE 189 as the photolatent radical curing catalyst were used. Table 10 shows compositions and proportions thereof in the resin composition.

The resin composition was photo-cured under nitrogen atmosphere. The resin composition was photo-cured by being irradiated with UV ray at an intensity of 10 mW/cm$^2$ for 15 minutes, that is, by UV ray irradiation at an exposure energy of 9 J/cm$^2$, using an exposure apparatus including a high-pressure mercury lamp as a light source (product name: MA-60F, product of MIKASA CO., LTD.).

The obtained resin composition and molded body were measured for various physical properties, and the like.

Table 11 shows the obtained measurement results.

In the following Tables 3 to 13, the figure in parenthesis represents apart by weight; the "melting point" means a melting point of the curable resin composition for molded bodies; and the abbreviations, the trade names, and the like represent the followings, respectively.

"Compound Having a Boiling Point of 260° C. Or Less at One Atmospheric Pressure"

MEK: Methyl ethyl ketone

"Thermal-Latent Cationic Curing Catalyst"

SI-80L: San-Aid SI-80L (a thermal-latent cationic curing catalyst, (an aromatic sulfonium salt), trade name, product of SANSHIN CHEMICAL INDUSTRY Co., Ltd.)

SI-100L: San-Aid SI-100L (a thermal-latent cationic curing catalyst, (an aromatic sulfonium salt), trade name, product of SANSHIN CHEMICAL INDUSTRY Co., Ltd.)

"Thermocurable resin"

CELL-2021P (an alicyclic epoxy resin, trade name, product of DAICEL CHEMICAL INDUSTRIES., LTD.)

CELLOXIDE 2081 (an alicyclic epoxy resin, trade name, product of DAICEL CHEMICAL INDUSTRIES., LTD.)

EHPE-3150 (an alicyclic epoxy resin, trade name, product of DAICEL CHEMICAL INDUSTRIES., LTD.)

OGSOL EG210 (an aromatic epoxy resin (a fluorene epoxy compound), trade name, product of Osaka Gas Chemicals Co., Ltd.)

OGSOL PG100 (an aromatic epoxy resin (a fluorene epoxy compound), trade name, product of Osaka Gas Chemicals Co., Ltd.), OGSOL EA-0200 (a fluorene acrylate, trade name, product of Osaka Gas Chemicals Co., Ltd.), JER 828EL (an aromatic epoxy resin (a bisphenol A epoxy resin), trade name, Japan Epoxy Resins Co., Ltd.).

"Silicon Compound Having an Aryl Group and/or a Polyalkylene Glycol Chain"
KF-56 (trade name, a straight silicone oil in which a phenyl group constitutes a part of a side chain of polysiloxane (demolding agent), weight average molecular weight: $1.75 \times 10^3$, product of Shin-Etsu Chemical Co., Ltd.)
KF-6004 (trade name, a modified silicone oil in which an organic group having a polyoxyethylene chain and a polyoxypropylene chain is introduced to each end (demolding agent), weight average molecular weight: $7.7621 \times 10^4$, product of Shin-Etsu Chemical Co., Ltd.)
HIVAC-F-4 (trade name, a straight silicone oil in which a phenyl group constitutes a part of a side chain of polysiloxane, (demolding agent), weight average molecular weight $1.51 \times 10^3$, product of Shin-Etsu Chemical Co., Ltd.)
BYK-333 (trade name, product of BYK Chemie Japan K.K., a polyether-modified polydimethylsiloxane solution (siloxane compound))
BYK-307 (trade name, product of BYK Chemie Japan K.K., a polyether-modified polydimethylsiloxane [siloxane compound])
"Silicon Compound not Dissolved in Thermocurable Resin"
KS-707 (trade name, a solution-silicone oil, product of Shin-Etsu Chemical Co., Ltd.)
KF-96 (trade name, an oil-silicone oil, product of Shin-Etsu Chemical Co., Ltd.)
KF-412 (trade name, an oil-silicone oil, product of Shin-Etsu Chemical Co., Ltd.)
KF-53 (trade name, a straight silicone oil in which a phenyl group constitutes a part of a side chain of polysiloxane, product of Shin-Etsu Chemical Co., Ltd.)
KF-54 (trade name, a straight silicone oil in which a phenyl group constitutes a part of a side chain of polysiloxane, weight average molecular weight: $2.27 \times 10^4$, product of Shin-Etsu Chemical Co., Ltd.)
X-22-169AS (trade name, a dual-ended/alicyclic epoxy-modified silicone oil in which an alicyclic epoxy skeleton is introduced into each end, weight average molecular weight: $6.85 \times 10^3$, product of Shin-Etsu Chemical Co., Ltd.)
X-22-163 (trade name, a dual-ended/epoxy-modified silicone oil in which an aliphatic epoxy skeleton is introduced into each end, weight average molecular weight: $1.15 \times 10^5$, product of Shin-Etsu Chemical Co., Ltd.)
SF 8421 (trade name, a silicone oil, product of Dow Corning Toray Silicone Co., Ltd.)
"Oxetane Compound"
EHO (trade name, 3-ethyl-3-hydroxymethyloxetane, product of Ube Industries, Ltd.)
OXBP (trade name, 4,4'-bis[(3-ethyl-3-oxetanyl)methoxymethyl]biphenyl, an oxetane resin, product of Ube Industries, Ltd.)
"Dispersant"
PLACCEL FM-1 (product of DAICEL CHEMICAL INDUSTRIES., LTD.)
"Radical Curing Catalyst"
PERBUTYL O (trade name, product of NOF Corp., a radical generator)
"Photolatent Cationic Curing Catalyst"
SP-172 (trade name, product of Asahi Denka Co., Ltd.)
"Photolatent Radical Curing Catalyst"
IRGACURE 189 (trade name, product of Ciba-Geigy K.K.)

TABLE 3

|  | Compound having a boiling point of 260° C. or less at 1 atmospheric pressure | Demolding agent Stearic acid | Thermocurable resin | | | | | Thermal-latent cationic curing catalyst | Silicon compound having aryl group and/or polyalkylene glycol chain | Silicon compound not dissolved in thermocurable resin |
|---|---|---|---|---|---|---|---|---|---|---|
|  |  |  | CELL-2021P | CELLOXIDE 2081 | EHPE-3150 | OGSOL EG210 | OGSOL PG100 |  |  |  |
| Example 1 | Isopropyl acetate(0.5) | 0.5 | 30 | — | 20 | 50 | — | SI-80L(0.6) | — | — |
| Example 2 | Isopropyl acetate(0.5) | 0.5 | 40 | — | 60 | — | — | SI-80L(0.2) | — | — |
| Example 3 | — | 0.5 | 30 | — | 20 | 45 | — | SI-80L(0.6) | KF-56(5) | — |
| Example 4 | — | 0.5 | 30 | — | 20 | 48 | — | SI-80L(0.6) | KF-56(2.5) | — |
| Example 5 | — | 0.5 | 24 | — | 25 | 49 | — | SI-80L(0.6) | KF-56(2.5) | — |
| Example 6 | — | 0.5 | 24 | — | 5 | 49 | — | SI-80L(0.6) | KF-56(2.5) | — |
| Example 7 | — | 0.5 | 24 | — | 24 | 49 | — | SI-80L(0.6) | KF-56(2) | — |
| Example 8 | — | 0.5 | 30 | — | 20 | 49 | — | SI-80L(0.6) | KF-56(1) | — |
| Example 9 | — | 0.5 | 30 | — | 20 | 50 | — | SI-80L(0.6) | KF-56(0.3) | — |
| Example 10 | — | 0.5 | 30 | — | 20 | — | 48 | SI-80L(0.6) | KF-56(2.5) | — |
| Example 11 | — | 0.5 | 30 | — | 20 | 50 | — | SI-80L(0.6) | KF-6004(0.5) | — |
| Example 12 | — | 0.5 | 25 | — | 25 | 50 | — | SI-80L(0.6) | KF-6004(0.3) | — |
| Example 13 | — | 0.5 | 45 | — | 5 | 50 | — | SI-80L(0.6) | KF-6004(0.3) | — |
| Example 14 | — | 0.5 | 25 | — | 25 | 50 | — | SI-80L(0.6) | KF-6004(0.3) | — |
| Example 15 | — | 0.5 | 30 | — | 20 | 50 | — | SI-80L(0.6) | KF-6004(0.3) | — |
| Example 16 | — | 0.5 | 30 | — | 20 | — | 50 | SI-80L(0.6) | KF-6004(0.3) | — |
| Example 17 | — | 0.5 | 30 | — | 20 | 50 | — | SI-80L(0.6) | KF-6004(0.1) | — |
| Example 18 | — | 0.5 | 30 | — | 20 | 50 | — | SI-80L(0.6) | HIVAC-F-4(0.1) | — |
| Example 19 | — | 0.5 | 30 | — | 20 | 50 | — | SI-80L(0.6) | KF-6004(0.3) | — |
| Example 20 | — | 0.5 | 30 | — | 20 | 44 | — | SI-80L(0.6) | KF-6004(6) | — |
| Example 21 | — | 0.5 | 50 | — | 50 | — | — | SI-80L(0.2) | KF-6004(0.3) | — |
| Example 22 | — | 0.5 | 40 | — | 60 | — | — | — | KF-6004(0.3) | — |
| Example 23 | — | 0.5 | 40 | — | 60 | — | — | — | KF-56(0.3) | — |

TABLE 4

| | Demoldability | Transparency Preparation liquid | Transparency Cured product | Viscosity (Pa·s) | Refractive index (486 nm) | Refractive index (589 nm) | Refractive index (656 nm) | Abbe number | Melting point (°C.) |
|---|---|---|---|---|---|---|---|---|---|
| Example 1 | 5 | 1 | 1 | — | — | — | — | — | — |
| Example 2 | 2 | 2 | 2 | — | — | — | — | — | — |
| Example 3 | 1 | 1 | 1 | — | 1.5805 | 1.5684 | 1.5641 | 34.7 | — |
| Example 4 | 3 | 1 | 1 | — | — | — | — | — | — |
| Example 5 | 3 | 1 | 1 | — | — | — | — | — | — |
| Example 6 | 6 | 1 | 1 | — | — | — | — | — | — |
| Example 7 | 6 | 1 | 1 | — | — | — | — | — | — |
| Example 8 | 6 | 1 | 1 | — | — | — | — | — | — |
| Example 9 | 6 | 1 | 1 | 88 | — | — | — | — | — |
| Example 10 | 6 | 1 | 1 | — | — | — | — | — | — |
| Example 11 | 1 | 4 | 4 | — | — | — | — | — | — |
| Example 12 | 3 | 3 | 3 | — | — | — | — | — | — |
| Example 13 | 5 | 2 | 2 | — | — | — | — | — | — |
| Example 14 | 3 | 3 | 3 | 258 | 1.5825 | 1.5701 | 1.5652 | 33.0 | — |
| Example 15 | 3 | 3 | 3 | 59 | 1.5827 | 1.5704 | 1.5658 | 33.8 | — |
| Example 16 | 3 | 2 | 2 | — | — | — | — | — | — |
| Example 17 | 5 | 1 | 1 | — | — | — | — | — | — |
| Example 18 | 7 | 1 | 1 | — | 1.5832 | 1.5710 | 1.5668 | 34.8 | — |
| Example 19 | 6 | 2 | 2 | — | — | — | — | — | — |
| Example 20 | 1 | — | 5 (turbid solid) | — | — | — | — | — | — |
| Example 21 | 1 | 3 | 3 | — | 1.5229 | 1.5162 | 1.5137 | 56.1 | — |
| Example 22 | 2 | 3 | 3 | — | — | — | — | — | — |
| Example 23 | 2 | 2 | 2 | 53 | — | — | — | — | — |

TABLE 5

| | Compound having a boiling point of 260° C. or less at 1atmospheric pressure | Demolding agent Stearic acid | Thermocurable resin CELL-2021P | Thermocurable resin CELLOXIDE 2081 | Thermocurable resin EHPE-3150 | Thermocurable resin OGSOL EG210 | Thermocurable resin OGSOL PG100 | Thermal-latent cationic curing catalyst | Silicon compound having aryl group and/or polyalkylene glycol chain | Silicon compound not dissolved in thermocurable resin |
|---|---|---|---|---|---|---|---|---|---|---|
| Example 24 | MEK(0.6) | 0.5 | 25 | — | 25 | 50 | — | SI-80L(0.6) | KF-6004(0.3) | — |
| Example 25 | MEK(0.5) | 0.5 | 25 | — | 25 | 50 | — | | KF-6004(0.3) | — |
| Example 26 | MEK(0.7) | 0.5 | 29 | — | 20 | 49 | — | | KF-56(2.5) | — |
| Example 27 | Isopropyl acetate(0.5) | 0.5 | 30 | — | 20 | 50 | — | | KF-56(0.3) | — |
| Example 28 | | 0.5 | 32 | — | 18 | 50 | — | | KF-56(0.3) | — |
| Example 29 | | 0.5 | 25 | — | 25 | 50 | — | | KF-6004(0.3) | — |
| Example 30 | Dodecanol(0.5) | 0.5 | 25 | — | 25 | 50 | — | | KF-6004(0.3) | — |
| Example 31 | Dodecanol(0.4) | 0.5 | 25 | — | 25 | 50 | — | | KF-6004(0.3) | — |
| Example 32 | Dodecanol(0.5) | 0.5 | 30 | — | 20 | 50 | — | | KF-6004(0.3) | — |
| Example 33 | Dodecanol(0.5) | 0.5 | 25 | 5 | 20 | 50 | — | | KF-6004(0.3) | — |
| Example 34 | Dodecanol(0.5) | 0.5 | 35 | — | 25 | — | 40 | | KF-6004(0.3) | — |
| Example 35 | Dodecanol(0.5) | 0.5 | 35 | — | 25 | — | 40 | SI-100L(0.6) | KF-6004(0.3) | — |
| Example 36 | Dodecanol(0.5) | 0.5 | 33 | — | 24 | — | 43 | SI-80L(0.6) | KF-6004(0.3) | — |
| Example 37 | Dodecanol(0.5) | 0.5 | 35 | — | 25 | — | 40 | SI-80L(0.6) | KF-6004(0.1) | — |
| Example 38 | Isopropyl acetate(0.5) | 0.5 | 40 | — | 60 | 50 | — | SI-80L(0.2) | KF-56(2.5) | — |
| Example 39 | Isopropyl acetate(0.5) | 0.5 | 40 | — | 60 | 50 | — | SI-80L(0.2) | KF-6004(0.1) | — |
| Example 40 | Dodecanol(0.5) | 0.5 | 40 | — | 60 | — | — | SI-80L(0.2) | KF-6004(0.3) | — |
| Example 41 | Dodecanol(0.5) | 0.5 | 50 | — | 50 | — | — | SI-80L(0.2) | KF-6004(0.3) | — |
| Example 42 | Dodecanol(0.5) | 0.5 | 40 | — | 60 | — | — | SI-100L(0.2) | KF-6004(0.3) | — |
| Example 43 | MEK(0.7) | 0.5 | 29 | — | 20 | 50 | — | SI-100L(0.6) | KF-56(2.5) | — |
| Example 44 | Dodecanol(0.5) | 0.5 | 25 | — | 20 | 50 | — | SI-100L(0.6) | KF-6004(0.3) | — |

TABLE 6

| | Demoldability | Transparency Preparation liquid | Transparency Cured product | Viscosity (Pa·s) | Refractive index (486 nm) | Refractive index (589 nm) | Refractive index (656 nm) | Abbe number | Melting point (°C.) |
|---|---|---|---|---|---|---|---|---|---|
| Example 24 | 1 | 3 | 3 | 110 | 1.5823 | 1.5701 | 1.5654 | 33.7 | — |
| Example 25 | 2 | 3 | 3 | — | 1.5826 | 1.5704 | 1.5659 | 34.2 | — |

TABLE 6-continued

|  | Demoldability | Transparency | | Viscosity (Pa·s) | Refractive index (486 nm) | Refractive index (589 nm) | Refractive index (656 nm) | Abbe number | Melting point (°C.) |
|  |  | Preparation liquid | Cured product | | | | | | |
| --- | --- | --- | --- | --- | --- | --- | --- | --- | --- |
| Example 26 | 1 | 1 | 1 | 38 | 1.5823 | 1.5703 | 1.5655 | 33.9 | — |
| Example 27 | 2 | 1 | 1 | 76 | — | — | — | — | — |
| Example 28 | 2 | 1 | 1 | — | — | — | — | — | — |
| Example 29 | 2 | 3 | 3 | — | 1.5823 | 1.5700 | 1.5661 | 35.2 | — |
| Example 30 | 2 | 3 | 3 | — | 1.5835 | 1.5713 | 1.5668 | 34.2 | — |
| Example 31 | 1 | 3 | 3 | 220 | 1.5810 | 1.5692 | 1.5650 | 35.6 | — |
| Example 32 | 1 | 3 | 3 | 78 | 1.5815 | 1.5692 | 1.5648 | 34.1 | — |
| Example 33 | 1 | 3 | 3 | 72 | 1.5878 | 1.5755 | 1.5708 | 33.9 | — |
| Example 34 | 1 | 3 | 3 | 141 | 1.5804 | 1.5683 | 1.5641 | 34.9 | 5.1 |
| Example 35 | 1 | 3 | 3 | 152 | 1.5790 | 1.5671 | 1.5627 | 34.8 | — |
| Example 36 | 1 | 3 | 3 | — | 1.5823 | 1.5701 | 1.5655 | 33.9 | — |
| Example 37 | 2 | 2 | 2 | — | 1.5773 | 1.5656 | 1.5612 | 35.1 | — |
| Example 38 | 1 | 3 | 3 | — | — | — | — | — | 6.3 |
| Example 39 | 1 | 2 | 2 | 49 | — | — | — | — | — |
| Example 40 | 1 | 3 | 3 | 43 | 1.5273 | 1.5209 | 1.5183 | 57.9 | — |
| Example 41 | 1 | 3 | 3 | 10 | 1.5234 | 1.5165 | 1.5143 | 56.8 | — |
| Example 42 | 1 | 3 | 3 | 42 | — | — | — | — | — |
| Example 43 | 1 | 1 | 1 | 38 | 1.5823 | 1.5703 | 1.5655 | 33.9 | — |
| Example 44 | 1 | 3 | 3 | 78 | 1.5815 | 1.5692 | 1.5648 | 34.1 | — |

TABLE 7

|  | Compound a having boiling point of 260° C. or less at 1 atmospheric pressure | Demolding agent Stearic acid | Thermocurable resin | | | | | Thermal-latent cationic curing catalyst | Silicon compound having aryl group and/or polyalkylene glycol chain | Silicon compound not dissolved in thermocurable resin |
|  |  |  | CELL-2021P | CELLOXIDE 2081 | EHPE-3150 | OGSOL EG210 | OGSOL PG100 | | | |
| --- | --- | --- | --- | --- | --- | --- | --- | --- | --- | --- |
| Comparative Example 1 | — | 0.5 | 25 | — | 25 | 50 | — | SI-80L(0.6) | — | — |
| Comparative Example 2 | — | 0.5 | 30 | — | 20 | 50 | — | — | — | — |
| Comparative Example 3 | — | 0.5 | 40 | — | 10 | 50 | — | — | — | — |
| Comparative Example 4 | — | 0.5 | 45 | 5 | — | 50 | — | — | — | — |
| Comparative Example 5 | — | 0.5 | 30 | — | 20 | — | 50 | — | — | — |
| Comparative Example 6 | — | 0.5 | 30 | — | 20 | 49 | — | — | — | KS-707(1) |
| Comparative Example 7 | — | 0.5 | 30 | — | 20 | 49 | — | — | — | KF-96(1) |
| Comparative Example 8 | — | 0.5 | 30 | — | 20 | 49 | — | — | — | KF-412(1) |
| Comparative Example 9 | — | 0.5 | 30 | — | 20 | 49 | — | — | — | KF-53(1) |
| Comparative Example 10 | — | 0.5 | 30 | — | 20 | 48 | — | — | — | KF-54(2.5) |
| Comparative Example 11 | — | 0.5 | 30 | — | 20 | 49 | — | — | — | X-22-169AS(1) |
| Comparative Example 12 | — | 0.5 | 30 | — | 20 | 49 | — | — | — | X-22-163(1) |
| Comparative Example 13 | — | 0.5 | 30 | — | 20 | 50 | — | — | — | SF 8421(0.3) |
| Comparative Example 14 | — | 0.5 | 50 | — | 50 | — | — | SI-80L(0.2) | — | — |
| Comparative Example 15 | — | 0.5 | 48 | — | 48 | — | — | — | — | X-22-169AS(5) |

TABLE 8

|  | Demoldability | Transparency | | Viscosity | Refractive index (486 nm) | Refractive index (589 nm) | Refractive index (656 nm) | Abbe number |
|  |  | Preparation liquid | Cured product | | | | | |
| --- | --- | --- | --- | --- | --- | --- | --- | --- |
| Comparative Example 1 | 8 | 1 | 1 | 185 | 1.5836 | 1.5714 | 1.5668 | 34.0 |

TABLE 8-continued

| | Demoldability | Transparency Preparation liquid | Transparency Cured product | Viscosity | Refractive index (486 nm) | Refractive index (589 nm) | Refractive index (656 nm) | Abbe number |
|---|---|---|---|---|---|---|---|---|
| Comparative Example 2 | 8 | 1 | 1 | 83 | — | — | — | — |
| Comparative Example 3 | 8 | 1 | 1 | 16 | — | — | — | — |
| Comparative Example 4 | 8 | 1 | 1 | 5 | 1.5842 | 1.5720 | 1.5674 | 34.0 |
| Comparative Example 5 | 8 | 1 | 1 | — | — | — | — | — |
| Comparative Example 6 | — | 5:turbid liquid | — | — | — | — | — | — |
| Comparative Example 7 | — | 5:turbid liquid | — | — | — | — | — | — |
| Comparative Example 8 | — | 5:turbid liquid | — | — | — | — | — | — |
| Comparative Example 9 | — | 5:turbid liquid | — | — | — | — | — | — |
| Comparative Example 10 | — | 5:turbid liquid | — | — | — | — | — | — |
| Comparative Example 11 | — | 5:turbid liquid | — | — | — | — | — | — |
| Comparative Example 12 | — | 5:turbid liquid | — | — | — | — | — | — |
| Comparative Example 13 | — | — | 5:turbid solid | — | — | — | — | — |
| Comparative Example 14 | 8 | 2 | 2 | — | 1.519 | 1.5127 | 1.51 | 57.0 |
| Comparative Example 15 | 2 | — | 5:turbid solid | — | — | — | — | — |

TABLE 9

| | Compound having a boiling point of 260° C. or less at 1 atmospheric pressure | | | | | | | Hexadecanol (boiling point: 344° C.) | Demolding agent Stearic acid |
|---|---|---|---|---|---|---|---|---|---|
| | Methanol | Ethanol | Propanol | Octanol | Nonyl alcohol | Dodeoanol | Cyclo-hexanol | | |
| Example 45 | 0.5 | — | — | — | — | — | — | — | 0.5 |
| Example 46 | — | 0.5 | — | — | — | — | — | — | 0.5 |
| Example 47 | — | — | 0.5 | — | — | — | — | — | 0.5 |
| Example 48 | — | — | — | 0.5 | — | — | — | — | 0.5 |
| Example 49 | — | — | — | — | 0.5 | — | — | — | 0.5 |
| Example 50 | — | — | — | — | — | 0.5 | — | — | 0.5 |
| Example 51 | — | — | — | 5 | — | — | — | — | 0.5 |
| Example 52 | — | — | — | 3 | — | — | — | — | 0.5 |
| Example 53 | — | — | — | 1 | — | — | — | — | 0.5 |
| Example 54 | — | — | — | 0.1 | — | — | — | — | 0.5 |
| Example 55 | — | — | — | 0.01 | — | — | — | — | 0.5 |
| Example 56 | — | — | — | — | — | — | 0.5 | — | 0.5 |
| Example 57 | — | — | 0.5 | — | — | 0.5 | — | — | 0.5 |
| Comparative Example 16 | — | — | — | — | — | — | — | 0.5 | 0.5 |
| Reference Example 1 | — | — | — | 10 | — | — | — | — | 0.5 |
| Reference Example 2 | — | — | — | 6 | — | — | — | — | 0.5 |
| Reference Example 3 | — | — | — | 0.005 | — | — | — | — | 0.5 |

| | Thermocurable resin | | | Thermal-latent cationic curing catalyst | Demoldability | Transparency | |
|---|---|---|---|---|---|---|---|
| | CELL-2021P | EHPE-3150 | OGSOL PG100 | | | Preparation liquid | Cured product |
| Example 45 | 30 | 20 | 50 | SI-80L(0.6) | 6 | 1 | 1 |
| Example 46 | 30 | 20 | 50 | SI-80L(0.6) | 5 | 1 | 1 |
| Example 47 | 30 | 20 | 50 | SI-80L(0.6) | 4 | 1 | 1 |
| Example 48 | 30 | 20 | 50 | SI-80L(0.6) | 2 | 1 | 1 |
| Example 49 | 30 | 20 | 50 | SI-80L(0.6) | 4 | 1 | 1 |

TABLE 9-continued

| | | | | | | | |
|---|---|---|---|---|---|---|---|
| Example 50 | 30 | 20 | 50 | SI-80L(0.6) | 6 | 1 | 1 |
| Example 51 | 30 | 20 | 50 | SI-80L(0.6) | 1 | 1 | 1 |
| Example 52 | 30 | 20 | 50 | SI-80L(0.6) | 1 | 1 | 1 |
| Example 53 | 30 | 20 | 50 | SI-80L(0.6) | 2 | 1 | 1 |
| Example 54 | 30 | 20 | 50 | SI-80L(0.6) | 4 | 1 | 1 |
| Example 55 | 30 | 20 | 50 | SI-80L(0.6) | 7 | 1 | 1 |
| Example 56 | 30 | 20 | 50 | SI-80L(0.6) | 3 | 1 | 1 |
| Example 57 | 30 | 20 | 50 | SI-80L(0.6) | 2 | 1 | 1 |
| Comparative Example 16 | 30 | 20 | 50 | SI-80L(0.6) | 8 | 1 | 1 |
| Reference Example 1 | 30 | 20 | 50 | SI-80L(0.6) | 1 (Bubble) | 1 | 1 |
| Reference Example 2 | 30 | 20 | 50 | SI-80L(0.6) | 1 (Bubble) | 1 | 1 |
| Reference Example 3 | 30 | 20 | 50 | SI-80L(0.6) | 8 | 1 | 1 |

TABLE 10

| | Compound having a boiling point of 260° C. or less at 1 atmospheric pressure | Demolding agent | Thermocurable resin | | | | | | | |
|---|---|---|---|---|---|---|---|---|---|---|
| | | | | | | | | | Oxetane | |
| | Octanol | Stearic acid | CELL-2021P | EHPE-3150 | OGSOL PG210 | OGSOL PG100 | OGSOL EA-0200 | JER 828EL | EHO | OXBP |
| Example 58 | 0.5 | 0.5 | 30 | 20 | — | 50 | — | — | — | — |
| Example 59 | 0.5 | 0.5 | 30 | 20 | — | 50 | — | — | — | — |
| Example 60 | 0.5 | 0.5 | — | — | 50 | — | — | 45 | 5 | — |
| Example 61 | 0.5 | 0.5 | — | — | 50 | — | — | 45 | 5 | — |
| Example 62 | 0.5 | 0.5 | 20 | — | — | — | — | 70 | — | — |
| Example 63 | 0.5 | 0.5 | — | — | — | — | — | 70 | — | 20 |
| Example 64 | 0.5 | 0.5 | — | — | — | — | 50 | 30 | — | 20 |
| Example 65 | 0.5 | 0.5 | — | — | — | — | 100 | — | — | — |
| Example 66 | 0.5 | 0.5 | — | — | — | — | 50 | 30 | — | 20 |
| Comparative Example 17 | — | 0.5 | — | — | 50 | — | — | 45 | 5 | — |
| Comparative Example 18 | — | 0.5 | — | — | 50 | — | — | 50 | — | — |
| Comparative Example 19 | — | 0.5 | 20 | — | — | — | — | 70 | — | — |
| Comparative Example 20 | — | 0.5 | — | — | — | — | — | 90 | — | — |

| | PLACCEL FM-1 | Zirconium oxide | Thermal-latent cationic curing catalyst | Thermal-latent radical curing catalyst PERBUTYLO | Photolatent cationic curing catalyst SP-172 | Photolatent radical curing catalyst Irugacure 189 solution | Siloxane compound | |
|---|---|---|---|---|---|---|---|---|
| | | | | | | | BYK-333 | BYK-307 |
| Example 58 | — | — | SI-80L (0.6) | — | — | — | 0.1 | — |
| Example 59 | — | — | SI-80L (0.6) | — | — | — | — | 0.1 |
| Example 60 | — | — | SI-80L(1) | — | — | — | — | — |
| Example 61 | — | — | SI-80L(1) | — | — | — | 0.1 | — |
| Example 62 | 0.2 | 10 | SI-80L(1) | — | — | — | — | — |
| Example 63 | 0.2 | 10 | SI-80L(1) | — | — | — | — | — |
| Example 64 | — | — | SI-80L (0.5) | 1 | — | — | 0.1 | — |
| Example 65 | — | — | — | 2 | — | — | 0.1 | — |
| Example 66 | — | — | — | — | 4 | 2 | 0.1 | — |
| Comparative Example 17 | — | — | SI-80L(1) | — | — | — | — | — |
| Comparative Example 18 | — | — | SI-80L(1) | — | — | — | — | — |
| Comparative Example 19 | 0.2 | 10 | SI-80L(1) | — | — | — | — | — |
| Comparative Example 20 | 0.2 | 10 | SI-80L (0.5) | — | — | — | — | — |

TABLE 11

| | Demoldability | Transparency Preparation liquid | Cured product | Refractive index (589 nm) |
|---|---|---|---|---|
| Example 58 | 1 | 1 | 1 | — |
| Example 59 | 1 | 1 | 1 | — |
| Example 60 | 3 | 1 | 1 | 1.8 |
| Example 61 | 1 | 1 | 1 | 1.6 |
| Example 62 | 2 | 1 | 1 | 1.59 |
| Example 63 | 3 | 1 | 1 | 1.6 |
| Example 64 | 1 | 1 | 1 | 1.6 |
| Example 65 | 1 | 1 | 1 | 1.62 |
| Example 66 | 1 | 1 | 1 | 1.6 |
| Comparative Example 17 | 8 | 1 | 1 | 1.6 |
| Comparative Example 18 | not cured | 1 | not cured | — |
| Comparative Example 19 | 8 | 1 | 1 | 1.59 |
| Comparative Example 20 | not cured | 1 | not cured | — |

The above-mentioned Examples and Comparative Examples show the critical significance of the value range in the present invention as follows. That is, the above-mentioned curable resin composition for molded bodies remarkably exhibits advantageous effects, that is, effects of sufficiently exhibiting both of the demoldability and the optical characteristics such as transparency, because the curable resin composition includes, as an essential component, at least one compound selected from the group consisting of: the compound having a boiling point of 260° C. or less at one atmospheric pressure; the silicon compound having a polyoxyalkylene chain; the silicon compound having an aryl group; and the silicon compound having a polyalkylene chain and an aryl group. It is also clear that the above-mentioned curable resin composition for molded bodies has basic performances such as heat resistance in addition to the above-mentioned characteristics because it includes, as the thermocurable resin, the epoxy resin excellent, in basic performances such as heat resistance.

The technical meaning of the upper limit of the value range is clearly shown by comparison between Example 1 where the resin composition included isopropyl acetate as the compound having a boiling point of 260° C. or less at one atmospheric pressure, and Comparative Example 2 where the resin composition did not include the compound having a boiling point of 260° C. or less at one atmospheric pressure and Comparative Example 16 where the resin composition did not include the compound having a boiling point of 260° C. or less at one atmospheric pressure but instead, included hexadecanol that is the compound having a boiling point of more than 260° C. at one atmospheric pressure. Example 1 and Comparative Examples 2 and 16 are the same in terms of proportions of the used curable resins or the use of stearic acid as the demolding agent.

The demoldability is 5 in Example 1, but it is 8 in Comparative Examples 2 and 16.

This result shows that the molded body in Example 1 can be continuously produced, but the molded bodies in comparative Examples 2 and 16 cannot be continuously produced.

Further, in the case that the specific silicon compound was used as the specific compound, Example 9 where the resin composition included the silicon compound having a polyoxyalkylene chain and/or an aryl group is compared with Comparative Example 2 where the resin composition did not include this compound. The demoldability is 2 in Example 9, but it is 8 in Comparative Example 2.

This result shows that the molded body in Example 9 can be continuously produced, but the molded body in Comparative Example 2 cannot be continuously produced.

More specifically, Examples 48 and 51 to 55 are compared with Comparative Example 2. The demoldability is 8 in Comparative Example 2 where the resin composition did not include the octanol that is the compound having a specific boiling point. The molded body in Comparative Example 2 cannot be continuously produced. In contrast, the demoldability is 7 in Example 55 where the resin composition included 0.01% by weight of octanol, which shows the demoldability is improved. Hence, the molded body can be applied in an optical application as an optical product such as a lens which needs to have a precise surface shape in the order of several micrometers. The demoldability is high enough for the optical product to be continuously produced. Further, the demoldability is improved to 4 in Example 54 where the resin composition included 0.1% by weight of octanol relative to 100% by weight of the resin composition. Therefore, the demoldability is high enough for the molded body to be continuously produced well. In addition, the demoldability is improved to 2 in Example 48 where the resin composition included 0.5% by weight of octanol relative to 100% by weight of the resin composition. The demoldability is improved to 1 in Example 32 where the resin composition included 3% by weight of octanol relative to 100% by weight of the resin composition. The demoldability in Examples 48 and 32 is high enough for the molded body to be preferably used in an optical application and the like.

In Reference Example 1 where 10% by weight of octanol was included relative to 100% by weight of the resin composition and Reference Example 2 where 6% by weight of octanol was included relative to 100% by weight of the resin composition, the demoldability was evaluated as "bubble". The "bubble" in the molded body was generated because the resin composition was insufficiently degassed when being molded in the mold. However, even if the molded body includes such bubbles, such a molded body can be used in some applications as long as the molded body has a sufficient demoldability and hence it can be continuously produced.

In Comparative Example 15 where no compound having a specific boiling point was included, the demoldability was evaluated as 2. However, the molded body is insufficient in transparency and therefore it cannot be used in the above-mentioned optical application and the like.

Further, Example 8 where the specific silicon compound in the present invention was used is compared with Comparative Examples 6 to 9 where the silicon compound not dissolved in the thermocurable resin was used. In Example 8, the demoldability was 6 and the transparency was 1, but in Comparative Examples 6 to 9, the resin solution was turbid and therefore it was insufficient in transparency. Thus, it is clearly shown that the curable resin composition of the present invention can exhibit sufficient demoldability and transparency if including the silicon compound having a specific organic group.

In Examples 3 to 23, as long as the resin compositions include the silicon compound having a polyoxyalkylene chain and/or an aryl group, the resin compositions have the same mechanism in which due to the silicon compound which has been compatible with the resin composition, the resin composition can exhibit the demolding function as well as the sufficient optical characteristics such as transparency. Accordingly, the resin composition can surely exhibit the advantageous effects of the present invention if including the silicon compound having a polyoxyalkylene chain and/or an aryl group.

Further, a comparison between Example 1 where the resin composition included only the Compound having a boiling point of 260° C. or less as the specific compound and Example 27 where the resin composition included the compound having a boiling point of 260° C. or less and the specific compound as the specific compound clearly shows that the demoldability was improved in Example 27. In addition, a comparison between Example 11 where the resin composition included only the specific silicon compound as the specific compound and Example 32 where the resin composition included the specific silicon compound and the compound having a specific boiling point as the specific compound clearly shows that the demoldability was improved in Example 32. Comparisons between Examples 12 and 31, between Example 14 and 30, and between Examples 12 and 32 also show the same. This result shows that in the present invention, the demoldability is further improved if the curable resin composition includes both of the compound having a specific boiling point and the specific silicon compound as the specific compound.

According to the above-mentioned Examples, the silicon compound having a phenyl group or the silicon compound including an organic group having a polyoxyethylene chain and a polypropylene chain were used as the silicon compound having a polyoxyalkylene chain and/or an aryl group. As long as the resin compositions include the silicon compound having a polyoxyalkylene chain and/or an aryl group, the resin compositions in the above Examples have the same mechanism in which due to the silicon compound which has been compatible with the resin composition, the resin composition can exhibit the sufficient optical characteristics such as transparency and further, more sufficiently exhibit the demolding function. Accordingly, the resin composition can surely exhibit the advantageous effects of the present invention if including the silicon compound having a polyoxyalkylene chain and/or an aryl group. At least in the case where the resin composition includes the silicon compound having a polyoxyethylene chain and/or a phenyl group, the above-mentioned Examples and Comparative Examples prove the advantageous effects of the present invention and support the technical meanings of the present invention.

With regard to the resin compositions in Examples 60, 61, and 63, the aromatic epoxy resin was included as a main component of the curable resin (in Examples 60 and 61, the fluorene epoxy resin and the bisphenol A epoxy resin were included, and in Example 63, the bisphenol A epoxy resin was included). However, the resin compositions also included the oxetane compound, and therefore they exhibited a high refractive index of 1.6 and excellent curing property. The resin compositions in Examples 64 and 66 included, as the curable resin, both of the aromatic epoxy resin (the bisphenol A epoxy resin) and the fluorene (meth)acrylate, and therefore they exhibited a high refractive index of 1.6 and excellent curing property.

The cured products obtained in Examples 60, 61, 63, 64, and 66 are formed of the resin composition including the compound having a boiling point of 260° C. or less at one atmospheric pressure, and therefore, the demoldability of these cured products was evaluated as 3 or smaller. Thus, these cured products had excellent demoldability. In addition, such cured products also had excellent transparency.

The resin composition in Example 61 further included the silicon compound having an oxyalkylene chain (the siloxane compound), and therefore, the resin composition was superior to that in Example 60 in demoldability. The resin composition in Comparative Example 18 included only the aromatic epoxy resin (the fluorene epoxy resin and the bisphenol A epoxy resin) as the curable resin. The resin composition was not sufficiently cured under the following conditions, that is, by heating at 140° C. for a short time, i.e., three minutes.

In contrast, the resin composition in Comparative Example 17 included the same aromatic epoxy resin as in Comparative Example 18 and a small amount of the oxetane compound, as the curable resin. As a result, the curing property was improved and a cured product having a high refractive index of 1.6 was obtained. However, the demoldability of the cured product was evaluated as 8, which is insufficient for use in optical applications such as a lens. In addition, the demoldability is insufficient for the cured product to be continuously produced.

The resin compositions in Examples 64 to 66 included the fluorene (meth)acrylate as the curable resin, and therefore, they were excellent in curing property and exhibited a high refractive index of 1.6 or more. Further, the resin compositions in Examples 64 and 66 which further included the aromatic epoxy resin as the curable resin had a viscosity lower than that of the resin composition in Example 65. Therefore, the resin compositions in Examples 64 and 66 were excellent in workability. In addition, in Examples 64 and 66, the demoldability was evaluated as 1 that is the highest value.

The resin composition in Comparative Example 20 included only the aromatic epoxy resin (the bisphenol A epoxy resin) as the curable resin and zirconium oxide as the metal oxide particles. Therefore, the resin composition was not cured under the following conditions, that is, by heating at 140° C. for a short time, i.e., three minutes. This seems to be because the zirconium oxide inhibits the cationic curing of the glycidyl ether group.

In contrast, the resin Composition in Comparative Example 19 included zirconium oxide as the metal oxide particles, but the curing property was improved and a cured product with a high refractive index was obtained because the resin composition included both of the aromatic epoxy resin (the bisphenol A epoxy resin) and the alicyclic epoxy resin as the curable resin. However, the resin composition did not include the specific compound of the present invention, and therefore the demoldability was evaluated as 8. Similarly to the above-mentioned resin compositions, the resin composition in Comparative Example 19 cannot be suitable used in optical applications such as a lens.

The resin compositions in Examples 62 and 63 included zirconium oxide as the metal oxide particles and also included the aromatic epoxy resin (the bisphenol A epoxy resin) as a main component of the curable resin. However, cured products having an improved curing property were obtained because the resin composition in Example 62 further included the alicyclic epoxy resin and the resin composition in Example 63 further included the oxetane compound. The resin compositions in these Examples included the compound having a boiling point of 260° C. or less at one atmospheric pressure, and therefore the demoldability was 2 in Example 62 and it was 3 in Example 63, which was remarkably improved in comparative to the demoldability in Comparative Example 19.

The refractive index in Example 63 is slightly higher than that in Example 62. This is because the resin composition in Example 63 included the biphenyl skeleton as the oxetane compound.

The above-mentioned results prove that the curable resin composition in the present invention can exhibit an outstanding effect of industrially producing a molded product which can be used in applications such as an optical application, an opto device application, a display device application, or used as a mechanical component material, or an electrical or electronic component material.

In the above-mentioned Examples and Comparative Examples, stearic acid was used as the demolding agent. As long as the resin compositions include the demolding agent, the resin compositions in the above-mentioned Examples and Comparative Examples have the same mechanism in which the demolding agent is quickly moved to the surface layer of the resin composition and thereby the demolding functions attributed to the demolding agent can be more sufficiently exhibited. The resin compositions can surely exhibit the advantageous effect of the present invention as long as including the compound having a boiling point of 260° C. or more as the demolding agent. At least in the case that the molded body is prepared using the compound having a boiling point of more than 260° C. as the demolding agent, the above-mentioned Examples and Comparative Examples sufficiently prove the advantageous effects of the present invention and support the technical meaning of the present invention.

Reference Examples are mentioned below to determine that the refractive index, the Abbe number, the moldability, and the like, are improved because the resin compositions include the aromatic epoxy compound, the alicyclic epoxy compound and/or the hydrogenerated epoxy compound, and the cationic curing catalyst.

Synthesis Example 1

An alicyclic epoxy compound (product of DAICEL CHEMICAL INDUSTRIES., LTD., CELLOXIDE (CELL) 2021P, epoxy equivalent: 130) 25 g, an alicyclic epoxy compound (product of DAICEL CHEMICAL INDUSTRIES., LTD., EHPE-3150, epoxy equivalent: 177) 25 g, a fluorene epoxy compound (product of Osaka Gas Chemicals Co., Ltd., OGSOL EG-210, epoxy equivalent: 340) 50 g were mixed at 110° C. to provide a homogeneous mixture. The mixture had a yield of 100 g and a viscosity of 234 Pa·s. Thereinto, a demolding agent (stearic acid) was added at 80° C. and a thermal-latent cationic curing catalyst (product of SANSHIN CHEMICAL INDUSTRY CO., LTD., San-Aid SI-80L, solid content: 50%) was added at 50° C., at concentrations shown in Table 12, respectively. The obtained resin composition is referred to as a "resin composition (1)".

Synthesis Example 2

An alicyclic epoxy compound (product of DAICEL CHEMICAL INDUSTRIES., LTD., CELLOXIDE 2021P, epoxy equivalent: 130) 25 g, an alicyclic epoxy compound (product of DAICEL CHEMICAL INDUSTRIES., LTD., EHPE-3150, epoxy equivalent: 177) 10 g, a brominated aromatic epoxy compound (product of Japan Epoxy Resins Co., Ltd., JER 5050, epoxy equivalent: 395) 30 g, a fluorene epoxy compound (product of Osaka Gas Chemicals Co., Ltd., OGSOL EG-210, epoxy equivalent: 340) 35 g were mixed at 110° C. to provide a homogeneous mixture. The mixture had a yield of 100 g and a viscosity of 138 Pa·s. Thereinto, a demolding agent (stearic acid) was added at 80° C. and a thermal-latent cationic curing catalyst (product of SANSHIN CHEMICAL INDUSTRY CO., LTD., San-Aid SI-80L, solid content: 50%) was added at 50° C., at concentrations shown in Table 12, respectively. The obtained resin composition is referred to as a "resin composition (2)".

Synthesis Example 3

An alicyclic epoxy compound (product of DAICEL CHEMICAL INDUSTRIES., LTD. CELLOXIDE 2021P, epoxy equivalent: 130) 25 g, an alicyclic epoxy compound (product of DAICEL CHEMICAL INDUSTRIES., LTD., EHPE-3150, epoxy equivalent: 177) 10 g, and a brominated aromatic epoxy compound (product of Japan Epoxy Resins Co., Ltd., JER 5050, epoxy equivalent: 395) 65 g were mixed at 110° C. to provide a homogeneous mixture. The mixture had a yield of 100 g and a viscosity of 102 Pa·s. Thereinto, a demolding agent (stearic acid) was added at 80° C. and a thermal-latent cationic curing catalyst (product of SANSHIN CHEMICAL INDUSTRY CO., LTD., San-Aid SI-80L, solid content: 50%) was added at 50° C., at concentrations shown in Table 12, respectively. The obtained resin composition is defined as a "resin composition (3)".

Synthesis Example 4

A bisphenol A epoxy compound (product of Japan Epoxy Resins Co., Ltd., 828EL, epoxy equivalent: 188, a liquid epoxy compound) 65 g and a bisphenol A epoxy compound (product of Japan Epoxy Resins Co., Ltd., JER 1007, epoxy equivalent: 1998, a solid epoxy compound) 20 g were each weighed and mixed at 150° C. to provide a homogeneous mixture. An alicyclic epoxy compound (product of DAICEL CHEMICAL INDUSTRIES., LTD., CELLOXIDE 20212, epoxy equivalent: 130) 15 g was further mixed at 90° C. to provide a homogeneous mixture. The mixture had a yield of 100 g and a viscosity of 19 Pa·s. Thereinto, a demolding agent (stearic acid) was added at 80° C. and a thermal-latent cationic curing catalyst (product of SANSHIN CHEMICAL INDUSTRY CO., LTD., San-Aid SI-80L, solid content: 50%) was added at 50° C., at concentrations shown in Table 12, respectively. The obtained resin composition is defined as a "resin composition (4)".

Synthesis Example 5

A bisphenol A epoxy compound (product of Japan Epoxy Resins Co., Ltd., 828EL, epoxy equivalent: 188, a liquid epoxy compound) 60 g and a bisphenol A epoxy compound (product of Japan Epoxy Resins Co., Ltd., JER 1007, epoxy equivalent: 1998, a solid epoxy compound) 15 g, and a hydrogenerated bisphenol A epoxy compound (product of Japan Epoxy Resins Co., Ltd., YL-7170, epoxy equivalent: 1000, a solid hydrogenerated epoxy compound) 10 g were each weighed and mixed at 150° C. to provide a homogeneous mixture. An alicyclic epoxy compound (product of DAICEL CHEMICAL INDUSTRIES., LTD., CELLOXIDE 2021P, epoxy equivalent: 130) 15 g was further mixed at 90° C. to provide a homogeneous mixture. The mixture had a yield of 100 g and a viscosity of 57 Pa·s. Thereinto, a demolding agent (stearic acid) was added at 80° C. and a thermal-latent cationic curing catalyst (product of SANSHIN CHEMICAL INDUSTRY CO., LTD., San-Aid SI-80L, solid content: 50%) was added at 50° C., at concentrations shown in Table 12, respectively. The obtained resin composition is defined as a "resin composition (5)".

Synthesis Example 6

A bisphenol A epoxy compound (product of Japan Epoxy Resins Co., Ltd., 828EL, epoxy equivalent: 188, a liquid epoxy compound) 30 g and a hydrogenerated bisphenol A epoxy compound (product of Japan Epoxy Resins Co., Ltd., YL-7170, epoxy equivalent: 1000, a solid hydrogenerated epoxy compound) 10 g, and a hydrogenerated bisphenol A epoxy compound (product of Japan Epoxy Resins Co., Ltd., YX-8000, epoxy equivalent: 205, a liquid hydrogenerated epoxy compound) 30 g were each weighed admixed at 150° C. to provide a homogeneous mixture. A fluorene epoxy compound (product of Osaka Gas Chemicals Co., Ltd., OGSOL EG-210, epoxy equivalent: 340) 30 g was further mixed at 100° C. to provide a homogeneous mixture. The mixture had a yield of 100 g and a viscosity of 41 Pa·s. Thereinto, a demolding agent (stearic acid) was added at 80° C. and a thermal-latent cationic curing catalyst (product of SANSHIN CHEMICAL INDUSTRY CO., LTD., San-Aid SI-80L, solid content: 50%) was added at 50° C., at concentrations shown in Table 12, respectively. The obtained resin composition is defined as a "resin composition (6)".

Synthesis Example 7

An alicyclic epoxy compound (product of DAICEL CHEMICAL INDUSTRIES., LTD., CELLOXIDE 2021P, epoxy equivalent: 130) 30 g, an alicyclic epoxy compound (product of DAICEL CHEMICAL INDUSTRIES., LTD., CELLOXIDE 2081, epoxy equivalent: 201) 10 g, an alicyclic epoxy compound (product of DAICEL CHEMICAL INDUSTRIES., LTD., EHPE-3150, epoxy equivalent: 177) 10 g, a brominated aromatic epoxy compound (product of Japan Epoxy Resins Co., Ltd., JER 5050, epoxy equivalent: 395) 20 g, and a fluorene epoxy compound (product of Osaka Gas Chemicals Co., Ltd., OGSOL PG-100, epoxy equivalent: 259) 30 g were mixed at 110° C. to provide a homogeneous mixture. The mixture had a yield of 100 g and a viscosity of 26 Pa·s. Thereinto, a demolding agent (stearic acid) was added at 80° C. and a thermal-latent cationic curing catalyst (product of SANSHIN CHEMICAL INDUSTRY CO., LTD., San-Aid SI-80L, solid content: 50%) was added at 50° C., at concentrations shown in Table 12, respectively. The obtained resin composition is defined as a "resin composition (7)".

Synthesis Example 8

An alicyclic epoxy compound (product of DAICEL CHEMICAL INDUSTRIES., LTD., CELLOXIDE 2021P, epoxy equivalent: 130) an alicyclic epoxy compound (product of DAICEL CHEMICAL INDUSTRIES LTD., CELLOXIDE 2081, epoxy equivalent 201) 5 g, and a fluorene epoxy compound (product of Osaka Gas Chemicals Co., Ltd., OGSOL EG-210, epoxy equivalent: 340) 50 g were mixed at 110° C. to provide a homogeneous mixture. The mixture had a yield of 100 g and a viscosity of 4 Pa·s. Thereinto, a demolding agent (stearic acid) was added at 80° C. and a thermal-latent cationic curing catalyst (product of SANSHIN CHEMICAL INDUSTRY CO., LTD., San-Aid SI-80L, solid content: 50%) was added at 50° C., at concentrations shown in Table 12, respectively. The obtained resin composition is defined as a "resin composition (8)".

Comparative Synthesis Example 1

Into a bisphenol A epoxy compound (product of Japan Epoxy Resins Co., Ltd., 828EL, epoxy equivalent: 188, a liquid epoxy compound) 100 g, a demolding agent (stearic acid) was added at 80° C. and a thermal-latent cationic curing catalyst (product of SANSHIN CHEMICAL INDUSTRY CO., LTD., San-Aid SI-80L, solid content: 50%) was added at 50° C., at concentrations shown in Table 12, respectively. The obtained resin composition is defined as a "comparative resin composition (1)".

Comparative Synthesis Example 2

Into a bisphenol A epoxy compound (product of Japan Epoxy Resins Co., Ltd., 828EL, epoxy equivalent: 188, a liquid epoxy compound) 70 g and a fluorene epoxy compound (product of Osaka Gas Chemicals Co., Ltd., OGSOL EG-210, epoxy equivalent: 340) 30 g were mixed at 110° C. to provide a homogeneous mixture. Thereinto, a demolding agent was added at 80° C. and a thermal-latent cationic curing catalyst (product of SANSHIN CHEMICAL INDUSTRY CO., LTD., San-Aid SI-80L, solid content: 50%) was added at 50° C., at concentrations shown in Table 12, respectively. The obtained resin composition is defined as a "comparative resin composition (2)".

Comparative Synthesis Example 3

Into a hydrogenerated bisphenol A epoxy compound (product of Japan Epoxy Resins Co., Ltd., YX-8000, epoxy equivalent: 205, a liquid hydrogenated epoxy compound) 100 g, a demolding agent (stearic acid) was added at 80° C. and a thermal-latent cationic curing catalyst (product of SANSHIN CHEMICAL INDUSTRY CO., LTD., San-Aid SI-80L) was added at 50° C., at concentrations shown in Table 12, respectively. The obtained resin composition is defined as a "comparative resin composition (3)".

Comparative Synthesis Example 4

A bisphenol A epoxy compound (product of Japan Epoxy Resins Co., Ltd., 828EL, epoxy equivalent: 188, a liquid epoxy compound) 80 g and a bisphenol A epoxy compound (product of Japan Epoxy Resins Co., Ltd., JER 1007, epoxy equivalent: 1998, a solid epoxy compound) 20 g were each weighed and mixed at 150° C. to provide homogeneous mixture. The mixture had a yield of 100 g and a viscosity of 31 Pa·s. Thereto, a demolding agent (stearic acid) was added at 80° C. and a thermal-latent cationic curing catalyst (product of SANSHIN CHEMICAL INDUSTRY CO., LTD., San-Aid SI-80L) was added at 50° C., at concentrations shown in Table 12, respectively. The obtained resin composition is defined as a "comparative resin composition (4)".

Table 12 shows components and proportions thereof in the resin compositions obtained in Synthesis Examples and Comparative Synthesis Examples.

The resin compositions before addition of the demolding agent and the thermal-latent cationic curing catalyst (i.e., the resin composition containing the aromatic compound, and the alicyclic epoxy compound and/or the hydrogenated epoxy compound) were evaluated for a viscosity at 40° C. and at a rotation speed D of 1/s using an R/S Rheometer (product of Brookfield Engineering Laboratories, Inc.). A measuring jig RC 25-1 was used for measuring the viscosity of 20 Pa·s or more and a measuring jig RC 50-1 was used for measuring the viscosity of less than 20 Pa·s. If the viscosity at D of 1/s could not be measured, the viscosity was extrapolated from a value at D of 5 to 100/s to evaluate the viscosity of the resin composition.

TABLE 12

| Resin composition | | Aromatic epoxy compound (unit: g) | | | | | Alicyclic epoxy compound (unit: g) | | |
|---|---|---|---|---|---|---|---|---|---|
| | | 828EL | JER1007 | JER5050 | OGSOL EG210 | OGSOL PG100 | CELL-2021P | EHPE-3150 | CELL-2081 |
| Synthesis Example 1 | Resin composition (1) | — | — | — | 50 | — | 25 | 25 | — |
| Synthesis Example 2 | Resin composition (2) | — | — | 30 | 35 | — | 25 | 10 | — |
| Synthesis Example 3 | Resin composition (3) | — | — | 65 | — | — | 25 | 10 | — |
| Synthesis Example 4 | Resin composition (4) | 65 | 20 | — | — | — | 15 | — | — |
| Synthesis Example 5 | Resin composition (5) | 60 | 15 | — | — | — | 15 | — | — |
| Synthesis Example 6 | Resin composition (6) | 30 | — | — | 30 | — | — | — | — |
| Synthesis Example 7 | Resin composition (7) | — | — | 20 | — | 30 | 30 | 10 | 10 |
| Synthesis Example 8 | Resin composition (8) | — | — | — | 50 | — | 45 | — | 5 |
| Comparative Synthesis Example 1 | Comparative resin composition (1) | 100 | — | — | — | — | — | — | — |
| Comparative Synthesis Example 2 | Comparative resin composition (2) | 70 | — | — | 30 | — | — | — | — |
| Comparative Synthesis Example 3 | Comparative resin composition (3) | — | — | — | — | — | — | — | — |
| Comparative Synthesis Example 4 | Comparative resin composition (4) | 80 | 20 | — | — | — | — | — | — |

| | Hydrogenated epoxy compound (unit: g) | | Demolding agent Stearic acid | Cationic curing catalyst SI-80L | Viscosity (Pa·s) |
|---|---|---|---|---|---|
| | YX8000 | YL7170 | | | |
| Synthesis Example 1 | — | — | 0.5% | 0.6% | 234 |
| Synthesis Example 2 | — | — | 0.5% | 1.0% | 138 |
| Synthesis Example 3 | — | — | 0.5% | 0.4% | 102 |
| Synthesis Example 4 | — | — | 0.5% | 1.0% | 19 |
| Synthesis Example 5 | — | 10 | 0.5% | 1.0% | 57 |
| Synthesis Example 6 | 30 | 10 | 0.5% | 1.0% | 41 |
| Synthesis Example 7 | — | — | 0.5% | 0.6% | 26 |
| Synthesis Example 8 | — | — | 0.5% | 0.5% | 4 |
| Comparative Synthesis Example 1 | — | — | 0.5% | 1.0% | — |
| Comparative Synthesis Example 2 | — | — | 0.5% | 1.0% | — |
| Comparative Synthesis Example 3 | 100 | — | 0.5% | 0.6% | — |
| Comparative Synthesis Example 4 | — | — | 0.5% | 1.0% | 31 |

Reference Examples 4 to 11 and Reference Comparative Examples 1 to 4

The resin compositions obtained in Synthesis Examples and Comparative Synthesis Examples were subjected to vacuum degassing treatment, if necessary, by heating (at 50° C. and the like). Then, the resin composition was cured at 150° C. for 4 hours under vacuum treatment. If bubbles are generated due to the solvent during the curing, the curing is performed under vacuum treatment. As a result, a film with a thickness of 500 μm was prepared. The transmittance, the refractive index, the Abbe number, and the moldability were evaluated as follows. The following Table 13 shows the obtained evaluation results.

The films obtained after the curing in the respective Reference Examples and Reference Comparative Examples were colorless and transparent.

"Transmittance"

The film was evaluated for a transmittance (%) at a wavelength of 500 nm using an absorption spectrometer (product of Shimazu Corporation., spectrophotometer UV-3100).

"Refractive Index, Abbe Number"

The film was measured for refractive indexes at 486 nm, 589 nm, and 656 nm at 20° C. with a refractometer (product of ATAGO CO., LTD., DR-M2). Based on these refractive indexes, the Abbe number was determined.

"Moldability (Curing State and Compressive Strength of Cured Product)"

The transparent material needs to obtain a certain level of compressive strength in a short time at a temperature of 150° C. or less where a side reaction occurs, according to one necessary condition for continuous production of a transparent material. The resin composition was cured to have a height of 1 mm on a SUS304 substrate at 120° C. for 2.5 minutes and cooled to 30° C. within 30 seconds. Then, a load of 706.5 g was applied to a columnar glass bar with a diameter of 3 mm, and thereby the curing state and the compressive strength were measured and evaluated based on the following standards. If a load of 706.5 g is applied to the glass bar with a diameter of 3 mm a strength of $1 \times 10^{-3}$ N/m$^2$ is applied thereto.

Good: No change in shape (10% or less of shape change)
Average: Gel state and change in shape (10% or more of shape change)
Bad: Liquid state and no curing compound was used together with the alicyclic epoxy compound and/or the hydrogenated epoxy compound are compared with Reference Comparative Examples 1, 2, and 4 where only the aromatic epoxy compound was used. Each of the molded products can satisfy a refractive index of 1.57 or more, which a lens with a high refractive index needs, and also show a high transparency. However, the resin compositions were not cured if containing only the aromatic epoxy compound. Therefore, such resin compositions cannot be used as an industrial product. In contrast, in Reference Comparative Example 3 where no aromatic epoxy compound was used and only the hydrogenated epoxy compound was used, a certain level of the demoldability can be exhibited, but the refractive index was remarkably low. Accordingly, in the case that the thermal-latent cationic curing catalyst is used, only if the curable resin composition included the alicyclic epoxy compound and/or the hydrogenated epoxy compound as well as the aromatic epoxy compound, the high transparency and the high refractive index are exhibited, and further the moldability can be enhanced.

The invention claimed is:

1. A curable resin composition for optical molded bodies or lens molded bodies, comprising a thermocurable resin, wherein the curable resin composition comprises at least one compound having a boiling point of 260° C. or less at one atmospheric pressure in an amount of 0.1 to 1% by weight relative to 100% by weight of said curable resin composition, and the compound having a boiling point of 260° C. or less at one atmospheric pressure is at least one compound selected from the group consisting of carboxylic acids

TABLE 13

| | | Transparency | Refractive index (%) | | | Abbe | |
|---|---|---|---|---|---|---|---|
| | Resin composition | (%) | 486 nm | 589 nm | 656 nm | number | Moldability |
| Reference Example 4 | Resin composition (1) | 91.1 | 1.5836 | 1.5714 | 1.5668 | 34.0 | Good |
| Reference Example 5 | Resin composition (2) | 90.4 | 1.5972 | 1.5849 | 1.5801 | 34.2 | Good |
| Reference Example 6 | Resin composition (3) | 91.3 | 1.5919 | 1.5797 | 1.5752 | 34.7 | Good |
| Reference Example 7 | Resin composition (4) | 90.2 | 1.5941 | 1.5814 | 1.5764 | 32.8 | Good |
| Reference Example 8 | Resin composition (5) | 90.7 | 1.5874 | 1.5758 | 1.5705 | 34.1 | Good |
| Reference Example 9 | Resin composition (6) | 90.1 | 1.5942 | 1.5807 | 1.5757 | 31.4 | Average |
| Reference Example 10 | Resin composition (7) | 91.9 | 1.5874 | 1.5754 | 1.5707 | 34.5 | Good |
| Reference Example 11 | Resin composition (8) | 90.3 | 1.5842 | 1.5720 | 1.5674 | 34.0 | Good |
| Reference Comparative Example 1 | Comparative resin composition (1) | 91.1 | 1.6022 | 1.5890 | 1.5839 | 32.2 | Bad |
| Reference Comparative Example 2 | Comparative resin composition (2) | 90.8 | 1.6159 | 1.6011 | 1.5955 | 29.5 | Bad |
| Reference Comparative Example 3 | Comparative resin composition (3) | 91.0 | 1.5201 | 1.5127 | 1.5105 | 53.4 | Average |
| Reference Comparative Example 4 | Comparative resin composition (4) | 91.1 | 1.6021 | 1.5899 | 1.5839 | 32.4 | Bad |

A comparison in results between the above-mentioned Reference Examples and Reference Comparative Examples shows the followings.

In the case that the thermal-latent cationic curing catalyst is used, Reference Examples 4 to 11 where the aromatic epoxy having 1 to 9 carbon atoms, carboxylic acid esters having 1 to 12 carbon atoms, carboxylic acid anhydrides having 1 to 7 carbon atoms and ketones; and wherein the thermocurable resin is a cationic curable resin, and is at least one compound selected from the group consisting of epoxy compounds and oxetane compounds, and the curable resin composition further comprises a thermal-latent cationic curing catalyst, and further comprises a demolding agent, wherein the demolding agent includes at least one compound having a boiling point of more than 260° C. at one atmospheric pressure selected from the group consisting of an alcohol, a carboxylic acid, a carboxylic acid ester, a carboxylic acid salt, and a carboxylic acid anhydride, and wherein the demolding agent contains a total of 13 or more carbon atoms.

2. A production method of a molded body from a curable resin composition for optical molded bodies or lens molded bodies, the curable resin composition for molded bodies including a thermocurable resin, wherein the production method includes a step of molding a curable resin composition including at least one compound having a boiling point of 260° C. or less at one atmospheric pressure in an amount of 0.1 to 1% by weight relative to 100% by weight of said curable resin composition, and the compound having a boiling point of 260° C. or less at one atmospheric pressure is at least one compound selected from the group consisting of carboxylic acids having 1 to 9 carbon atoms, carboxylic acid esters having 1 to 12 carbon atoms, carboxylic acid anhydrides having 1 to 7 carbon atoms and ketones; and wherein the thermocurable resin is a cationic curable resin, and is at least one compound selected from the group consisting of epoxy compounds and oxetane compounds, and the curable resin composition further comprises a thermal-latent cationic curing catalyst, and further comprises a demolding agent, wherein the demolding agent includes at least one compound having a boiling point of more than 260° C. at one atmospheric pressure selected from the group consisting of an alcohol, a carboxylic acid, a carboxylic acid ester, a carboxylic acid salt, and a carboxylic acid anhydride, and wherein the demolding agent contains a total of 13 or more carbon atoms.

3. The curable resin composition for optical molded bodies or lens molded bodies according to claim 1, which is a curable resin composition for molded bodies produced using a mold.

4. The curable resin composition for optical molded bodies or lens molded bodies according to claim 1, wherein the demolding agent is solid at 20° C.

5. The production method for molded bodies according to claim 2, wherein the demolding agent is solid at 20° C.

6. A molded body obtainable by molding the curable resin composition of claim 1.

7. A molded body obtainable by cationic curing the curable resin composition of claim 1.

8. A molded body obtainable by cationic curing the curable resin composition of claim 4.

9. A curable resin composition for optical molded bodies or lens molded bodies, comprising a thermocurable resin, wherein the curable resin composition comprises at least one compound having a boiling point of 260° C. or less at one atmospheric pressure and the compound having a boiling point of 260° C. or less at one atmospheric pressure is at least one compound selected from the group consisting of aliphatic alcohols, and polyalcohol derivatives, and is present in an amount of 0.1 to 1% by weight relative to 100% by weight of said curable resin composition for molded bodies; and wherein the thermocurable resin is a cationic curable resin, and is at least one compound selected from the group consisting of epoxy compounds and oxetane compounds, and the curable resin composition further comprises a cationic curing catalyst and a demolding agent, the demolding agent has a boiling point of more than 260° C. at one atmospheric pressure and is at least one compound selected from the group consisting of an alcohol, a carboxylic acid, a carboxylic acid ester, a carboxylic acid salt, and a carboxylic acid anhydride, and the at least one compound contains a total of 13 or more carbon atoms, and the carboxylic acid ester is obtained from an alcohol (B-1) containing a total of 13 or more carbon atoms and at least one carboxylic acid (B-2) selected from the group consisting of lauric acid, tridecanoic acid, tetradecanoic acid, pentadecanoic acid, palmitic acid, 1-heptadecanoic acid, nonadecanoic acid, eicosanoic acid, 1-hexacosanoic acid, and behenic acid;

a carboxylic acid ester obtained in combination of the carboxylic acid (B-2) with an alcohol containing 1 to 7 carbon atoms; or a carboxylic acid ester obtained in combination of the alcohol (B-1) with a carboxylic acid containing 1 to 7 carbon atoms; and wherein the amount of said demolding agent is 0.01% by weight or more to 10% by weight or less relative to 100% by weight of the curable resin composition.

10. A production method of a molded body from a curable resin composition for optical molded bodies or lens molded bodies, the curable resin composition for molded bodies including a thermocurable resin, wherein the production method includes a step of molding a curable resin composition including at least one compound having a boiling point of 260° C. or less at one atmospheric pressure, and the compound having a boiling point of 260° C. or less at one atmospheric pressure is at least one compound selected from the group consisting of aliphatic alcohols and polyalcohol derivatives, and is present in an amount of 0.1 to 1% by weight relative to 100% by weight of said curable resin composition; and wherein the thermocurable resin is a cationic curable resin, and is at least one compound selected from the group consisting of epoxy compounds and oxetane compounds, and the curable resin composition further comprises a cationic curing catalyst, and the demolding agent has a boiling point of more than 260° C. at one atmospheric pressure and is at least one compound selected from the group consisting of an alcohol, a carboxylic acid, a carboxylic acid ester, a carboxylic acid salt, and a carboxylic acid anhydride, and the at least one compound contains a total of 13 or more carbon atoms, and the carboxylic acid ester is obtained from an alcohol (B-1) containing a total of 13 or more carbon atoms and at least one carboxylic acid (B-2) selected from the group consisting of lauric acid, tridecanoic acid, tetradecanoic acid, pentadecanoic acid, palmitic acid, 1-heptadecanoic acid, nonadecanoic acid, eicosanoic acid, 1-hexacosanoic acid, and behenic acid;

a carboxylic acid ester obtained in combination of the carboxylic acid (B-2) with an alcohol containing 1 to 7 carbon atoms; or a carboxylic acid ester obtained in combination of the alcohol (B-1) with a carboxylic acid containing 1 to 7 carbon atoms; and wherein the amount of said demolding agent is 0.01% by weight or more to 10% by weight or less relative to 100% by weight of the curable resin composition.

11. The curable resin composition for optical molded bodies or lens molded bodies according to claim 9, wherein the aliphatic alcohols contain 3-12 carbon atoms.

12. The curable resin composition for optical molded bodies or lens molded bodies according to claim 9, wherein the aliphatic alcohols are selected from the group consisting of cyclohexanol, methylcyclohexanol, 1-hexanol, 1-heptanol, 2-heptanol, octyl alcohol, and 2-ethylhexanol.

13. The curable resin composition for optical molded bodies or lens molded bodies according to claim 1, wherein the compound having a boiling point of 260° C. or less at one atmospheric pressure has a boiling point greater than 150° C.

14. The production method of a molded body according to claim 2, wherein the compound having a boiling point of 260° C. or less at one atmospheric pressure has a boiling point greater than 150° C.

15. The curable resin composition for optical molded bodies or lens molded bodies according to claim 9, wherein the polyalcohol derivative is at least one compound selected from the group consisting of polyalcohol ether compounds, polyalcohol ether esters and polyalcohol ester compounds.

16. The production method of a molded body according to claim 10, wherein the polyalcohol derivative is at least one compound selected from the group consisting of polyalcohol ether compounds, polyalcohol ether esters and polyalcohol ester compounds.

17. The curable resin composition for optical molded bodies or lens molded bodies according to claim 9, wherein the polyalcohol derivative is at least one compound selected from the group consisting of ethylene glycol dimethyl ether, ethylene glycol diethyl ether, ethylene glycol monomethyl ether, ethylene glycol monoethyl ether, ethylene glycol monoisopropyl ether, ethylene glycol monomethyl ether acetate, ethylene glycol monobutyl ether, propylene glycol monomethyl ether, propylene glycol monobutyl ether, ethylene glycol dibutyl ether, propylene glycol dimethyl ether, cellosolve, ethylene glycol methyl ether acetate, propylene glycol methyl ether acetate, ethylene glycol monoacetate and ethylene glycol diacetate.

18. The production method of a molded body according to claim 10, wherein the polyalcohol derivative is at least one compound selected from the group consisting of ethylene glycol dimethyl ether, ethylene glycol diethyl ether, ethylene glycol monomethyl ether, ethylene glycol monoethyl ether, ethylene glycol monoisopropyl ether, ethylene glycol monomethyl ether acetate, ethylene glycol monobutyl ether, propylene glycol monomethyl ether, propylene glycol monobutyl ether, ethylene glycol dibutyl ether, propylene glycol dimethyl ether, cellosolve, ethylene glycol methyl ether acetate, propylene glycol methyl ether acetate, ethylene glycol monoacetate and ethylene glycol diacetate.

19. The curable resin composition for optical molded bodies or lens molded bodies according to claim 9, wherein the aliphatic alcohol is an aliphatic monoalcohol containing 6-12 carbon atoms.

20. The curable resin composition for optical molded bodies or lens molded bodies according to claim 9, wherein aliphatic alcohol is at least one compound selected from the group consisting of 1-hexanol, 4-methyl-2-pentanol, cyclohexanol, 1-heptanol, 2-heptanol, 3-heptanol, methylcyclohexanol, benzyl alcohol, octyl alcohol, 2-ethylhexanol, 1-nonyl alcohol, isononyl alcohol, 1-decyl alcohol, 2-decyl alcohol, 1-undecyl alcohol, and 1-dodecanol.

* * * * *

UNITED STATES PATENT AND TRADEMARK OFFICE
CERTIFICATE OF CORRECTION

PATENT NO.        : 8,674,038 B2
APPLICATION NO.   : 12/680215
DATED             : March 18, 2014
INVENTOR(S)       : Junichi Nakamura et al.

Page 1 of 1

It is certified that error appears in the above-identified patent and that said Letters Patent is hereby corrected as shown below:

On the Title Page at (73) Assignee, "Skokubai" should read -- Shokubai --;

In the Claims:
At column 92, claim 1, line 25, "260° C." should read -- 260° C --;
At column 92, claim 1, line 29, "260° C." should read -- 260° C --;
At column 93, claim 1, line 6, "260° C." should read -- 260° C --;
At column 93, claim 2, line 18, "260° C." should read -- 260° C --;
At column 93, claim 2, line 22, "260° C." should read -- 260° C --;
At column 93, claim 2, line 36, "260° C." should read -- 260° C --;
At column 93, claim 9, line 57, "260° C." should read -- 260° C --;
At column 93, claim 9, line 59, "260° C." should read -- 260° C --;
At column 94, claim 9, line 8, "C." should read -- C --;
At column 94, claim 10, line 35, "260° C." should read -- 260° C --;
At column 94, claim 10, line 37, "260° C." should read -- 260° C --;
At column 94, claim 10, line 50, "C." should read -- C --;
At column 95, claim 13, line 14, "260° C." should read -- 260° C --;
At column 95, claim 14, line 18, "C." should read -- C --; and
At column 96, claim 20, line 29, "hexanol, 1-heptanol,
   2-heptanol, 3-heptanol, methylcyclohexanol, benzyl
     alcohol, octyl alcohol, 2-ethylhexanol, 1-nonyl alcohol,
     isononyl alcohol, 1-decyl alcohol, 2-decyl alcohol,
   1-undecyl alcohol, and 1-dodecanol" should read
-- hexanol, 1-heptanol, 2-heptanol, 3-heptanol, methylcyclohexanol, benzyl
alcohol, octyl alcohol, 2-ethylhexanol, 1-nonyl alcohol, isononyl alcohol,
1-decyl alcohol, 2-decyl alcohol, 1-undecyl alcohol, and 1-dodecanol --.

Signed and Sealed this
Twenty-second Day of July, 2014

Michelle K. Lee
*Deputy Director of the United States Patent and Trademark Office*